US009098597B2

(12) United States Patent
Matas et al.

(10) Patent No.: US 9,098,597 B2
(45) Date of Patent: Aug. 4, 2015

(54) PRESENTING AND MANAGING CLIPPED CONTENT

(75) Inventors: Mike Matas, Palo Alto, CA (US); Scott Forstall, Mountain View, CA (US); Imran A. Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1402 days.

(21) Appl. No.: 11/469,838

(22) Filed: Sep. 1, 2006

(65) Prior Publication Data

US 2007/0106952 A1 May 10, 2007

Related U.S. Application Data

(63) Continuation-in-part of application No. 11/145,560, filed on Jun. 3, 2005.

(51) Int. Cl.
*G06F 3/048* (2013.01)
*G06F 17/30* (2006.01)

(52) U.S. Cl.
CPC .............................. *G06F 17/30905* (2013.01)

(58) Field of Classification Search
CPC ......... G06F 17/24; G06F 17/21; G06F 9/543; H04L 27/2623
USPC ................................................. 715/767, 770
See application file for complete search history.

(56) References Cited

U.S. PATENT DOCUMENTS

| 5,513,309 | A | * | 4/1996 | Meier et al. .................... 715/860 |
| 5,625,763 | A | * | 4/1997 | Cirne ............................ 715/767 |
| 5,914,714 | A | | 6/1999 | Brown |
| 5,929,852 | A | | 7/1999 | Fisher et al. |
| 5,987,513 | A | | 11/1999 | Prithviraj et al. |
| 6,138,252 | A | | 10/2000 | Whitten et al. |
| 6,199,077 | B1 | | 3/2001 | Inala et al. |
| 6,219,679 | B1 | | 4/2001 | Brisebois et al. |
| 6,297,819 | B1 | | 10/2001 | Furst |
| 6,311,194 | B1 | * | 10/2001 | Sheth et al. .................... 715/236 |
| 6,344,855 | B1 | | 2/2002 | Fisher et al. |
| 6,426,761 | B1 | | 7/2002 | Kanevsky et al. |
| 6,724,403 | B1 | * | 4/2004 | Santoro et al. ................ 715/765 |

(Continued)

FOREIGN PATENT DOCUMENTS

| EP | 1 717 673 | 11/2006 |
| WO | WO 02/086739 | 10/2002 |
| WO | WO 2008/085799 | 7/2008 |

OTHER PUBLICATIONS

Screen Shots of TechSmith's SnagIt product, [URL: http://www.techsmith.com/screen-capture.asp], "SnagIt (V. 7.0.2—Nov. 21, 2003)," 5 pages.

(Continued)

*Primary Examiner* — Boris Pesin
*Assistant Examiner* — Ayesha Huertas Torres
(74) *Attorney, Agent, or Firm* — Blakely, Sokoloff, Taylor & Zafman LLP

(57) ABSTRACT

An area of interest can be defined in a content presentation and a clip can be created that contains content associated with the area of interest. The clip can be presented with other clippings in a clipping page where it can be edited by a user. The clipping page can be stored as a web page or other content source, so that the clipping page can be shared with other users. The clippings can be refreshed in accordance with a selectable refresh scheme.

29 Claims, 43 Drawing Sheets

(56) References Cited

U.S. PATENT DOCUMENTS

| | | | |
|---|---|---|---|
| 6,810,404 B1* | 10/2004 | Ferguson et al. | 1/1 |
| 6,915,490 B1* | 7/2005 | Ewing | 715/794 |
| 6,947,967 B2* | 9/2005 | Ferris et al. | 709/203 |
| 6,976,210 B1* | 12/2005 | Silva et al. | 715/205 |
| 7,103,838 B1 | 9/2006 | Krishnamurthy et al. | |
| 7,222,306 B2* | 5/2007 | Kaasila et al. | 715/801 |
| 7,478,336 B2 | 1/2009 | Chen et al. | |
| 7,490,295 B2* | 2/2009 | Chaudhri et al. | 715/764 |
| 7,519,573 B2 | 4/2009 | Helfman et al. | |
| RE41,922 E | 11/2010 | Gough et al. | |
| 7,930,364 B2 | 4/2011 | Ramaswamy et al. | |
| 7,954,050 B2* | 5/2011 | Maryka et al. | 715/234 |
| 2002/0055955 A1* | 5/2002 | Lloyd-Jones et al. | 707/512 |
| 2002/0083097 A1 | 6/2002 | Warrington | |
| 2002/0112237 A1 | 8/2002 | Kelts | |
| 2003/0018972 A1 | 1/2003 | Arora | |
| 2003/0128234 A1* | 7/2003 | Brown et al. | 345/744 |
| 2003/0164861 A1 | 9/2003 | Barbanson et al. | |
| 2003/0167315 A1 | 9/2003 | Chowdhry et al. | |
| 2003/0221167 A1* | 11/2003 | Goldstein et al. | 715/513 |
| 2004/0066407 A1 | 4/2004 | Regan et al. | |
| 2004/0119747 A1* | 6/2004 | Walker et al. | 345/764 |
| 2004/0133845 A1* | 7/2004 | Forstall et al. | 715/500 |
| 2004/0210833 A1* | 10/2004 | Lerner et al. | 715/512 |
| 2004/0239681 A1* | 12/2004 | Robotham et al. | 345/581 |
| 2005/0149458 A1* | 7/2005 | Eglen et al. | 705/400 |
| 2005/0183005 A1* | 8/2005 | Denoue et al. | 715/512 |
| 2005/0246651 A1* | 11/2005 | Krzanowski | 715/770 |
| 2005/0289452 A1* | 12/2005 | Kashi et al. | 715/512 |
| 2006/0015818 A1* | 1/2006 | Chaudhri et al. | 715/779 |
| 2006/0041589 A1* | 2/2006 | Helfman et al. | 707/104.1 |
| 2006/0224952 A1* | 10/2006 | Lin | 715/517 |
| 2006/0274086 A1* | 12/2006 | Forstall et al. | 345/629 |
| 2006/0277481 A1 | 12/2006 | Forstall et al. | |
| 2007/0016563 A1* | 1/2007 | Omoigui | 707/3 |
| 2007/0041666 A1 | 2/2007 | Nagamine et al. | |
| 2007/0043839 A1* | 2/2007 | Amadio et al. | 709/222 |
| 2007/0044039 A1* | 2/2007 | Amadio et al. | 715/847 |
| 2007/0130518 A1 | 6/2007 | Shavit et al. | |
| 2007/0266011 A1 | 11/2007 | Rohrs et al. | |
| 2007/0266342 A1 | 11/2007 | Chang et al. | |
| 2008/0134014 A1 | 6/2008 | Hind et al. | |
| 2008/0134019 A1* | 6/2008 | Wake et al. | 715/239 |

OTHER PUBLICATIONS

Int'l Search Report in Application No. PCT/US2007/089217 dated May 27, 2008, 13 pages.
Int'l Preliminary Report on Patentability (incl. Written Opinion) in Application No. PCT/US2007/089217 dated Jul. 16, 2009, 7 pages.
Tidwell, J., "Designing Interface," O'Reilly (Nov. 2005).
Action and Response History in U.S. Appl. No. 11/620,492.
Action and Response History in U.S. Appl. No. 11/145,560.
Action and Response History in U.S. Appl. No. 11/145,023.
Final Office Action in U.S. Appl. No. 11/620,492, mailed Jul. 20, 2010, 10 pages.
Action and Response History in U.S. Appl. No. 11/145,561.
Non-Final Office Action in U.S. Appl. No. 11/145,560, mailed Aug. 6, 2010, 21 pages.
Fish & Richardson, Response to Non-Final Office Action in U.S. Appl. No. 11/145,560, filed Nov. 5, 2010, 20 pages.
Final Office Action in U.S. Appl. No. 11/145,561, mailed Dec. 22, 2011, 33 pages.
Fish & Richardson, Response to Final Office Action in U.S. Appl. No. 11/620,492, filed Nov. 15, 2010, 11 pages.
Fish & Richardson, Response to Final Office Action in U.S. Appl. No. 11/145,561, filed Mar. 15, 2011, 26 pages.
Non-Final Office Action in U.S. Appl. No. 11/145,561, mailed Jul. 21, 2011, 30 pages.
Fish & Richardson, Response to Non-Final Office Action in U.S. Appl. No. 11/145,561, filed Nov. 17, 2011, 25 pages.

* cited by examiner

PRESENTING AND MANAGING CLIPPED CONTENT

RELATED APPLICATIONS

This application is a continuation-in-part of U.S. patent application Ser. No. 11/145,560, for "Webview Applications," filed on Jun. 3, 2005, which application is incorporated by reference herein in its entirety.

The subject matter of this application is related to the following U.S. patent applications:

- U.S. patent application Ser. No. 10/877,968, for "Unified Interest Layer For User Interface," filed Jun. 25, 2004;
- U.S. Provisional Patent Application No. 60/583,125, for "Procedurally Expressing Graphic Objects for Web Pages," filed Jun. 25, 2004;
- U.S. patent application Ser. No. 11/145,561, for "Application Clipper," filed Jun. 3, 2005;
- U.S. patent application Ser. No. 11/145,577, for "Widget Authoring and Editing Environment," filed Jun. 3, 2005; and
- U.S. patent application Ser. No. 11/145,023, for "Clipview Applications," filed Jun. 3, 2005.

Each of these applications is incorporated by reference herein in its entirety.

TECHNICAL FIELD

This disclosure relates to the presentation of content.

BACKGROUND

Some conventional computer operating systems and applications (e.g., a word processing application) provide an editing tool that allows a user to clip content (e.g., text, images, links) from a document and save it to a clipboard. The user can paste the content saved to the clipboard into another document. If the content is modified, the user must clip and paste the content again.

In addition to editing tools, some conventional browsers allow a user to scroll a web page until an area of interest is displayed. If the user desires to have the browser display current content, the user can manually request a refresh of the web page. After closing the browser, if the user desires to view the same area of interest, the user must re-launch the browser and repeat the process by selecting the area of interest.

A user can also select multiple areas of interest from one or more web pages in a web browser and save that content separately. Saving selected areas together may require an authoring process that creates a new document and requires precise positioning and layout of content in the document. Transferring or sharing the selected areas of interest can require transfer of the document and content. To update the selected areas with current content can require re-authoring and potentially re-transferring the document.

SUMMARY

An area of interest can be defined in a content presentation and a clip can be created that contains content associated with the area of interest. The clip can be presented with other clippings in a clipping page where it can be edited by a user. The clipping page can be stored as a web page or other content source, so that the clipping page can be shared with other users. The clippings can be refreshed in accordance with a selectable refresh scheme.

In some implementations, a method includes: providing a user interface for presentation on a display device, the user interface including a display area for displaying content; selecting a portion of content from the display area; clipping the selected portion of content; and presenting the clipping in a clipping page.

These and other embodiments can optionally include one or more of the following features. Selecting a portion of content from the display area can include drawing a bounding box around the portion of content to be clipped. Presenting the clipping in a clipping page can include changing the position of the clipping in the clipping page. Presenting the clipping in a clipping page can include: determining at least one parameter associated with the clipping; comparing the parameter with parameters from at least one other clipping presented in the clipping page; and changing the relative position between the clipping and at least one other clipping based on the results of the comparison. Presenting the clipping in a clipping page can include changing the appearance of the clipping page. Presenting the clipping in a clipping page can include changing the appearance of clippings in the clipping page. Changing the appearance of clippings can include subjecting the clipping to geometric transformations. The method can include encoding parameters associated with the clipping with the clipping page. The method can include storing the clipping page. Parameters can include a content source and an area of interest associated with the clipping, where the content source describes the origin of the content in the display area and the area of interest describes the selected portion of content.

In some implementations, a method including: receiving an encoded clipping page, the encoded clipping page describing a content source and an area of interest; clipping a first portion of content accessed from the content source, the first portion being based on the area of interest; and presenting the first portion of content as a clipping in a clipping page.

These and other embodiments can optionally include one or more of the following features. Presenting the clipping in a clipping page can include receiving input directed to the clipping, where the input is operable to change the position of the clipping in the clipping page. Presenting the clipping in a clipping page can include changing the appearance of the clipping page. The clipping can be operable to cause performance of displaying all content from the content source. Receiving an encoded clipping page can include receiving actual content. Presenting the clipping in a clipping page can include presenting the actual content as the clipping in the clipping page. The method can include clipping a second portion of content accessed from the content source, where the second portion is based on the area of interest and the second portion of content is different from the first portion of content; and presenting the second portion of content as the clipping in the clipping page. The method including presenting an indication that the second portion of content is presented rather than the first portion of content.

In some implementations, a method including: receiving an encoded clipping page from a first device, the encoded clipping page describing a content source and an area of interest; and providing the encoded clipping page to a second device, the first device different from the second device.

These and other embodiments can optionally include one or more of the following features. The method can include rendering the encoded clipping page in a second encoded presentation, where the second encoded presentation contains a clipping of a portion of content from the content source and the portion is based on the area of interest; and providing the second encoded presentation page. The encoded clipping page can be encoded as a Uniform Resource Locator (URL). The second encoded presentation can be displayed by a Web browser.

In some implementations, a method including receiving a content source, the source being accessible to access content; and automatically clipping a portion of content accessed from the content source.

These and other embodiments can optionally include one or more of the following features. The method can include presenting the clipping in a clipping page. Receiving a content source, can include receiving a bookmark associated with a content source.

Other implementations are disclosed which are directed to methods, systems, apparatuses, computer-readable mediums and user interfaces.

The details of one or more embodiments of the invention are set forth in the accompanying drawings and the description below. Other features, aspects, and advantages of the invention will be apparent from the description and drawings, and from the claims.

DETAILED DESCRIPTION

We begin with a brief introductory summary of a general description of a system, associated applications, methods, processes and computer program products for presenting clipped content in association with an initial set of figures. Thereafter, a discussion of the later figures is presented that includes more specific examples of presenting clipped content.

Clipping System Overview

Figure 1:
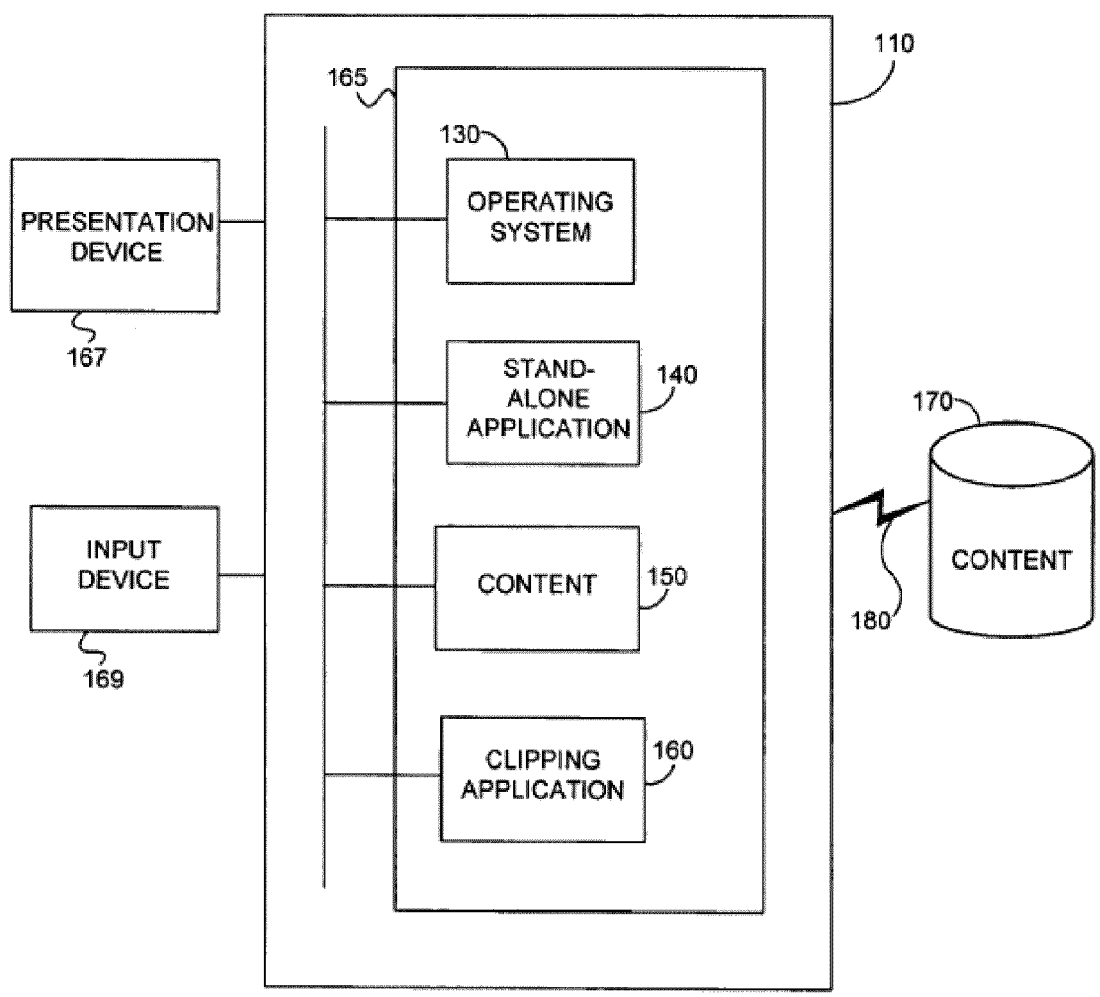
FIG. 1 is a block diagram showing a system for clipping content.

Turning now to the general description, and with reference to FIG. 1, a system 100 is shown for clipping content and presenting the clippings (or sometimes referred below as a clipview, webview, or other "X" views) to a user. System 100 includes a processing device 110 having an operating system 130, a stand-alone application 140, a content source 150, and a clipping application 160. Each of elements 130-160 is communicatively coupled, either directly or indirectly, to each other. Elements 130-160 are stored on a memory structure 165, such as, for example, a hard drive. System 100 also includes a presentation device 167 and an input device 169, both of which are communicatively coupled to processing device 110. System 100 further includes a content source 170 external to processing device 110, and communicatively coupled to processing device 110 over a connection 180.

Processing device 110 may include, for example, a computer, a gaming device, a messaging device, a cell phone, a personal/portable digital assistant ("PDA"), an embedded device, or any other device capable of displaying content. Operating system 130 may include, for example, MAC OS X developed by Apple Computer, Inc. of Cupertino, Calif. Stand-alone application 140 may include, for example, a browser, a word processing application, a database application, an image processing application, a video processing application or any other application that is capable of handling content. Content source 150 and content source 170 may each include, for example, a document having any of a variety of formats, files, pages, media, or other content, and content sources 150 and 170 may be compatible with stand-alone application 140. Presentation device 167 may include, for example, a display, a computer monitor, a television screen, a speaker or other output device. Input device 169 may include, for example, a keyboard, a mouse, a microphone, a touch-screen, a remote control device, a speech activation device, or a speech recognition device or other input devices. Presentation device 167 or input device 169 may require drivers, and the drivers may be, for example, integral to operating system 130 or stand-alone drivers. Connection 180 may include, for example, a simple wired connection to a device such as an external hard disk, or a network, such as, for example, the Internet. Clipping application 160 is described in more detail below, and may be a stand-alone application as shown in system 100 or may be, for example, integrated in whole or part into operating system 130 or stand-alone application 140.

Clipping Application Components

Figure 2:
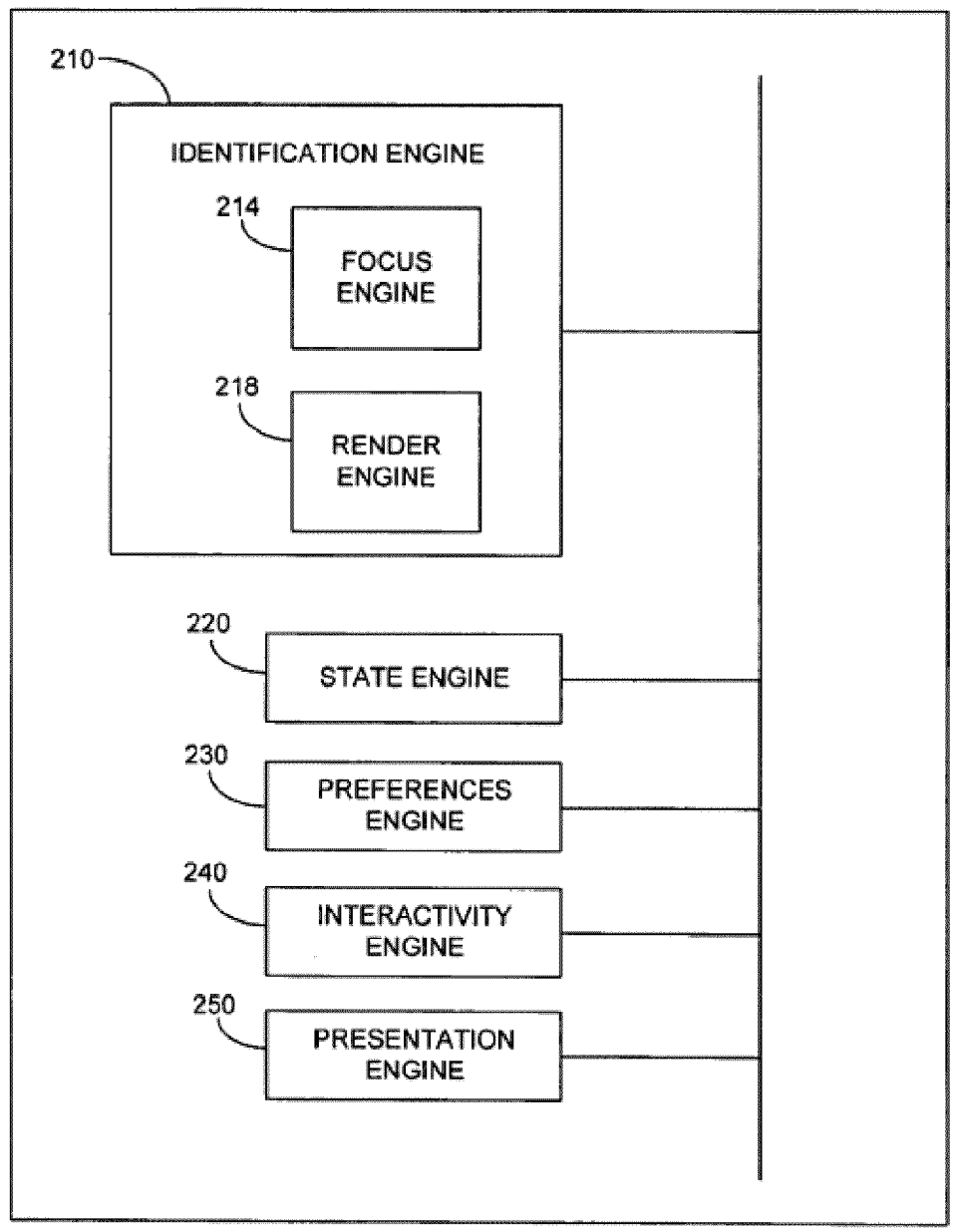
FIG. 2 is a block diagram showing a clipping application.

Referring to FIG. 2, components of an exemplary clipping application 160 are shown. Clipping application 160 provides functionality for clipping content and presenting the clippings to a user. Clipping application 160 includes an identification engine 210 that includes a focus engine 214 for identifying the content to be clipped and a render engine 218 for rendering content. Clipping application 160 further includes a state engine 220 for enabling a refresh of clipped content, a preferences engine 230 for setting preferences, an interactivity engine 240 for processing interactions between a user and the clipped content, and a presentation engine 250 for presenting clipped content to a user. Engines 210-250 are communicatively coupled to one or more of each other. Though the engines identified above are described as being separate or distinct, one or more of the engines may be combined in a single process or routine. The functional description provided herein including separation of responsibility for distinct functions is exemplary. Other groupings or other divisions of functional responsibilities can be made as necessary or in accordance with design preferences.

Focus Engine

Figure 3:
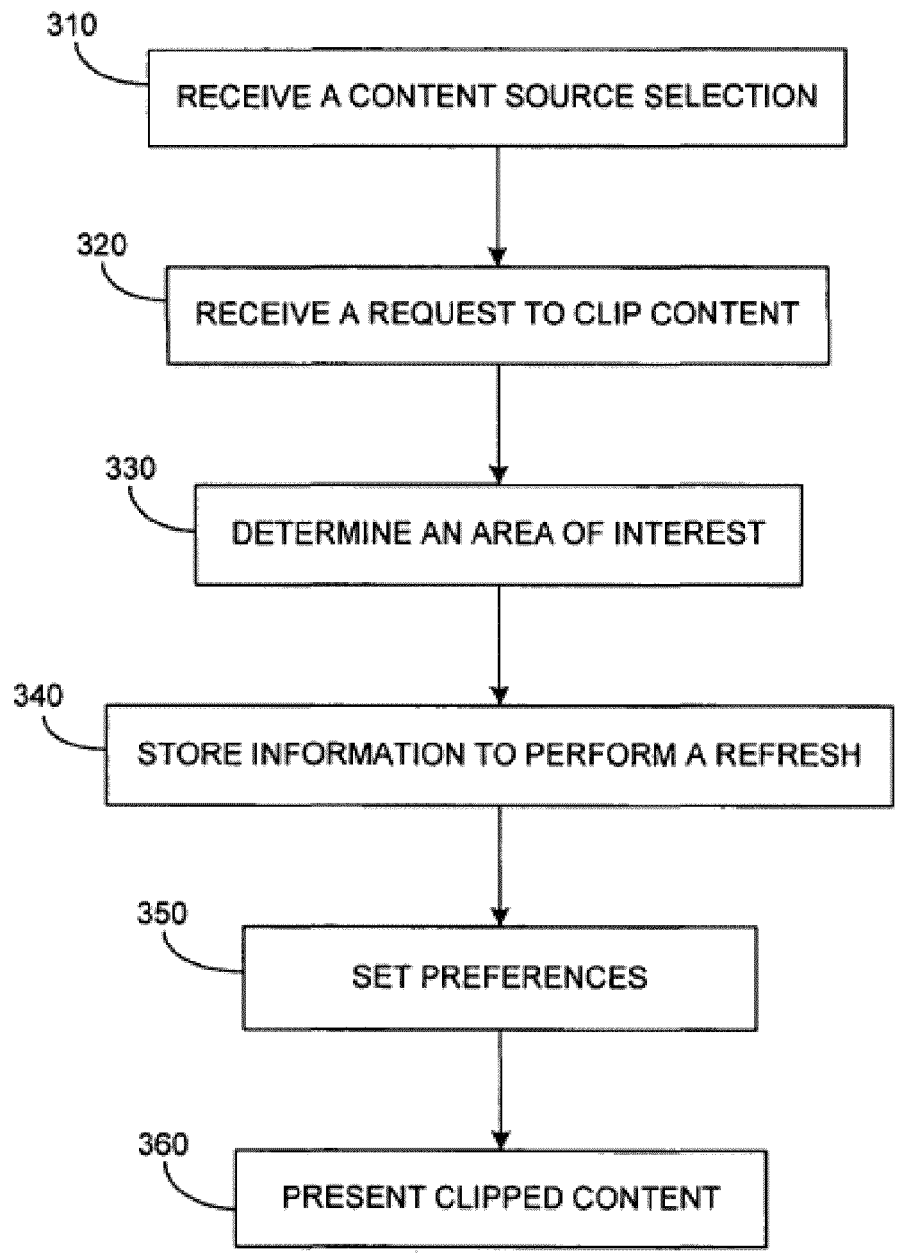
FIG. 3 is a flow chart showing a process for creating a clipping of content.

Focus engine 214 may be used to initially identify, possibly with the assistance of the user, content to be clipped. Such an identification may include accepting input from a user or from another application, and providing assistance or suggestions to a user or application. Focus engine 214 also may be used to access a previously selected area of interest during a refresh of clipped content. Identifying content or accessing a previously identified area of interest may include numerous operations which can be performed, in whole or in part, by focus engine 214, or may be performed by another module such as one of engines 210, 218, or 220-250. FIG. 3 discusses many of the operations that may be performed, for example, in creating a clipping of content, and focus engine 214 may perform various of those and other operations. For example, focus engine 214 may (1) identify a content source, (2) enable a view to be presented, such as a window, that displays the content source, (3) enable the view to be shaped (or reshaped), sized (or resized) and positioned (or repositioned), and (4) enable the content source(s) to be repositioned within the view to select an area of interest.

Enabling a view to be presented may include, for example, (1) identifying a default (or user specified, for example) size, shape and screen position for a new view, (2) accessing parameters defining a frame for the new view including shape, form, size, etc., (3) accessing parameters identifying the types of controls for the new view, as well as display information for those controls that are to be displayed, with display information including, for example, location, color, and font, and (4) rendering the new view.

Further, as discussed in more detail below, focus engine 214 may be initialized in various ways, including, for example, by a user selecting clipping engine 160 to clip content, by receiving a user's acceptance of a prompt to create a clipping, or automatically. An automatic initialization may occur, for example, if a user displays in an application content that includes a pre-defined view, in which case the application may automatically initialize focus engine 214 to create the pre-defined view.

In clipping content from a content source, focus engine 214 also may obtain information about the configuration of the application from which the content was clipped. Such configuration information may be required to identify the area of interest within the content source. For example, when a web page is accessed from a browser, the configuration of the browser (e.g. size of the browser window) may affect how content from the web page is actually displayed (e.g., page flow, line wrap, etc.), and therefore which content the user desires to have clipped.

Render Engine

Render engine 218 may be used to render content that is to be presented to a user in a clipping or during a clip setup process. Render engine 218 may, alternatively, be placed in whole or in part outside of identification engine 210. Such alternate locations include, for example, another engine, such as, for example, presentation engine 250 which is discussed below, and a separate stand-alone application that renders content.

Implementations may render one or more entire content sources or only a portion of one or more of the content sources, such as, for example, the area of interest. As discussed above, an area of interest can represent a contiguous area of a content source, such as a frame or the like, or can be an accumulation of two or more non-contiguous or unrelated pieces of content from a single or multiple sources. In particular implementations, an entire web page (e.g., one form of a content source) is rendered, and only the area of interest is actually presented. Rendering the whole web page allows identification engine 210 to locate structural markers such as a frame that includes part of the area of interest or an (x,y) location coordinate with reference to a known origin (e.g., creating reference data). Such structural markers, in a web page or other content, may be useful, for example, in identifying the area of interest, particularly during a refresh/update after the content source has been updated and the area of interest may have moved. Thus, a selected area of interest may be tracked. The entire rendered page, or other content source, may be stored (e.g., in a transitory or non-transitory memory) and referenced to provide a frame of reference in determining the selected area of interest during a refresh, for example. In one implementation, the entire rendered page is stored non-transitorily (e.g. on a hard disk) to provide a frame of reference for the initial presentation and for all refresh operations, and content that is accessed and presented in a refresh is not stored non-transitorily. In various implementations, render engine 218 renders content that has been identified using focus engine 214. Identification engine 210 typically is capable of processing a variety of different content formats, navigating within those formats, and rendering those formats. Examples include hypertext markup language ("HTML"); formats of common word processing, spreadsheet, database, presentation, and other business applications; and common image and video formats.

State Engine

State engine 220 may be used to store information (e.g., metadata) needed to refresh clipped content and implement a refresh strategy. Such information is referred to as state information and may include, for example, a selection definition including an identifier of the content source as well as additional navigation information that may be needed to access the content source, and one or more identifiers associated with the selected area of interest within the content source(s).

The additional navigation information may include, for example, login information and passwords (e.g., to allow for authentication of a user or subscription verification), permissions (e.g., permissions required of users to access or view content that is to be included in a given clipping), and may include a script for sequencing such information. State engine 220 also may be used to set refresh timers based on refresh rate preferences, to query a user for refresh preferences, to process refresh updates pushed or required by the source sites or otherwise control refresh operations as discussed below (e.g., for live or automatic updates).

Preferences Engine

Preferences engine 230 may be used to query a user for preferences during the process of creating a clipping. Preferences engine 230 also may be used to set preferences to default values, to modify preferences that have already been set, and to present the preference selections to a user. Preferences may relate to, for example, a refresh rate, an option of muting sound from the clipping, a volume setting for a clipping, a setting indicating whether a clipping will be interactive, a naming preference to allow for the renaming of a current clipping, a redefinition setting that allows the user to adjust (e.g., change) the area of interest (e.g., reinitialize the focus engine to select a new area of interest to be presented in a clip view), and function (e.g. filter) settings. Preferences also may provide other options, such as, for example, listing a history of previous content sources that have been clipped, a history of changes to a current clipping (e.g., the changes that have been made over time to a specific clipping thus allowing a user to select one for the current clipping) and view preferences. View preferences define characteristics (e.g., the size, shape, controls, control placement, etc. of the viewer used to display the content) for the display of the portions of content (e.g., by the presentation engine). Some or all of the preferences can include default settings or be configurable by a user.

Interactivity Engine

Interactivity engine 240 may process interactions between a user and clipped content by, for example, storing information describing the various types of interactive content being presented in a clipping. Interactivity engine 240 may use such stored information to determine what action is desired in response to a user's interaction with clipped content, and to perform the desired action. For example, interactivity engine 240 may (1) receive an indication that a user has clicked on a hyperlink displayed in clipped content, (2) determine that a new web page should be accessed, and (3) initiate and facilitate a request and display of a new requested page. As another example, interactivity engine 240 may (1) receive an indication that a user has entered data in a clipped form, (2) determine that the data should be displayed in the clipped form and submitted to a central database, (3) determine further that the next page of the form should be presented to the user in the clipping, and (4) initiate and facilitate the desired display, submission, and presentation. As another example, interactivity engine 240 may (1) receive an indication that a user has indicated a desire to interact with a presented document, and (2) launch an associated application or portion of an application to allow for a full or partial interaction with the document. Other interactions are possible.

Presentation Engine

Presentation engine 250 may present clipped content to a user by, for example, creating and displaying a user interface on a computer monitor, using render engine 218 to render the clipped content, and presenting the rendered content in a user interface. Presentation engine 250 may include an interface to a variety of different presentation devices for presenting corresponding clipped content. For example, (1) clipped web pages, documents, and images may be presented using a display (e.g., a computer monitor or other display device), (2) clipped sound recordings may be presented using a speaker, and a computer monitor may also provide a user interface to the sound recording, and (3) clipped video or web pages having both visual information and sound may be presented using both a display and a speaker. Presentation engine 250 may include other components, such as, for example, an animation engine for use in creating and displaying a user interface with various visual effects such as three-dimensional rotation.

In various implementations, the user interface that presentation engine 250 creates and displays is referred to as a clipview. The clipview includes a first portion including the clipped content and a second portion for presenting the clipped content. In an implementation discussed below, the first portion is referred to as a view portion 1030 in which clipped content is displayed, and the second portion is referred to as a frame 1040 which might also include controls. Implementations need not include a perceivable frame or controls, but may, for example, present a borderless display of clipped content, and any controls may be, for example, keyboard-based controls or mouse-based controls without a displayable tool or activation element, overlay controls, on screen controls or the like. The presentation typically includes a display of the clipped content although other implementations may present audio content without displaying any content. The clipview also may include one or more additional portions for presenting information such as, for example, preferences settings and an identifier of the content source. The display of the clip view may be in the user interface of a device, part of a layer presented in the user interface (e.g., as part of an overlay or an on-screen display).

Clipping application 160 can be a lightweight process that uses, for example, objects defined as part of a development environment such as the Cocoa Application Framework (as referred to as the Application Kit or AppKit, described for example at Mac OS X Tiger Release Notes Cocoa Application Framework, available from Apple Computer Inc. Clippings produced by clipping application 160 can be implemented in some instantiations as simplified browser screens that omit conventional interface features such as menu bars, window frame, and the like.

Clipping Process

Referring to FIG. 3, a process 300 may be used to create a clipping. Process 300 may be performed, at least in part, by, for example, clipping application 160 running on system 110.

Process 300 includes receiving a content source(s) selection (310) and receiving a request to clip content (320). Operations 310 and 320 may be performed in the order listed, in parallel (e.g., by the same or a different process, substantially or otherwise non-serially), or in reverse order. The order in which the operations are performed may depend, at least in part, on what entity performs the method. For example, system 100 may receive a user's selection of a content source (310), and system 100 may then receive the user's request to launch clipping application 160 to make a clipping of the content source (320). As another example, after a user selects a content source and then launches clipping application 160, clipping application 160 may simultaneously receive the user's selection of the content source (310) and the user's request for a clipping of that content source (320). As yet another example, a user may launch clipping application 160 and then select a content source(s) from within clipping application 160, in which case clipping application 160 first receives the user's request for a clipping (for example, a clipview) (320), and clipping application 160 then receives the user's selection of the content source(s) to be clipped (310). In other implementations, operations 310 and 320 may be performed by different entities rather than by the same entity. For example, an application or operating system may provide some or all of the operations provided by a user.

Process 300 includes determining an area of interest in the selected content source(s) (330). In typical implementations, operation 330 requires that the content source(s) be rendered and presented to the user, so that the user can navigate to or otherwise select the area of interest. The rendering also may be important in helping the user determine an exact extent of the area of interest. For example, in implementations that provide a clipview, the user may desire to see how much content is rendered within the presentation portion of the clipview, and the user's determination of the area of interest may be based on the size and shape of the presentation portion (in some implementations, the user also may resize the presentation portion if desired).

Determining the area of interest may also include determining how non-contiguous portions of content are presented in the clipping. For example, determining the area of interest may include a stitching process for joining in the presentation view the non-contiguous portions of the area of interest. Stitching can include dividing the display area into one or more regions that serve as place holders for portions of identified content (e.g., four frames can be associated with a four-up display, each for holding a portion of the identified content). Stitching can also include other interlacing processes that combine identified content in time (e.g., interleaving or sequential presentation) or space (e.g., combing the identified content in a given display space) as desired. Alternatively and or additionally, the processes described above may be implemented in the presentation of the area of interest (e.g., the stitching or combination of the disparate content portions may be combined at presentation time).

In one implementation, the operation of determining an area of interest (330) includes creating and displaying a view window, displaying some portion of the content source within the view window, enabling a user to resize, reshape and reposition the view window, and enabling the user to reposition the content source within the view window. The area of interest is that portion of the content source that is positioned to be displayed in the resized (as necessary) view window. Accordingly, as discussed below with respect to operation 340, information identifying that portion and how to access that portion is stored to enable a refresh to be performed.

As indicated above, the process of determining the area of interest may allow a user to resize the view window. Accordingly, the view window may be larger than, the same size as, or smaller than the size of the display of the content source from which the content was clipped (for example, a browser's display window, or a display of a document). Additionally, other implementations may provide a large view window, for the process of creating a clipping, that displays more content than will be displayed in the final clipping. In these implementations, the user may be enabled to select a portion of the displayed content as the area of interest without reducing the size of the view window (for example, by drawing a box around the area of interest, or selecting portions of the content to form the area of interest).

As will be further described below, various implementations assist a user in determining the area of interest, or determine the area of interest without direct input from a user. For example, system 110 may recognize that a user has accessed a particular piece of content at least a threshold number of times in the past three days, and may ask the user whether the user would like a clipview of the accessed content. As another example, a content source may pre-identify a particular area as being a probable area of interest and clipping application 160 may automatically create a clipview of the pre-identified area of interest. As yet another example, focus engine 214 may include a snap-location feature, possibly provided on a toolbar in clipping application 160. The snap-location feature identifies a portion of content that can be clipped and that includes a user's selected area of interest. For example, if a user clicks on an article in a web page, the snap-location feature may clip the entire frame that contains the article. As another example, a search engine can be used to locate clippable items. In one implementation, the search query can include a format definition that allows a user to designate a search that will return clippings. Alternatively, the search engine can include clipping generation functionality (or invoke the same) to return search results to queries that, though otherwise unformatted, are returned to the user in the search results as formatted clippings.

As with operations 310 and 320, operation 330 may be performed out of the order shown. For example, operation 330 may be performed before operation 320.

Process 300 stores information to perform a refresh of the determined area of interest (340), sets preferences (350), and presents the clipped content (360). In some implementations, one or more functions can be applied to the content identified as the area of interest prior to presentation (step 360). For example, one or more filters may be used to apply one or more graphical effects including zoom, scale or other graphical operation to the selected portion(s) of the content source prior to display. Selection of functions can be made in accordance with user preferences, implemented for example, by preferences engine 230. Operations 340-360 may be performed, for example, as described above in the discussion of FIG. 2. As with operations 310-330, operations 340-360 may be performed in various orders.

In one implementation, process 300 is performed entirely by clipping application 160. For example, after a user selects a content source and launches clipping application 160, then identification engine 210, and in particular focus engine 214, receives the content source selection (310) and the request to clip content (320). Focus engine 214 then determines an area of interest (330) with the user's input. State engine 220 stores information to perform a refresh of the determined area of interest (340), and preferences engine 230 sets preferences (350). Presentation engine 250 presents the clipped content (360), possibly in a clipview.

As discussed in more detail below with respect to variations of state engine 220, a script may be created for performing a refresh. A script may include, for example, an identifier of the content source (e.g. URL) and an identifier of the area of interest (e.g. an (x,y) offset from a frame boundary). More complex scripts also may include identifiers for a login page, and identifiers for navigating to an area of interest after a successful login.

Refresh Process

Figure 4:
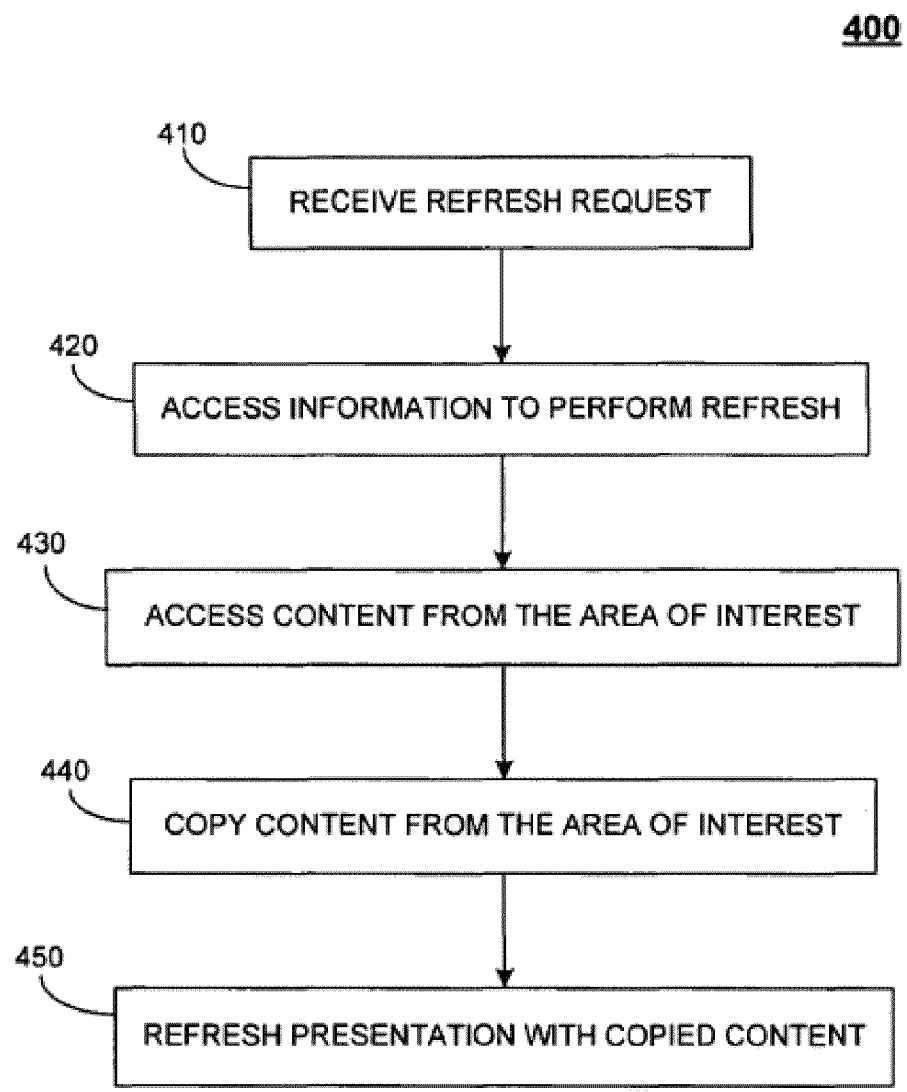
FIG. 4 is a flow chart showing a process for refreshing clipped content.

Referring to FIG. 4, a process 400 may be used to refresh the presentation of a clipping, such as, for example, a clipview. Process 400 may be performed, at least in part, by, for example, clipping application 160 running on system 110.

Process 400 includes receiving a refresh request (410). A refresh request may be received/generated/required, for example, directly from a user, as a result of a timer set to initiate refresh requests at a particular frequency, or in response to an indication from a content source or application that an update is available, required or otherwise necessitated (e.g., live or automatic updates). A refresh request also may be received in response to receiving an update (rather than merely a notification of an available update) pushed from a content source, although receiving the update may obviate the need to perform several remaining operations in process 400 (e.g., the location and accessing steps set forth below).

Process 400 includes accessing information used to perform a refresh (420). The information will typically be that information stored in operation 340 of process 300. Process 400 then accesses content from the area of interest of the content source, typically, using the accessed information (430), and optionally copies (e.g., to a transitory memory such as a random access memory ("RAM"), or to a non-transitory memory such as a disk) the content from the area of interest (440). Process 400 then refreshes the presentation of a clipping by presenting the copied content (450).

Typically, the refresh will update the previously clipped and presented content from the area of interest with the newly accessed content from the area of interest. It may occur, however, that the previous presentation has been interrupted or corrupted prior to a refresh. In such cases, the refresh may merely present the new clipped content in the display (e.g., in a blank view window).

In one implementation, process 400 is performed entirely by clipping application 160. For example, preferences engine 230 receives a user's preference that a clipview be refreshed, e.g., every five minutes, and clipping application 160 sets a, e.g., five-minute, timer. When the timer goes off, state engine 220 receives a refresh request (410), accesses the information that state engine 220 stored to enable a refresh to be performed (420), and passes appropriate information to identification engine 210. Identification engine 210 then initiates an access of the area of interest of the content source. For example, in implementations in which the content source is a web page hosted by an external system, identification engine 210 may use a built-in browser, or a separate stand-alone browser in system 110, to request the content from the area of interest. The request may be received and responded to by a server on the external system. After the external system's server sends the content, identification engine 210 (e.g., or an associated browser) accesses the content (430), optionally copies the content (e.g., to a RAM) (440), renders the content, and focuses on the particular area of interest, and presentation engine 250 presents the focused content as a refresh (450). The refresh operation can be, as described above in response to a timer or time out. Other forms of refresh are also possible, including those associated with automatic refresh of the clipping, refreshes associated with live events, continuous updates, source updates, manual refresh requests, or other conventional forms of refresh.

User Interaction with Clipped Content

Figure 5:
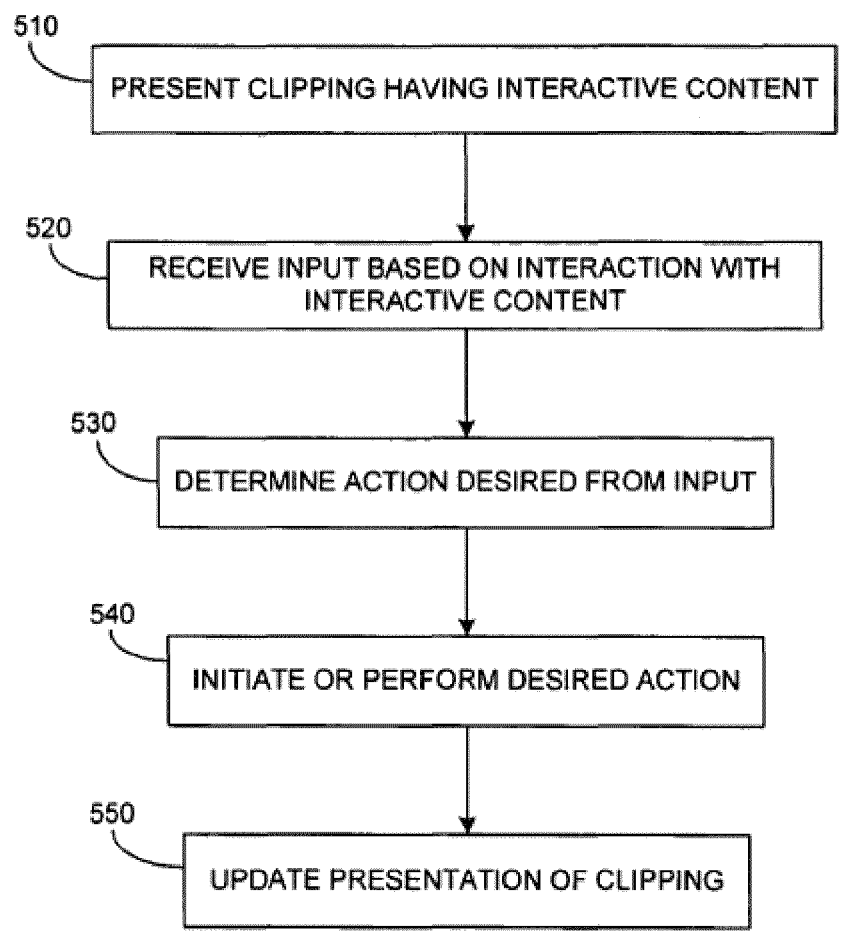
FIG. 5 is a flow chart showing a process for responding to user interactions with clipped content.

Referring to FIG. 5, a process 500 may be used to respond to a user's interaction with content in a clipping that is presented to the user in, for example, a clipview. Process 500 may be performed, at least in part, by, for example, clipping application 160 running on system 110.

Process 500 includes presenting a clipping that includes interactive content (510). The interactive content may include, for example, a webpage (e.g., a hyperlink on a webpage), a data entry field on a form, an electronic mail ("email") address in a directory listing that upon selection automatically creates a "new" blank email message addressed to the selected email address, a text portion of a document that allows edits or comments to be inserted, a link in a web page or document for downloading a file or other information or any other graphical user interface element or control that can be interacted with by a user.

Process 500 includes receiving input based on a user's interaction with the interactive content (520). For example, a user may click a hyperlink, enter data in a form, click an email address, click on a view of an email inbox, edit text in a document, insert a comment in a document, request a download or otherwise interact with the clipping. Based on the user's input, clipping application 160, for example, may receive input in the form of a message indicating (1) a selection (e.g., the interactive content that the user selected such as a hyperlink, an email address, or a requested download), (2) the field that the user entered data in and the value of that data, or (3) the location and value of the edits/comments made to a document.

Process 500 includes determining an action desired from the received input (530). For example, clipping application 160 may determine that the desired action includes (1) requesting a particular web page or item for download, (2) enabling a user to send an email message to a particular entity, or (3) providing entered data (for example, a field in a form, or edits or comments in a document) to the content source as an update. The desired action may be determined by, for example, embedding information in each interactive portion of a clipped piece of content, the information indicating, for example, the type of interaction that is supported, the type of data that may be entered, the desired action, and the desired update to the presentation of the clipping. Alternatively, all or part of this information may be stored in a data structure and may be accessed when the interactive input is received for a given piece of interactive content.

Process 500 includes initiating or performing the desired action (540). Clipping application 160 may perform the desired action(s) (540) by itself, or may initiate the desired action(s) (540) and perform the desired actions with the assistance of one or more other components. For example, clipping application 160 may use a stand-alone browser to request a hyperlinked web page from an external system.

Process 500 includes updating the presentation of the clipping accordingly (550). Updating the presentation (550) may include, for example, (1) presenting the requested web page in the same presentation window in which the clipping was being presented, (2) presenting a pre-addressed but otherwise blank email form in the same presentation window in which the clipping was being presented, (3) echoing back the entered data to the presentation window or (4) launching an underlying application to allow full or partial interaction. In implementations in which the requested material (web page, email form, downloaded item, etc.) is to be presented outside of the clipping presentation, operation 550 may include highlighting the item that the user selected in the clipping presentation, or providing a message indicating the system's response (for example, "download complete"), or otherwise visually indicating that the request was received or completed. Operations 540 and 550 may be conflated in particular implementations in which the desired action is merely an updated presentation.

In one implementation, process 500 is performed entirely by clipping application 160. Presentation engine 250 may present a clipping of a web page that includes a button to download a music file (510), and may receive a user's selection of the button (520). Presentation engine 250 may provide the user's input to interactivity engine 240, and interactivity engine 240 may determine that a particular music file has been requested for download (530). Interactivity engine 240 may then initiate the request for the particular music file by forwarding the request to identification engine 210 or a stand-alone browser (540) which communicates with an external system to effect the download. Upon receipt of the requested music file, clipping engine 160 may use presentation engine 250 to update the presentation of the clipped content with a message that the download is complete or initiate a player/viewer for playing/viewing of the downloaded content (550).

A system, processes, applications, engines, methods and the like have been described above for clipping content associated with an area of interest from one or more content sources and presenting the clippings in an output device (e.g., a display). Clippings as described above can be derived from one or more content sources, including those provided from the web (i.e., producing a webview), a datastore (e.g., producing a docview) or other information sources.

Clippings as well can be used in conjunction with one or more applications. The clipping system can be a stand alone application, work with or be embedded in one or more individual applications, or be part of or accessed by an operating system. The clipping system can be a tool called by an application, a user, automatically or otherwise to create, modify and present clippings.

The clipping system described herein can be used to present clipped content in a plurality of display environments. Examples of display environments include a desktop environment, a dashboard environment, an on screen display environment or other display environment.

Described below are example instantiations of content, applications, and environments in which clippings can be created, presented or otherwise processed. Particular examples include a web instantiation in which web content is displayed in a dashboard environment (described in association with FIGS. 6-34). Other examples include "widget" (defined below) instantiation in a desktop display environment. Other instantiations are possible.

Web Instantiation

A dashboard, or sometimes referred to as a "unified interest layer", includes a number of user interface elements. The dashboard can be associated with a layer to be rendered and presented on a display. The layer can be overlaid (e.g., creating an overlay that is opaque or transparent) on another layer of the presentation provided by the presentation device (e.g. an overlay over the conventional desktop of the user interface). User interface elements can be rendered in the separate layer, and then the separate layer can be drawn on top of one or more other layers in the presentation device, so as to partially or completely obscure the other layers (e.g., the desktop). Alternatively, the dashboard can be part of or combined in a single presentation layer associated with a given presentation device.

One example of a user interface element is a widget. A widget generally includes software accessories for performing useful, commonly used functions. In general, widgets are user interfaces providing access to any of a large variety of items, such as, for example, applications, resources, commands, tools, folders, documents, and utilities. Examples of widgets include, without limitation, a calendar, a calculator, and address book, a package tracker, a weather module, a clipview (i.e., presentation of clipped content in a view) or the like. In some implementations, a widget may interact with remote sources of information (such as a webview discussed below), such sources (e.g., servers, where a widget acts as a client in a client-server computing environment) to provide information for manipulation or display. Users can interact with or configure widgets as desired. Widgets are discussed in greater detail in concurrently filed U.S. patent application entitled "Widget Authoring and Editing Environment." Widgets, accordingly, are a container that can be used to present clippings, and as such, clipping application 160 can be configured to provide as an output a widget that includes clipped content and all its attending structures. In one implementation, clipping application 160 can include authoring tools for creating widgets, such widgets able to present clipped content.

In one particular implementation described in association with FIGS. 6-34, a clipping application allows a user to display a clipping of web content. The clip is displayed in a window of a widget created by the clipping application, and both the widget and the clipping application are separate from the user's browser. The clipping application allows the user to size the window, referred to as a webview, and to select an area of interest from the (one or more) web page(s). The content from the area of interest, including hyperlinks, radio buttons, and other interactive portions, is displayed in the webview and is refreshed automatically, or otherwise by the clipping application or other refresh source to provide the user with the latest (or appropriate) content from the area of interest.

In this instantiation, the clipping application 160 stores identifying information for the webview as a non-transitory file that the user can select and open. By storing the identifying information as a file, the clipping application enables the user to close the webview and later to reopen the webview without having to repeat the procedure for selecting content and for sizing and positioning the webview. The identifying information includes, for example, a uniform resource locator ("URL") of the one or more web pages, as well as additional information that might be required to locate and access the content in the selected area of interest. The identifying information also may include the latest (or some other version, such as the original clipping) content retrieved from the area of interest. Thus, when the user reopens a webview, the clipping application may use the identifying information to display the latest contents as well as to refresh those contents.

Specific Implementations

Referring to FIGS. 6-35, we now describe specific implementations, and we include a description of a significant number of details to provide clarity in the description. The first specific implementation involves a clipping application 160 in which a presentation engine 250 provides a widget on a dashboard, as described in part in U.S. patent application Ser. No. 10/877,968. The widget is configured to include a webview, a particular instantiation of a clipview (the webview representing a particular instantiation of a widget as well), for displaying content from a selected area of interest from one or more web pages. The webview may be refreshed at a user-specified interval, automatically, or otherwise and the webview may be closed and reopened preferably without losing configuration information or the clipped content. However, as one of ordinary skill in the art appreciates, and as discussed both before and after the description of this specific implementation, many details and features may be varied, such as, for example, supporting other types of content, providing other mechanisms for presenting clipped content, or providing different configuration parameters. Thereafter, a second specific implementation is presented with reference to a viewer displayed on a desktop of a computing device.

Figure 6:
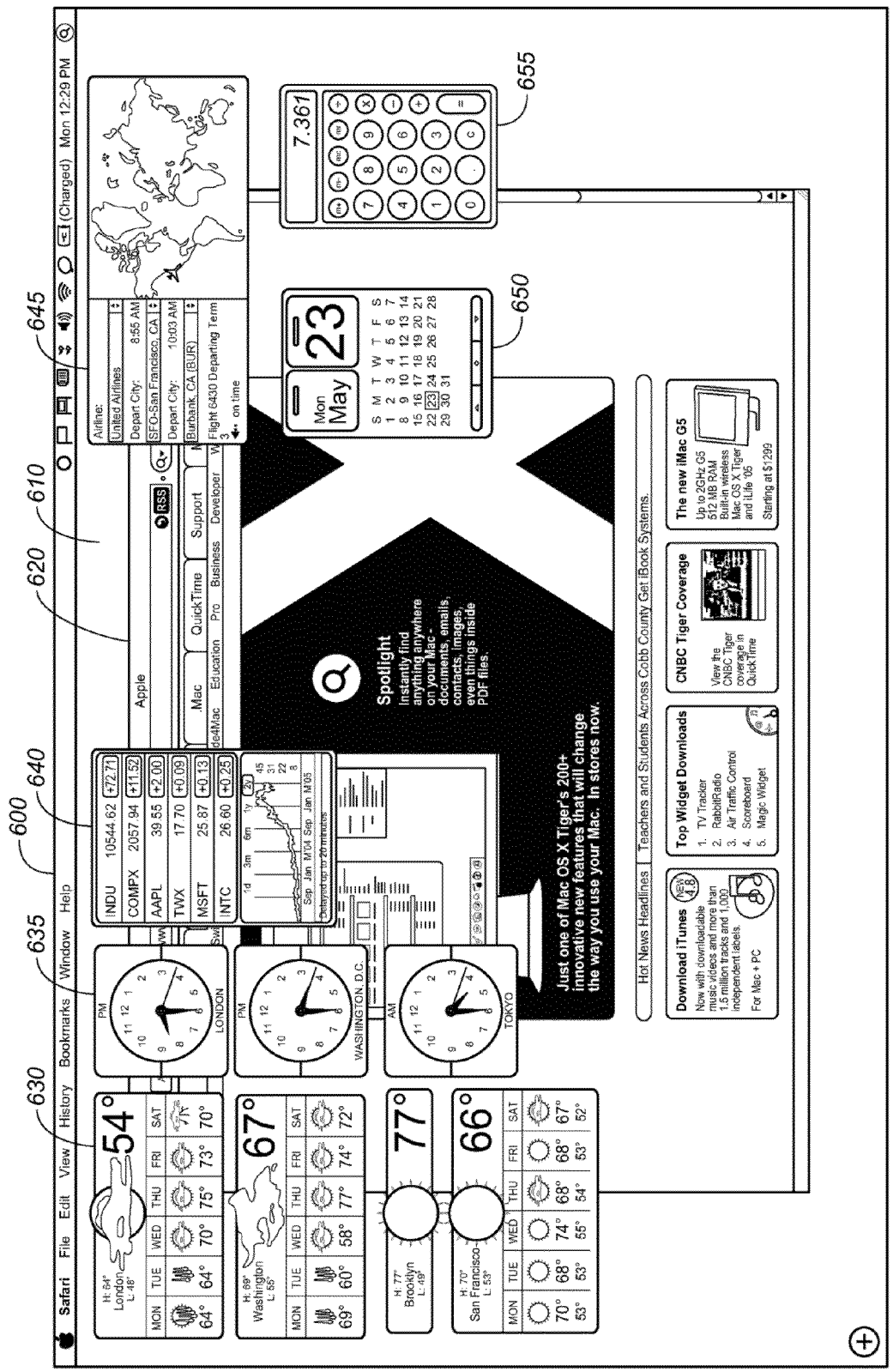
FIG. 6 is a screen shot showing a dashboard.

Referring to FIG. 6, a screen shot 600 shows a dashboard 610 including a plurality of webview widgets opened on a computer screen with a Safari® application 620 visible in the background. Safari® is a browser produced by Apple Computer, Inc. As explained in U.S. patent application Ser. No. 10/877,968, an implementation of a dashboard may include a layer that is presented on a computer screen and that overlays other items (e.g., a desktop, windows, icons or other graphical elements) being displayed. The overlay may be translucent to enable the overlaid items to be discernible or opaque, and the overlay includes widgets (which may or may not be translucent). As discussed above, widgets are user interface elements providing access to any of a large variety of items, such as, for example, applications, resources, commands, tools, folders, documents, and utilities. When dashboard 610 is activated, the display of other applications may be in one implementation darkened partially to indicate that dashboard 610 is active. Dashboard 610 includes a series of widgets, e.g., weather widgets 630, clock widgets 635, a stock quote widget 640, a flight information widget 645, a calendar widget 650, and a calculator widget 655. Some or all of Widgets 630-655 may provide clippings according to one or more of the implementations described in this disclosure. In particular, widgets 630, 640, and 645 as shown, obtain content from the World Wide Web, in which case, the content display portions of widgets 630, 640, and 645 display web clips and may be referred to as webviews. Widgets that display web content (such as widgets 630, 640 and 645) are referred to as webview widgets. Though this instantiation includes webview widgets as part of a dashboard, other instantiations are possible, including those where webview widgets are presented in other display environments, such as a desktop.

Figure 7:
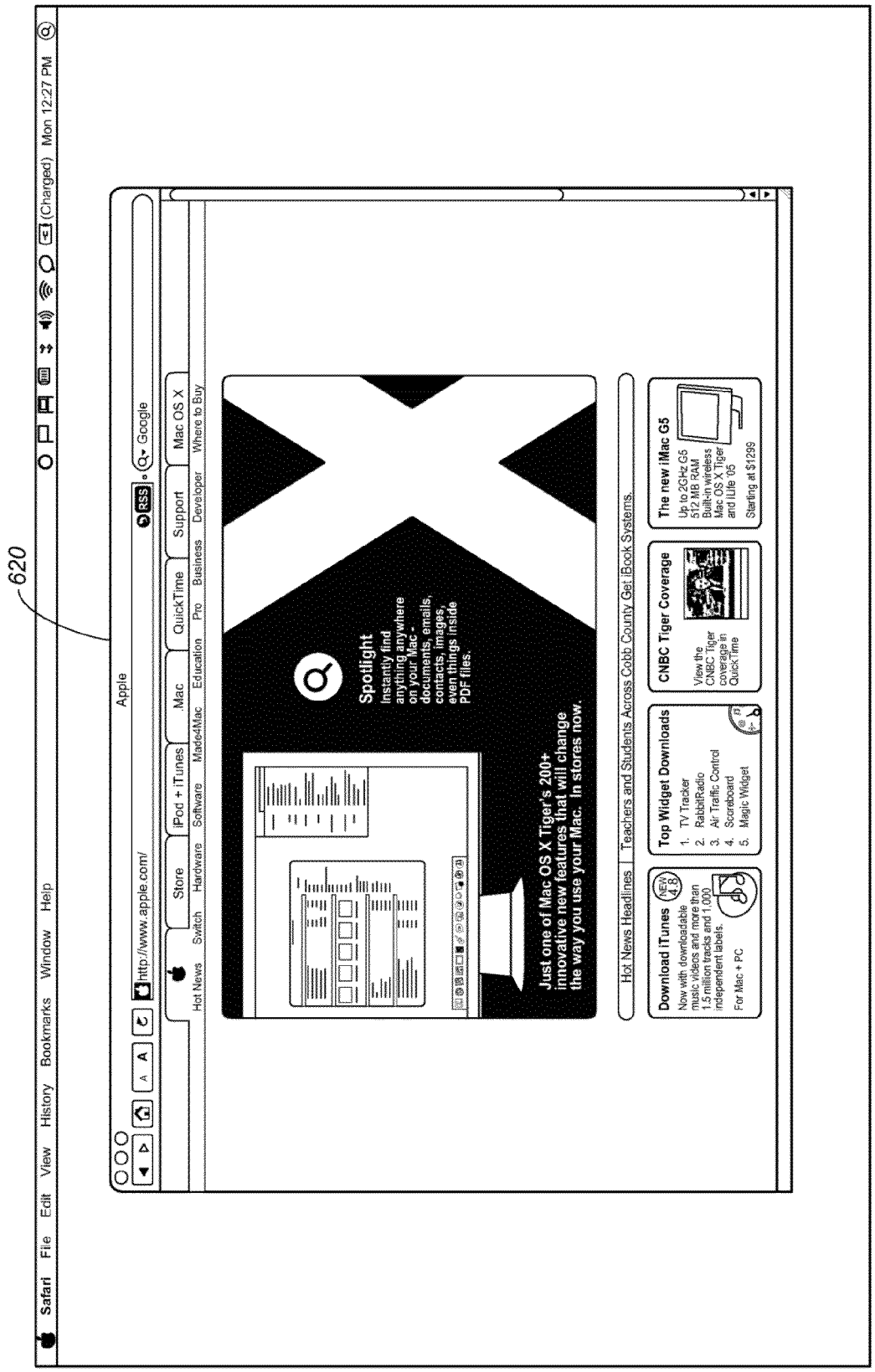
FIG. 7 is a screen shot showing a browser with selected content.

Referring to FIG. 7, a screen shot 700 shows Safari® application window 620 in the foreground. With Safari® application window 620 now in the foreground, it can be seen that the apple.com web site is loaded in window 620. This is one of a number of possible starting points for creating a webview as discussed above. Once a particular webpage has been identified, the clipping application can be initiated. Initiation can occur automatically, or by user prompt. Other means of initiating the clipping application outside of the dashboard are possible, including by an authoring application, by user interaction, by a call or the like as described above.

Figure 8:
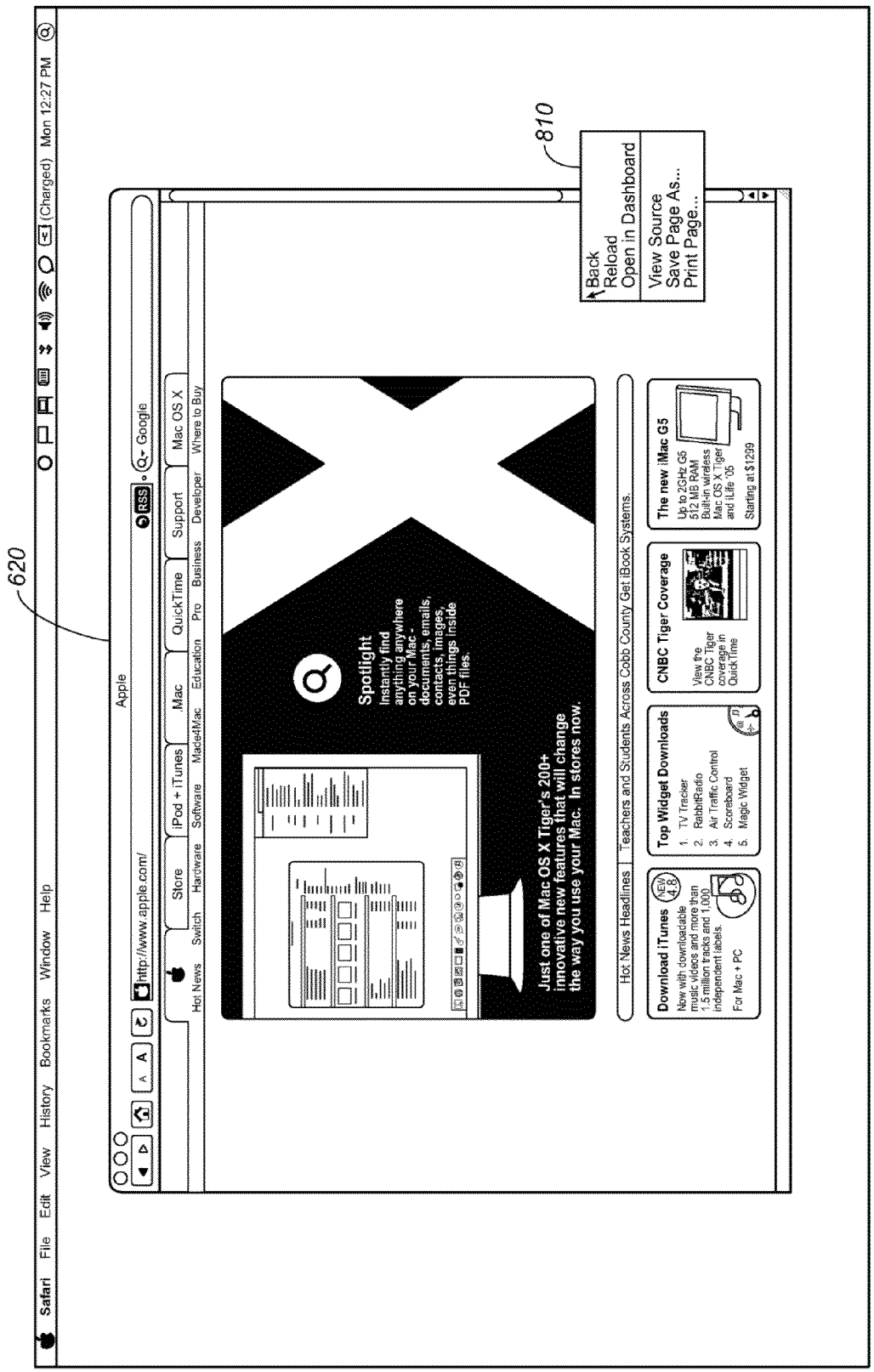
FIG. 8 is a screen shot showing a contextual menu in the browser of FIG. 7.
Figure 9:
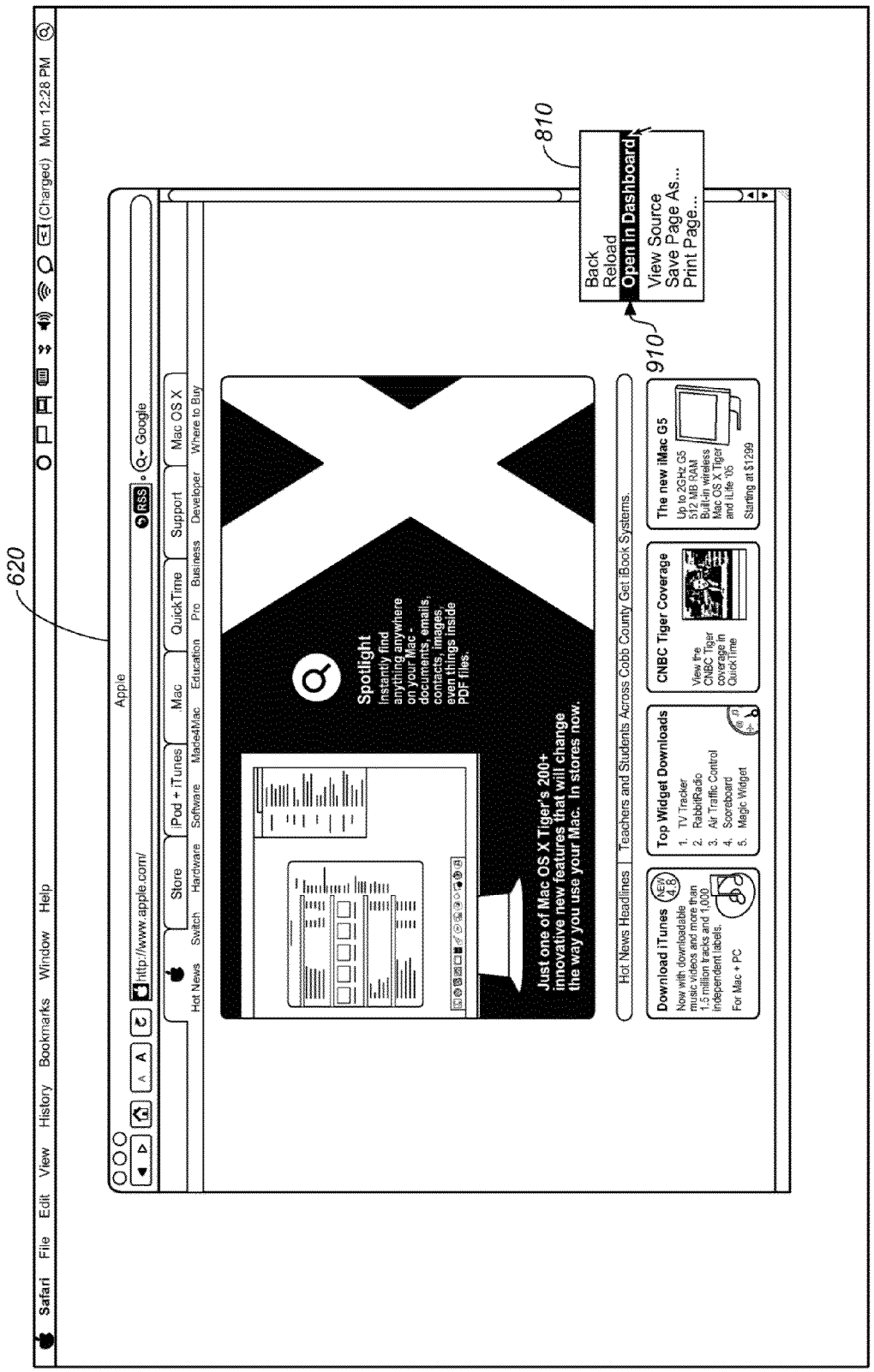
FIG. 9 is a screen shot showing the contextual menu of FIG. 8 with a menu item selected.

Referring to FIG. 8, a screen shot 800 shows a contextual menu 810 displayed from within the Safari® application window 620. Referring to FIG. 9, a screen shot 900 shows contextual menu 810 with a menu item 910 labeled "Open in Dashboard" being selected. By selecting the menu item "Open in Dashboard", the clipping engine can be initiated.

Figure 10:
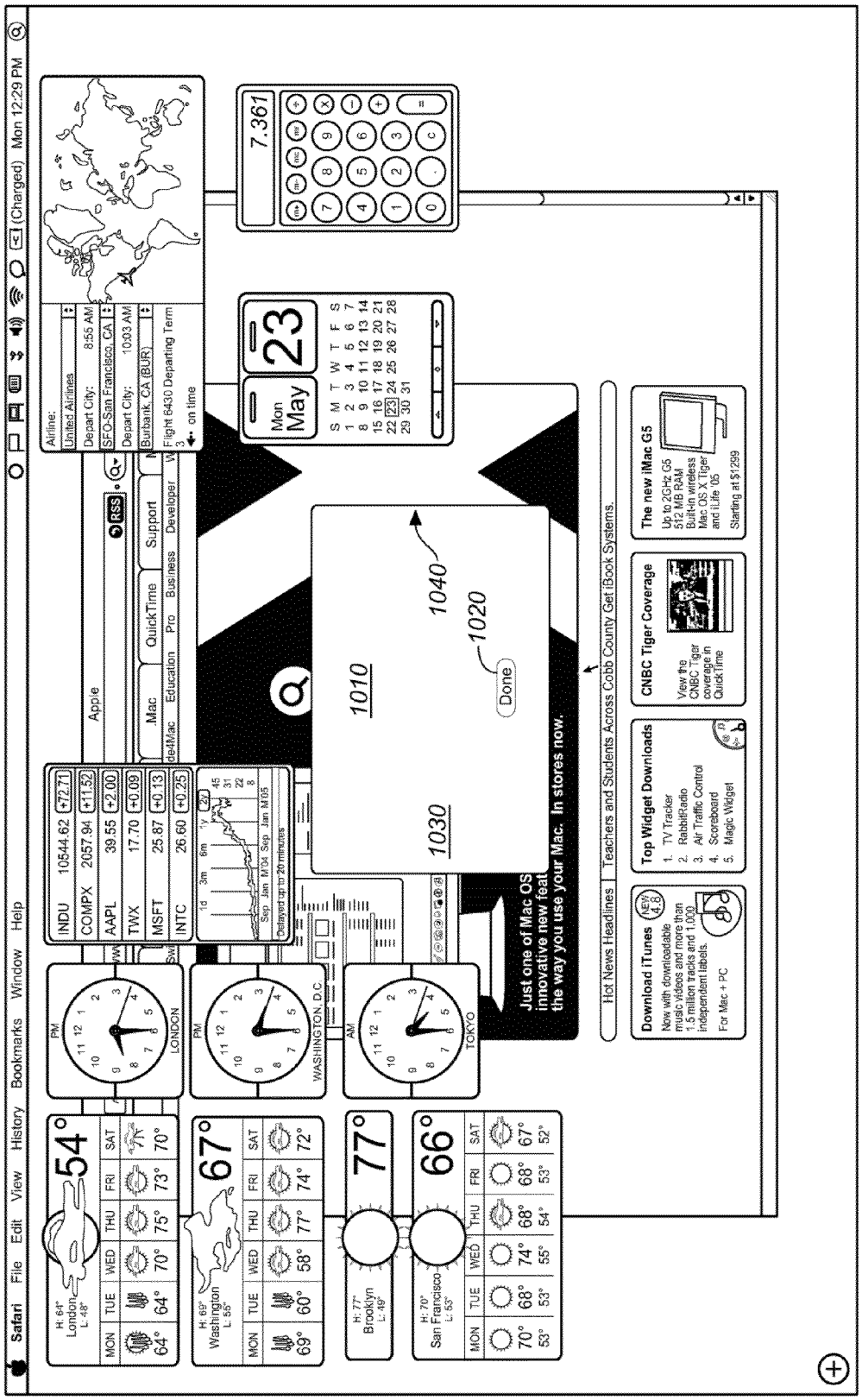
FIG. 10 is a screen shot showing a result of selecting the selected menu item from FIG. 9.

Referring to FIG. 10, a screen shot 1000 shows a result of selecting menu item 910. The result is that a new web clip widget 1010 (i.e., a webview widget) is created. Widget 1010 includes a "Done" button 1020 that may be selected by a user when the process of configuring widget 1010 is complete. To create widget 1010, identification engine 210, and focus engine 214 in particular, may identify that a new window needs to be displayed. Focus engine 214 may identify the default size, shape and screen position for a new window, and the frame and controls (for example, the "Done" button 1020 and a control 2910 discussed below) of the new window.

Presentation engine 250 may then present the new window as widget 1010, including a view portion 1030 (the clipped portion), a frame 1040, and controls.

Figure 11:
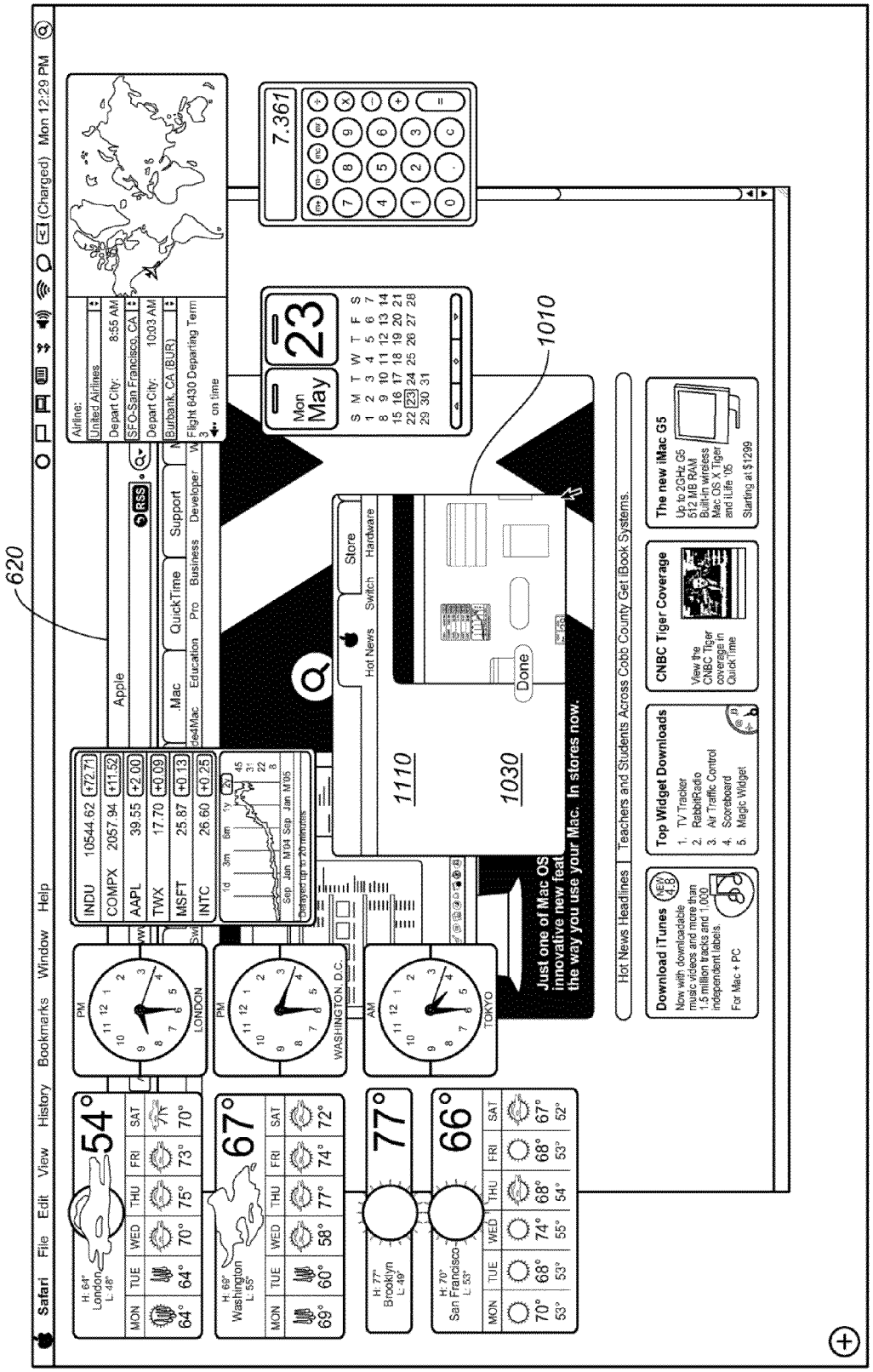
FIG. 11 is a screen shot showing a widget loaded with the selected content.
Figure 12:
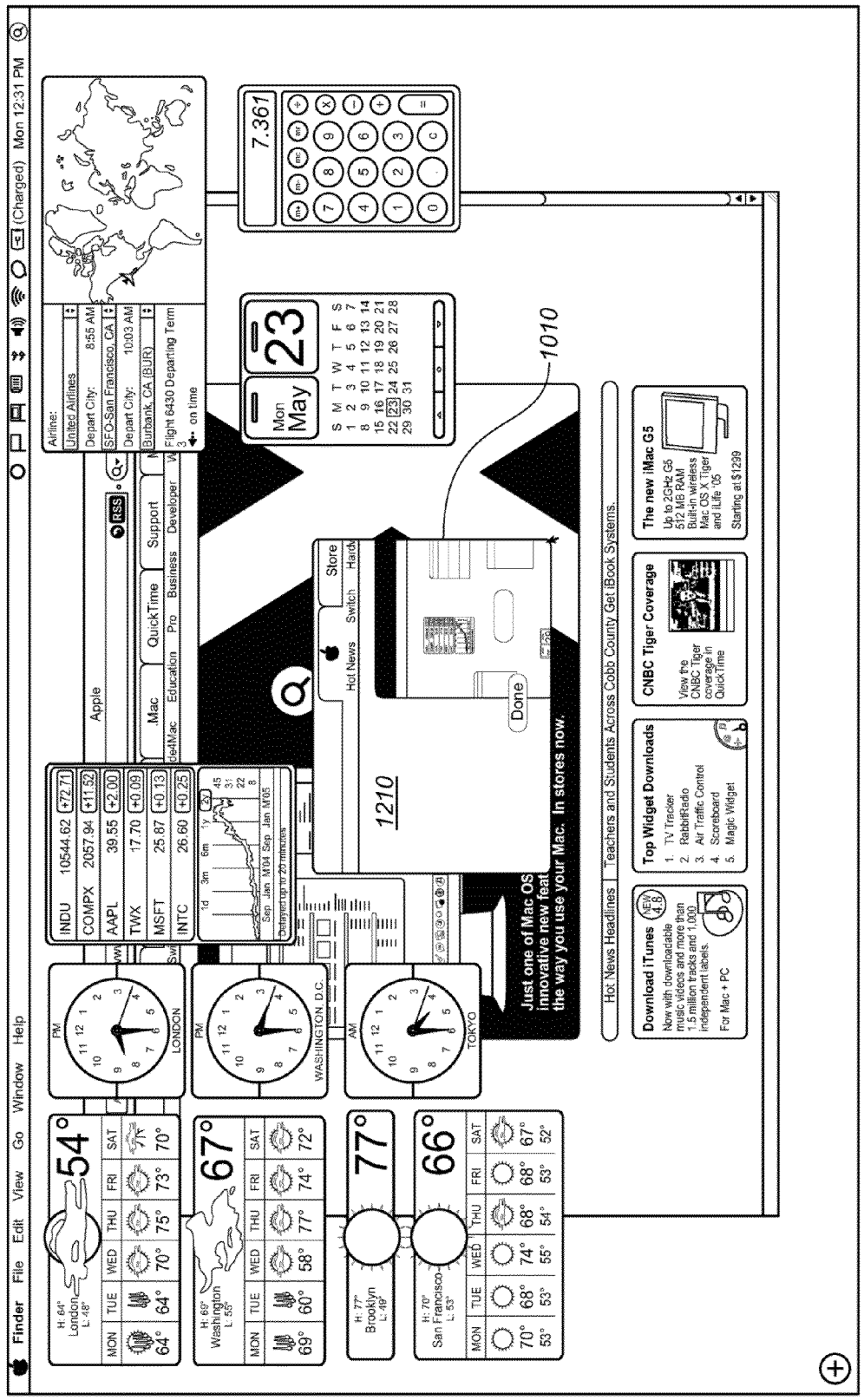
FIGS. 12-15 are a series of screen shots showing the widget of FIG. 11 being resized.
Figure 13:
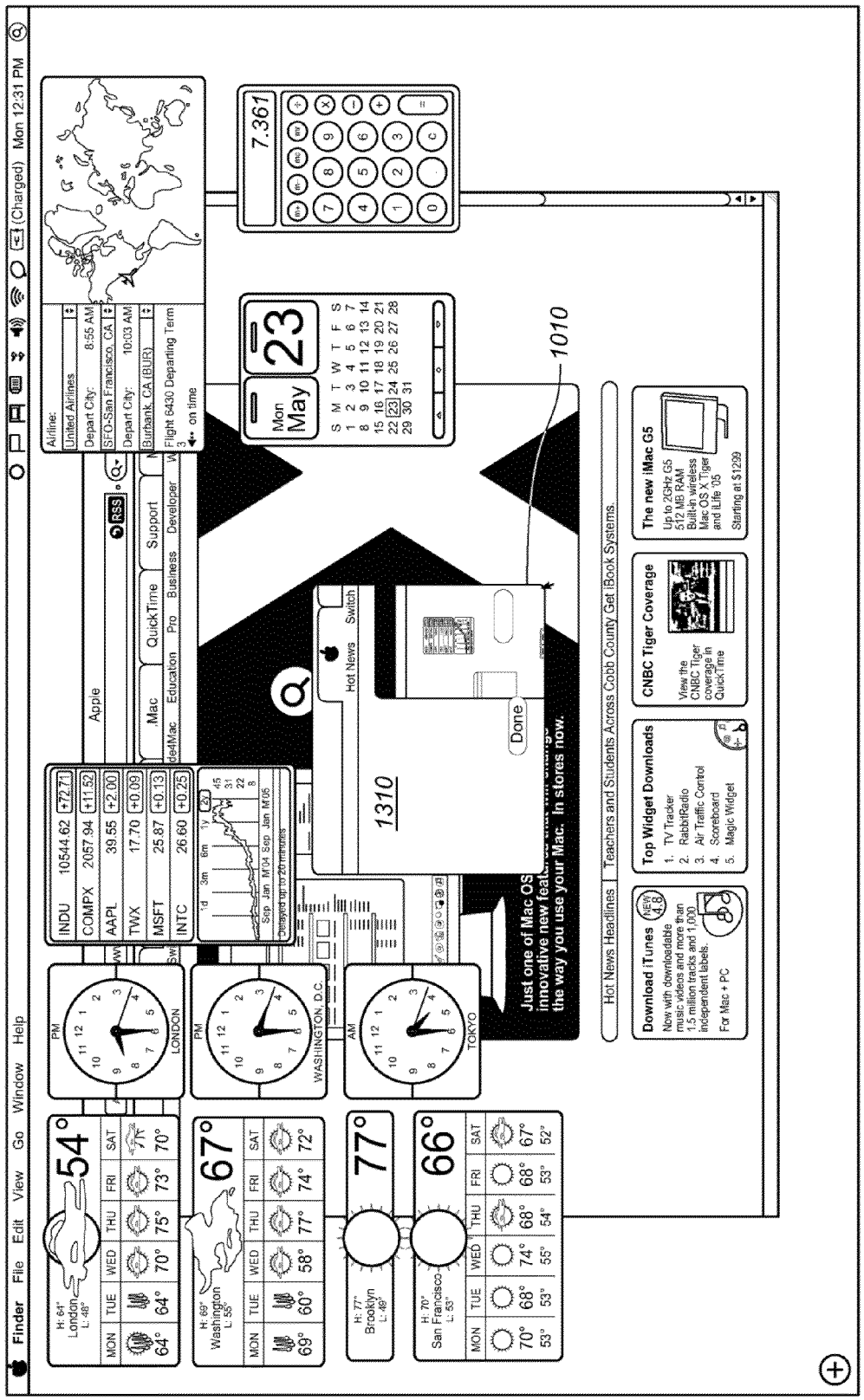
Figure 14:
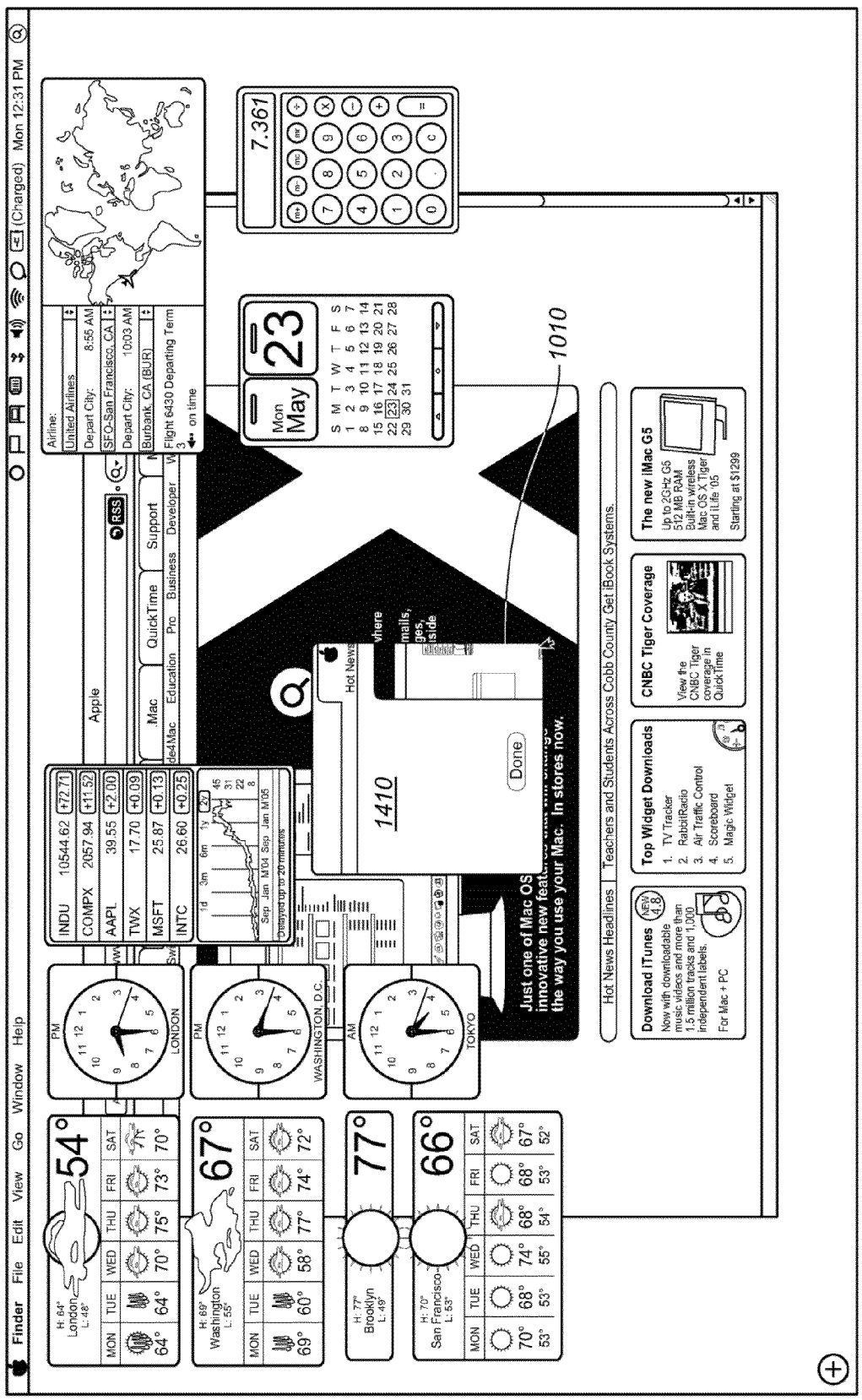
Figure 15:
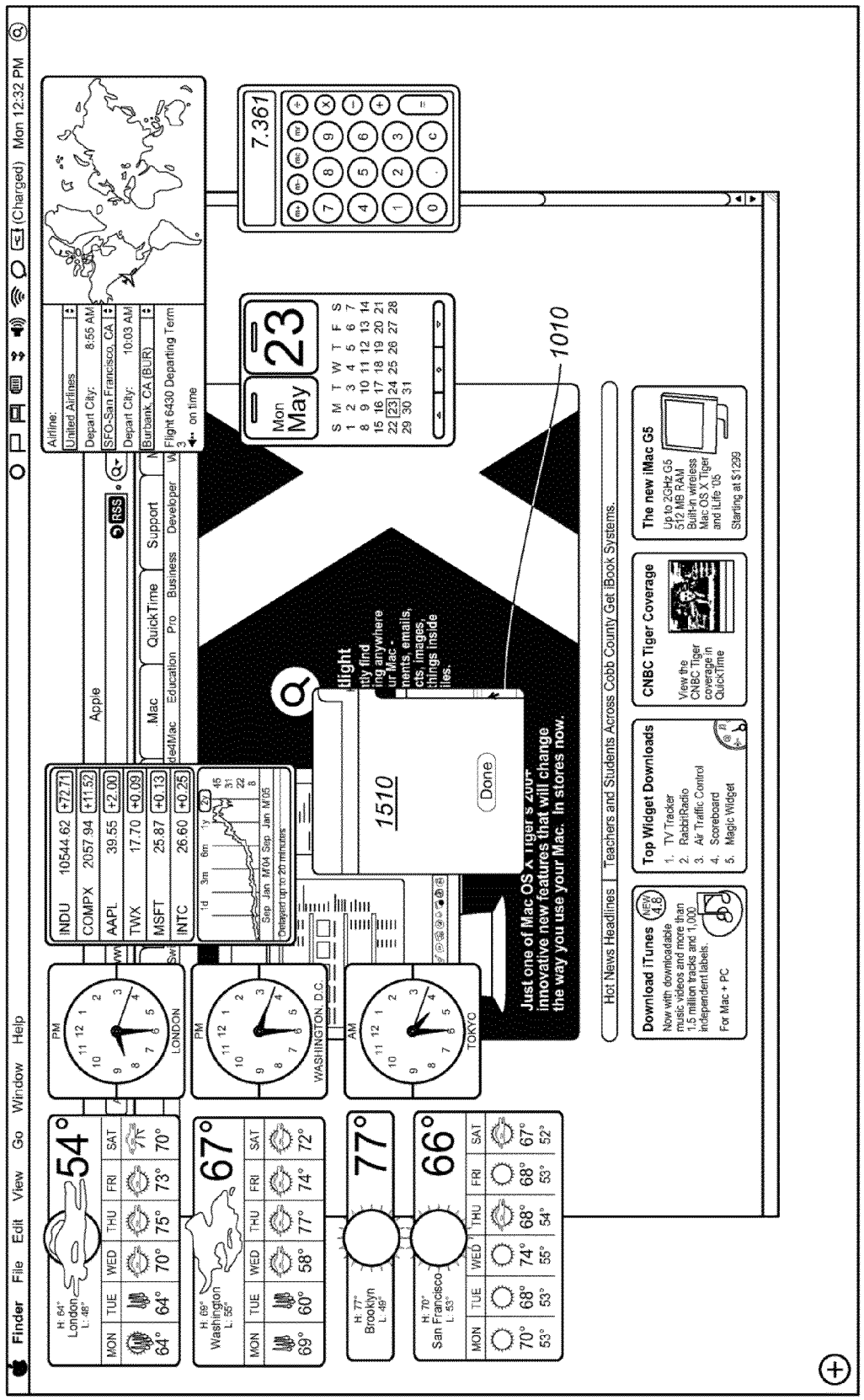
Figure 16:
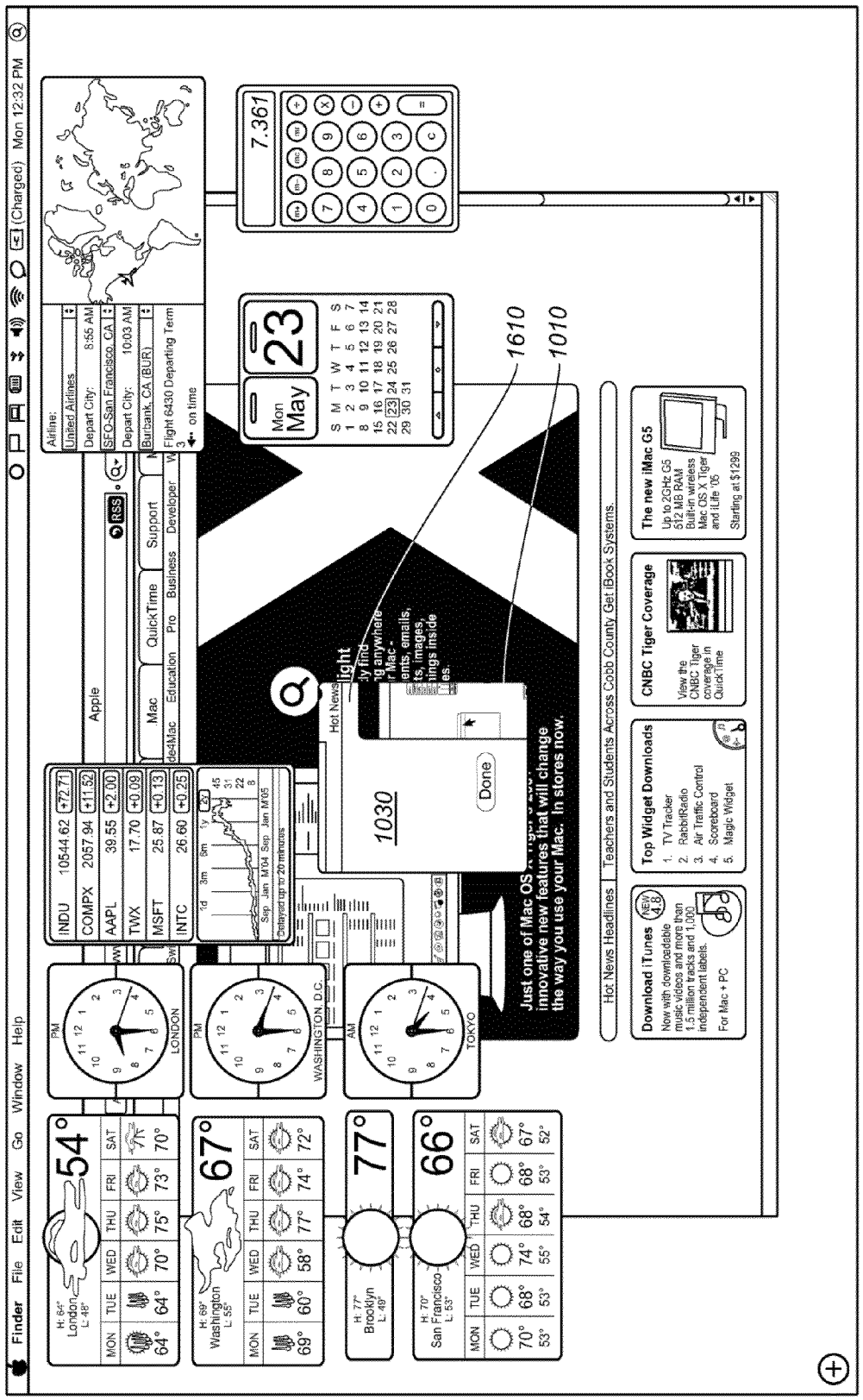
FIGS. 16-23 are a series of screen shots showing the selected content being repositioned within the widget of FIG. 15.
Figure 17:
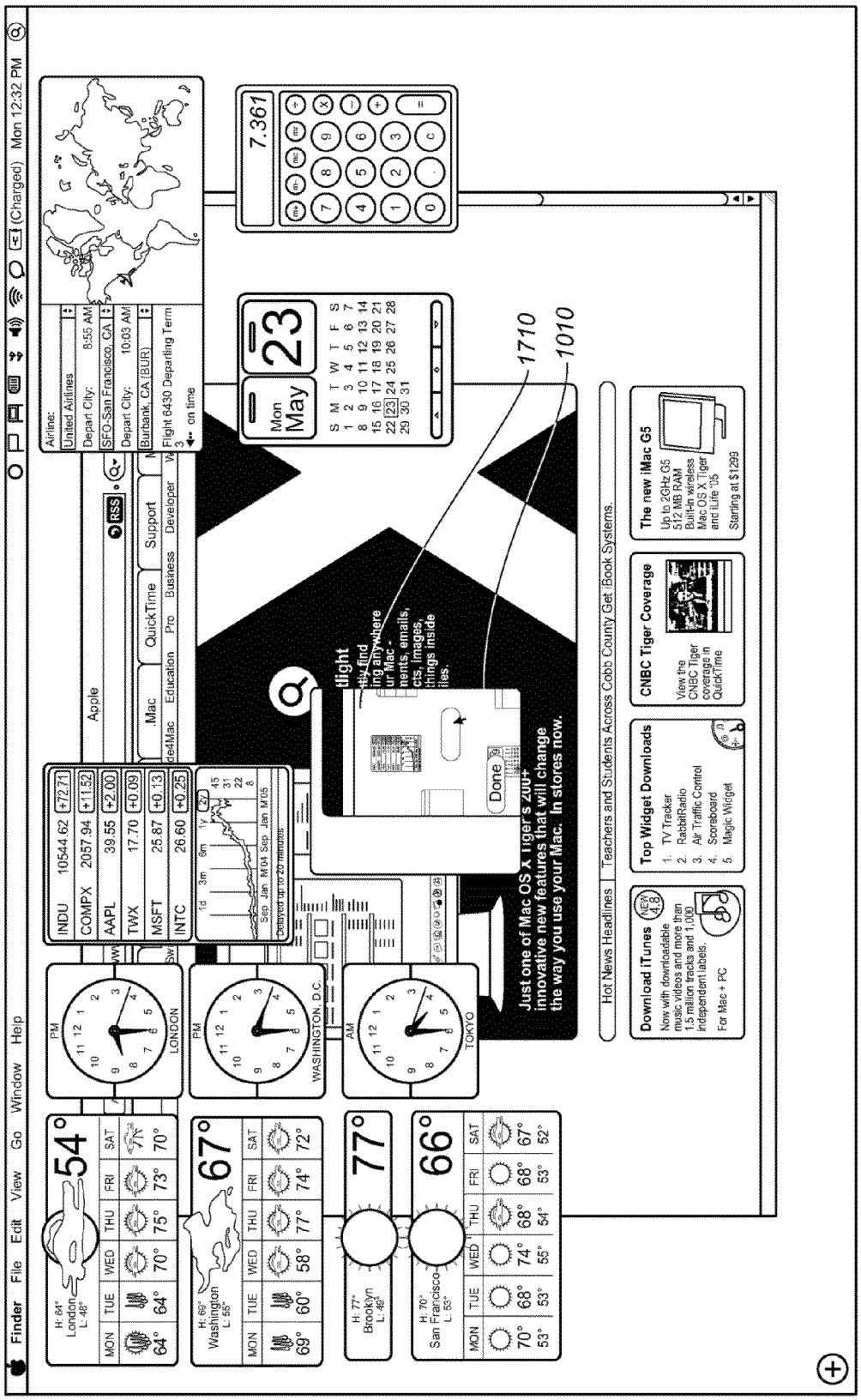
Figure 18:
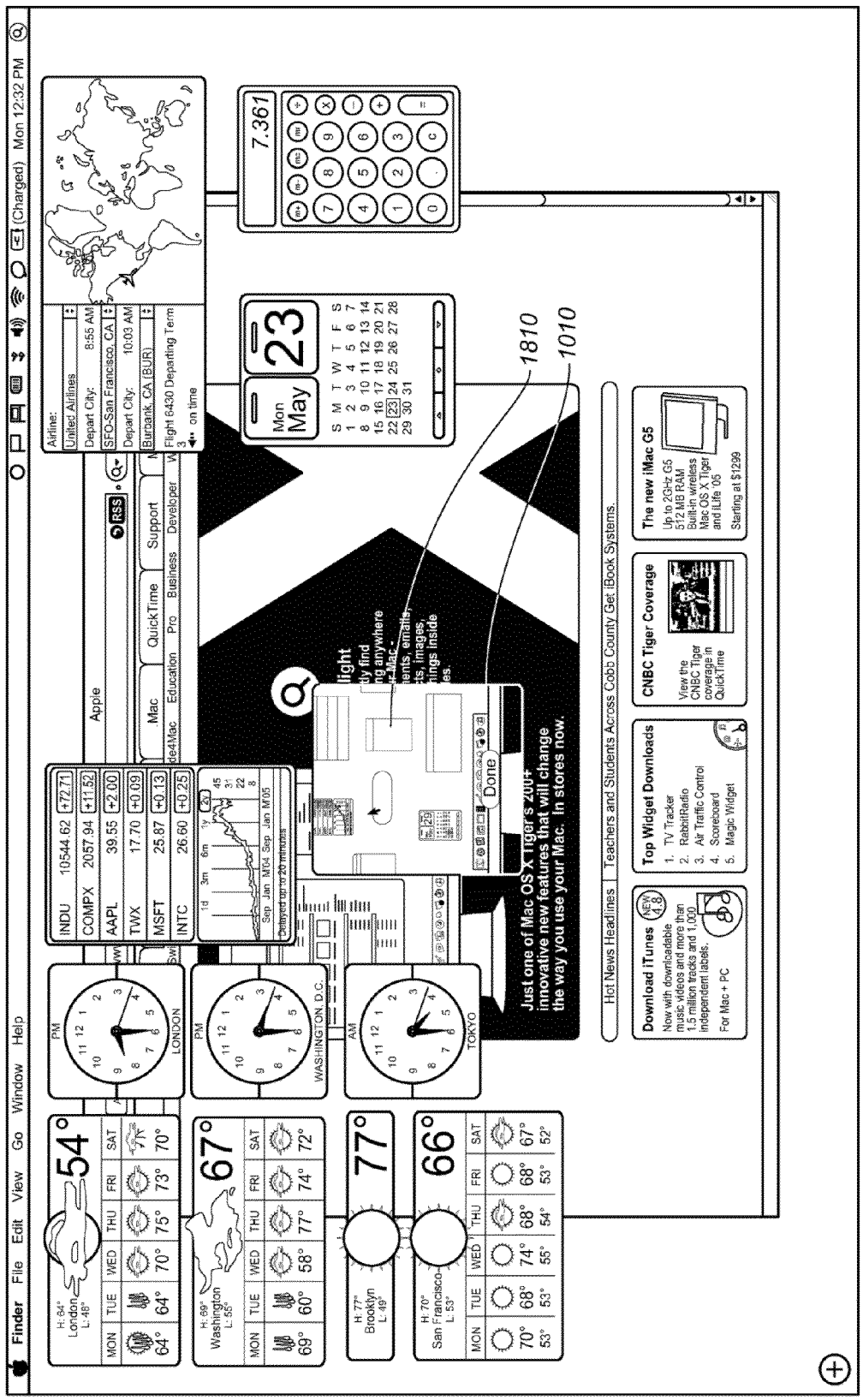
Figure 19:
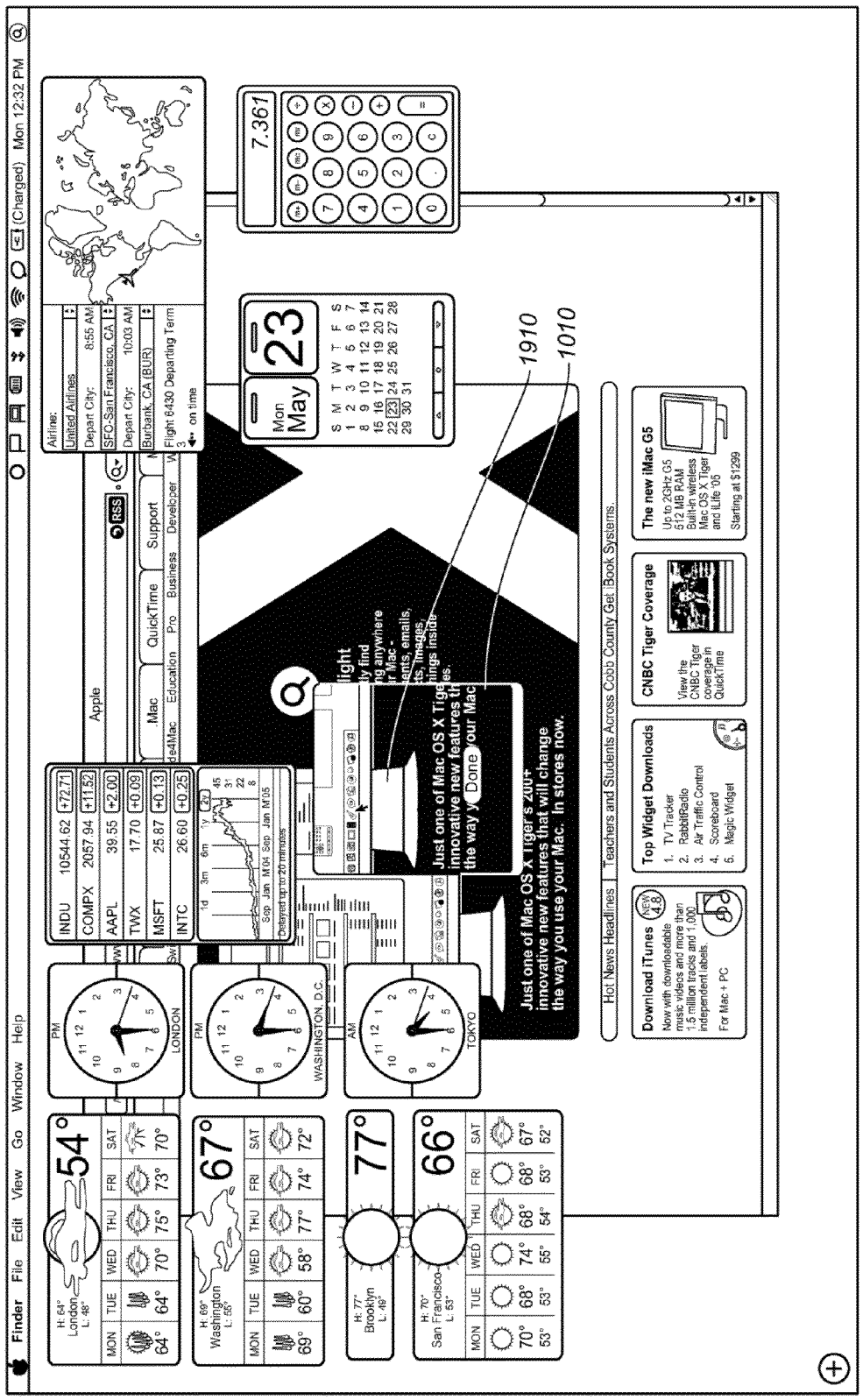
Figure 20:
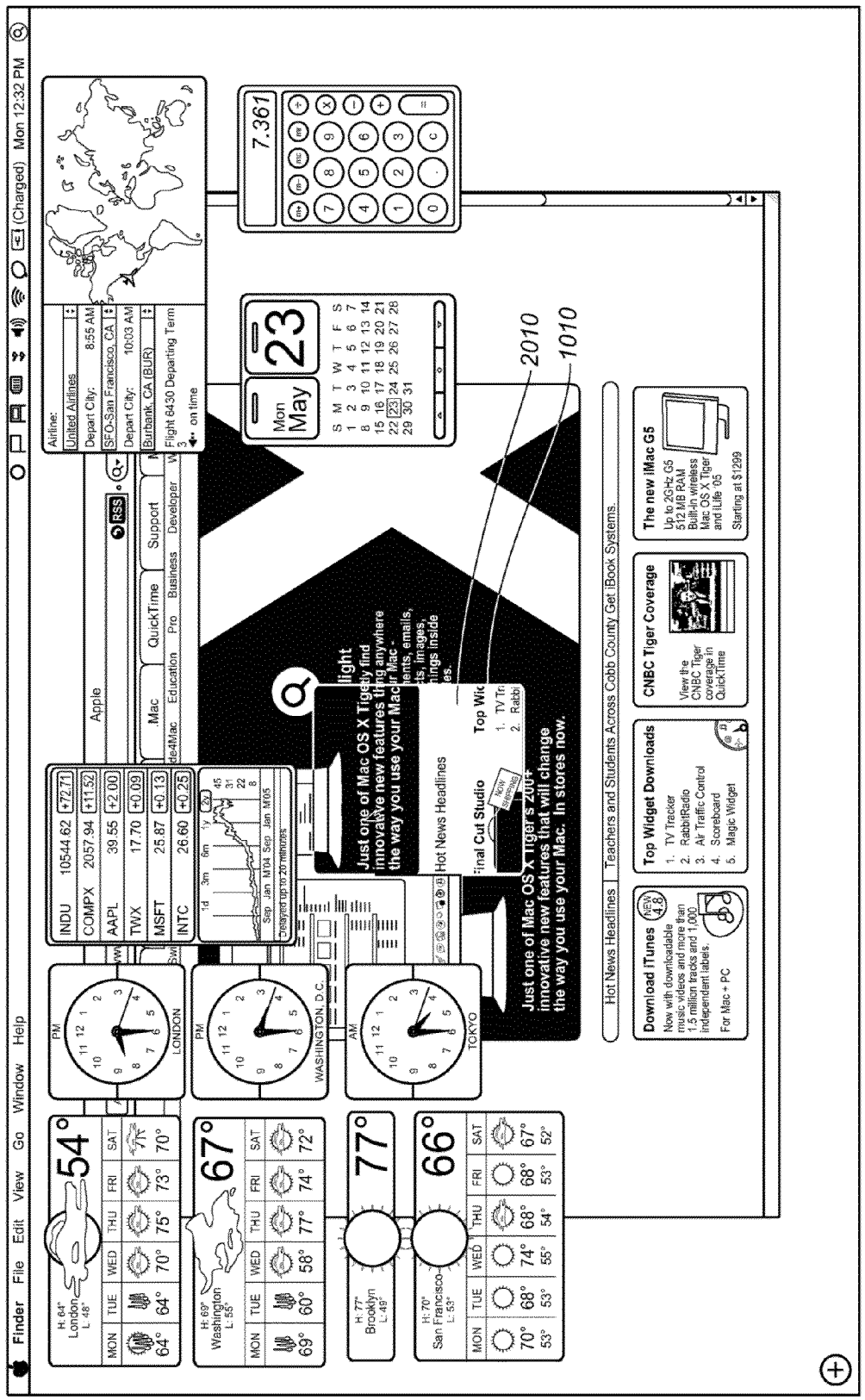
Figure 21:
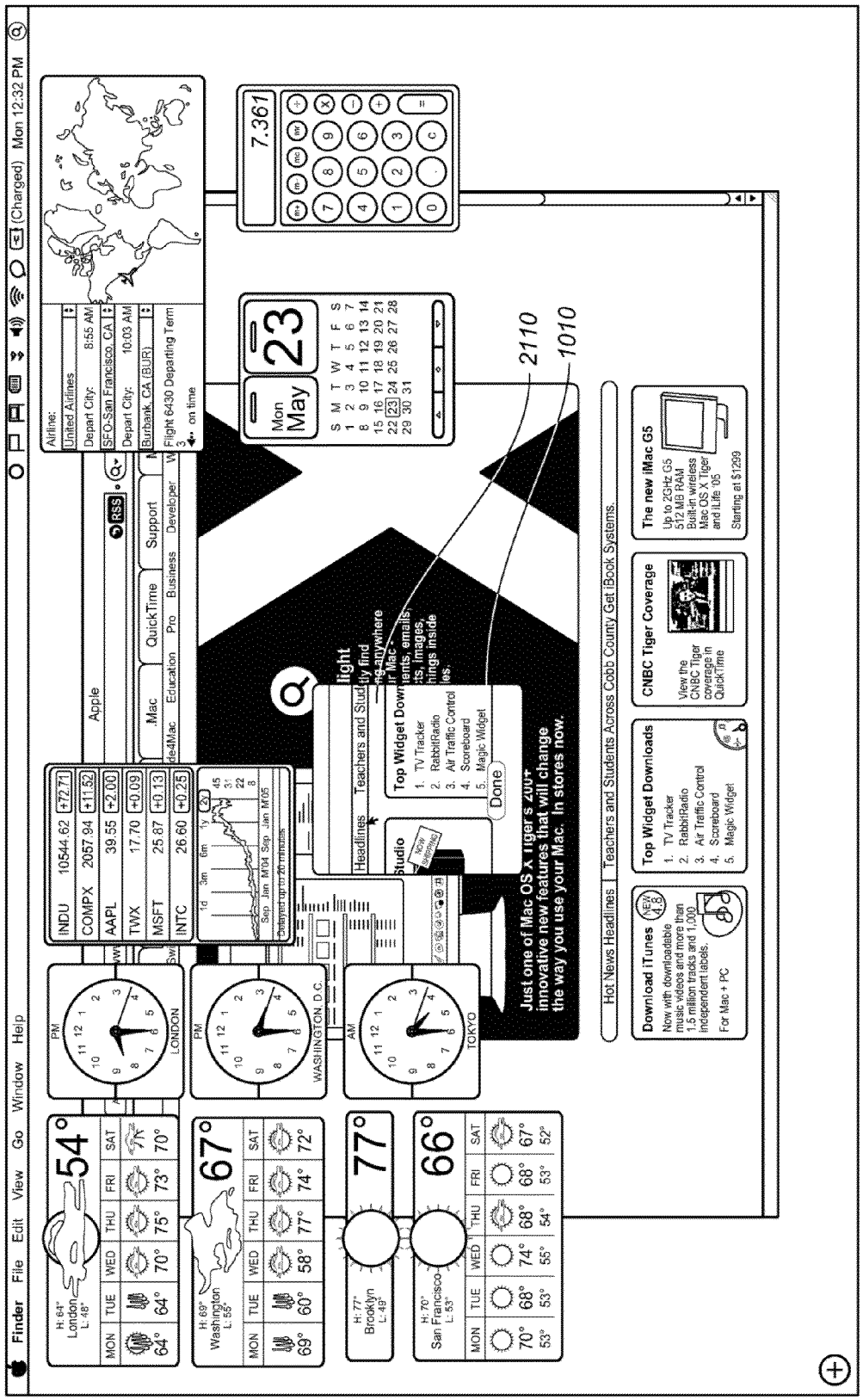
Figure 22:
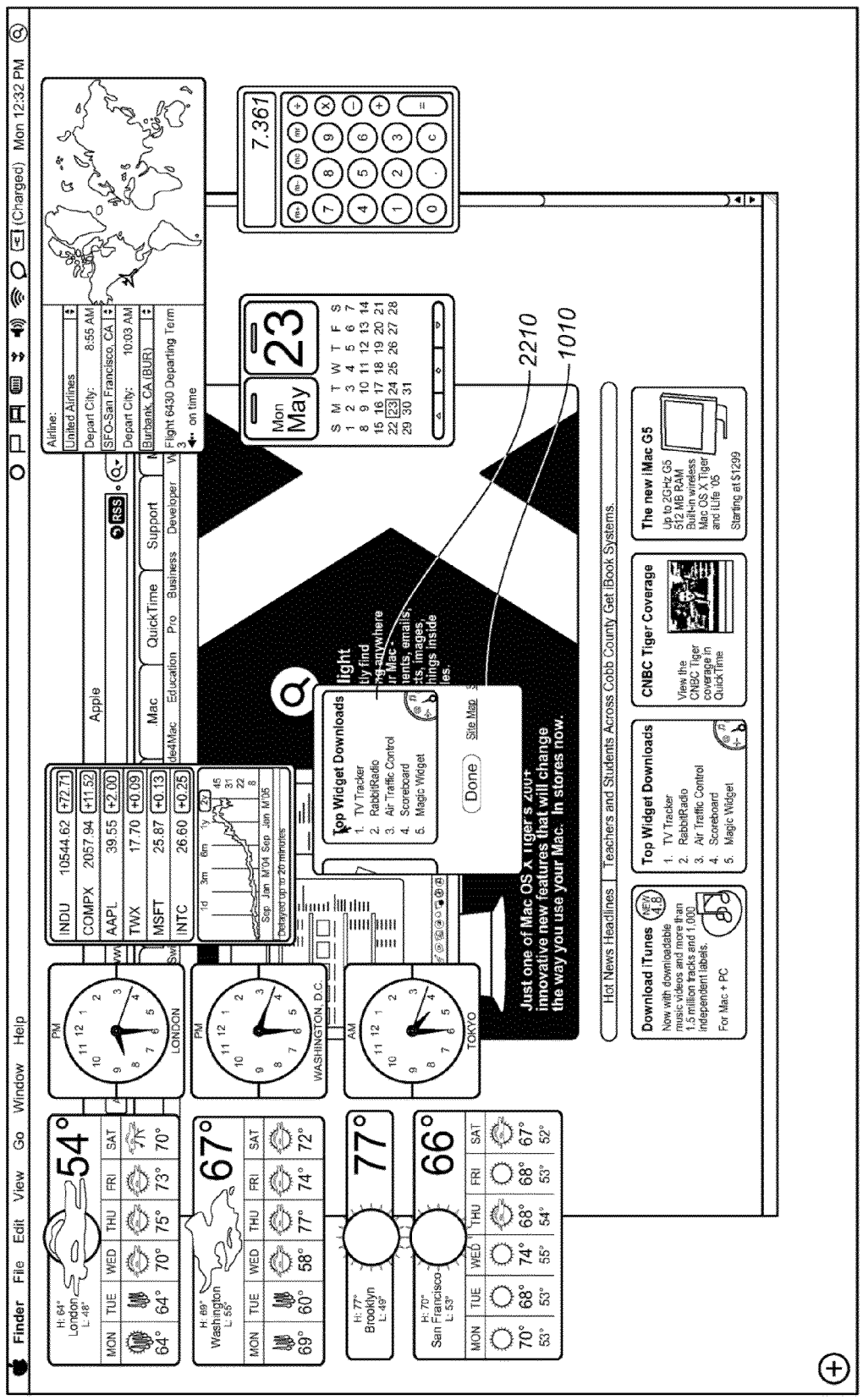
Figure 23:
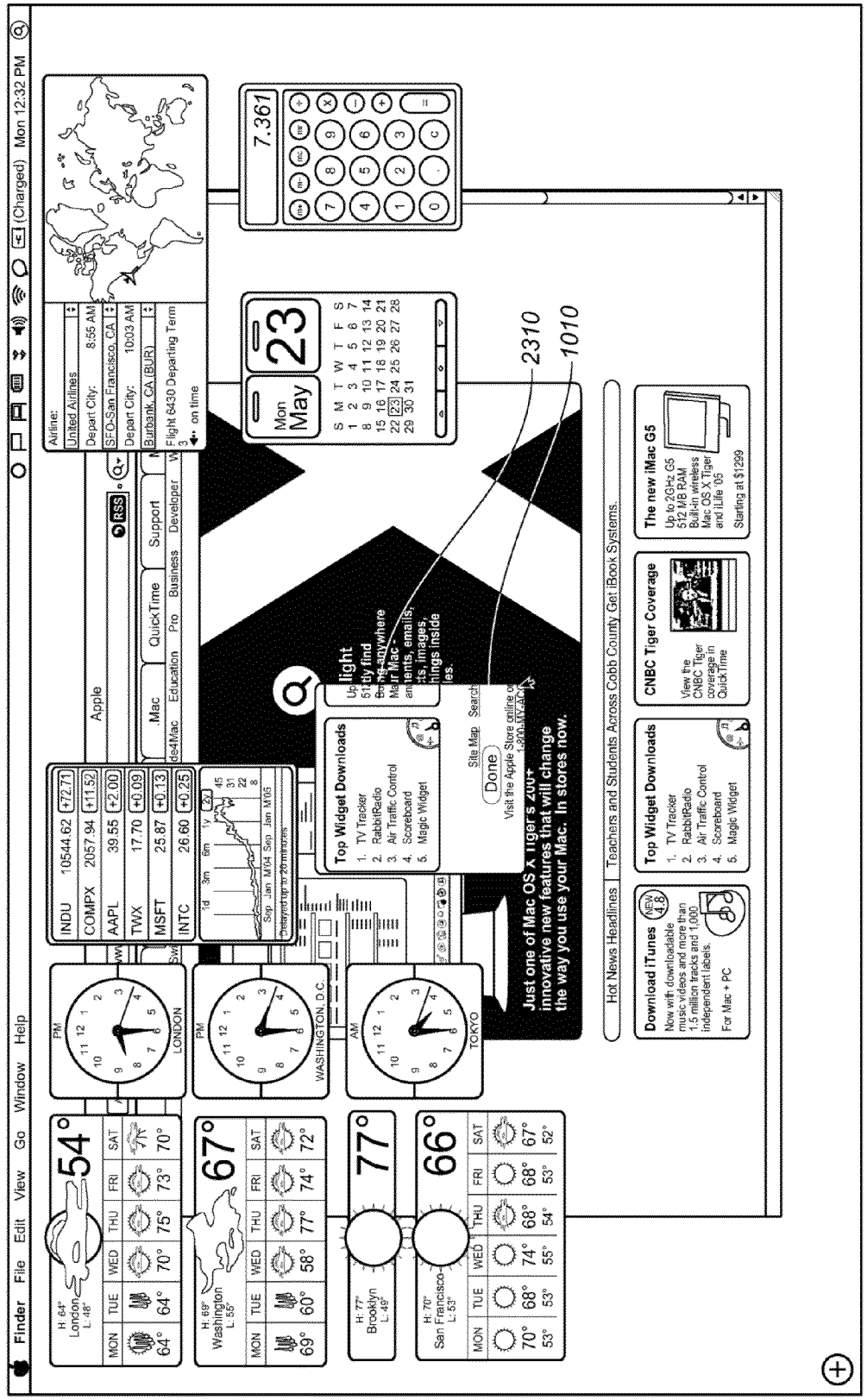

Referring to FIG. 11, a screen shot 1100 shows widget 1010 loaded with the apple.com web site to providing a webview 1110 (the term webview when accompanied by a reference number is used particularly to identify a presentation made to the user. In general, and as described as above, a webview is an instantiation of a clipping (a clipview) and contains all aspects, functional, programmatic and otherwise for creating a clipping of web content). The apple.com web site, or a portion thereof, is thus displayed in the background in Safari® application window 620 and in widget 1010. To load the apple.com web site into widget 1010, focus engine 214 may access the content directly from the Safari® application or access the content identifier and download the apple.com web page. Rendered data may be available from the Safari® application, or render engine 218 may render the apple.com web page. Presentation engine 250 may then display the rendered apple.com web page using a default positioning in which the top left corner of the apple.com web page is also positioned in the top left corner of view portion 1030 of widget 1010.

Referring to FIGS. 12-15, screen shots 1200-1500 show widget 1010 being resized to produce a series of webviews 1210, 1310, 1410, and 1510. Webviews 1210, 1310, 1410, and 1510 are displayed in a view window The bottom right corner of widget 1010 is being moved up and to the left to produce webviews 1210-1510 of progressively smaller sizes. Widget 1010 may be resized by a user using, for example, a mouse to drag a corner to a new location. Other methods or tools may be used to position, focus, and ultimately identify an area of interest in one or more web pages. For example, clipping tools, selection tools, and navigation tools can be used to locate, present and select desired portions of content to be included in an area of interest, which is ultimately displayed in the webview. In one instantiation, a clip board of clipped content is maintained to allow a user to select and gather non-contiguous or un-related content (e.g., non-contiguous portions of one web page, or portions from multiple web pages). The clip board can be associated with identification engine 210 or focus engine 214 of FIG. 2.

Referring to FIGS. 16-23, screen shots 1600-2300 show the apple.com web site being repositioned within widget 1010 so that the portion of the apple.com web site that is displayed in widget 1010 is modified. The content may be repositioned by the user using, for example, a mouse to drag the displayed content across view portion 1030 of widget 1010, or scroll bars (not shown). The content of the apple.com web site appears to gradually move up and to the left in widget 1010, producing a series of webviews 1610-2310 until the area of interest in the apple.com web site is positioned in the top left corner of widget 1010. Other methods or tools may be used to reposition, focus, and ultimately identify an area of interest in one or more web pages.

Figure 24:
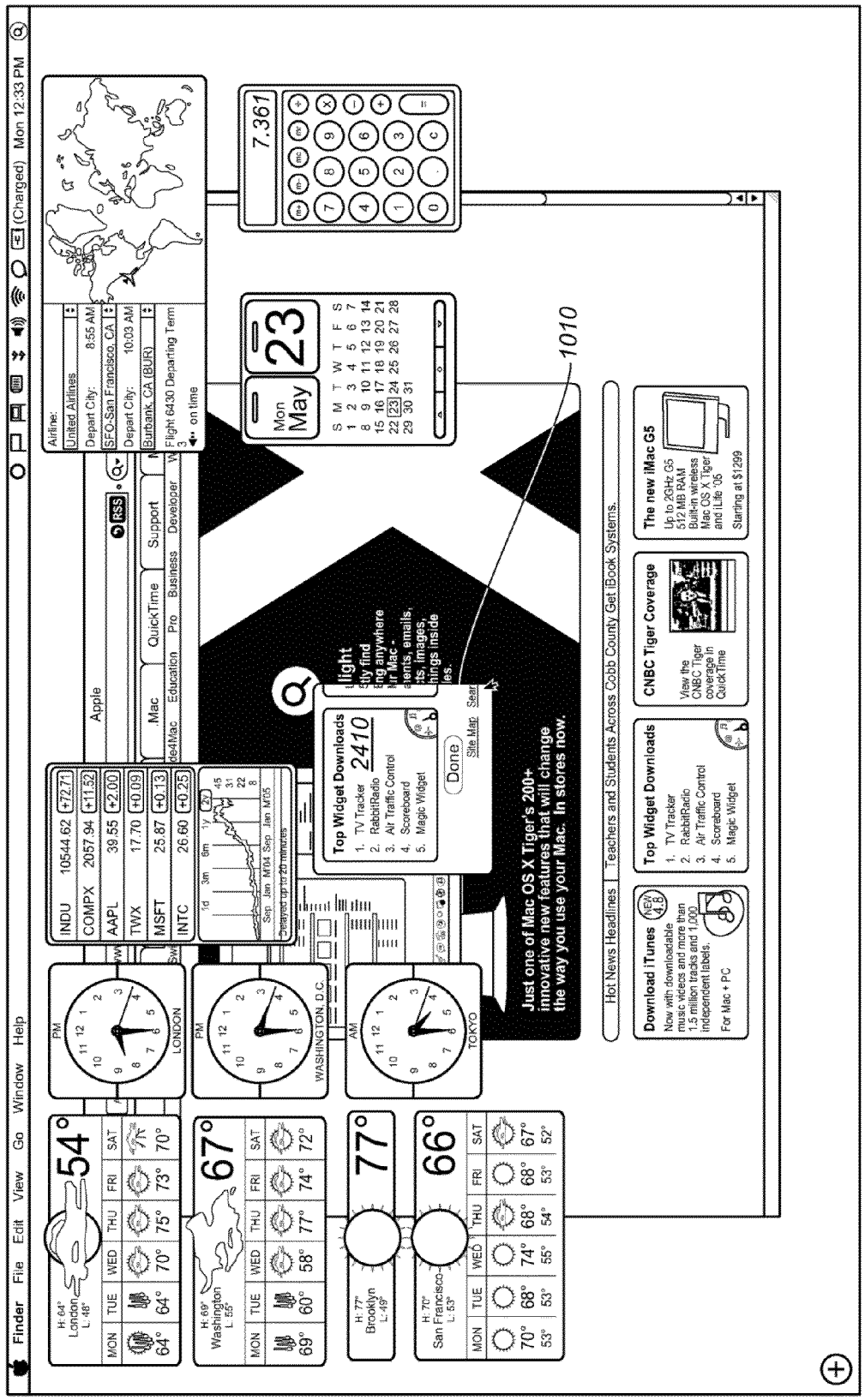
FIGS. 24-26 are a series of screen shots showing the widget of FIG. 23 being resized.
Figure 25:
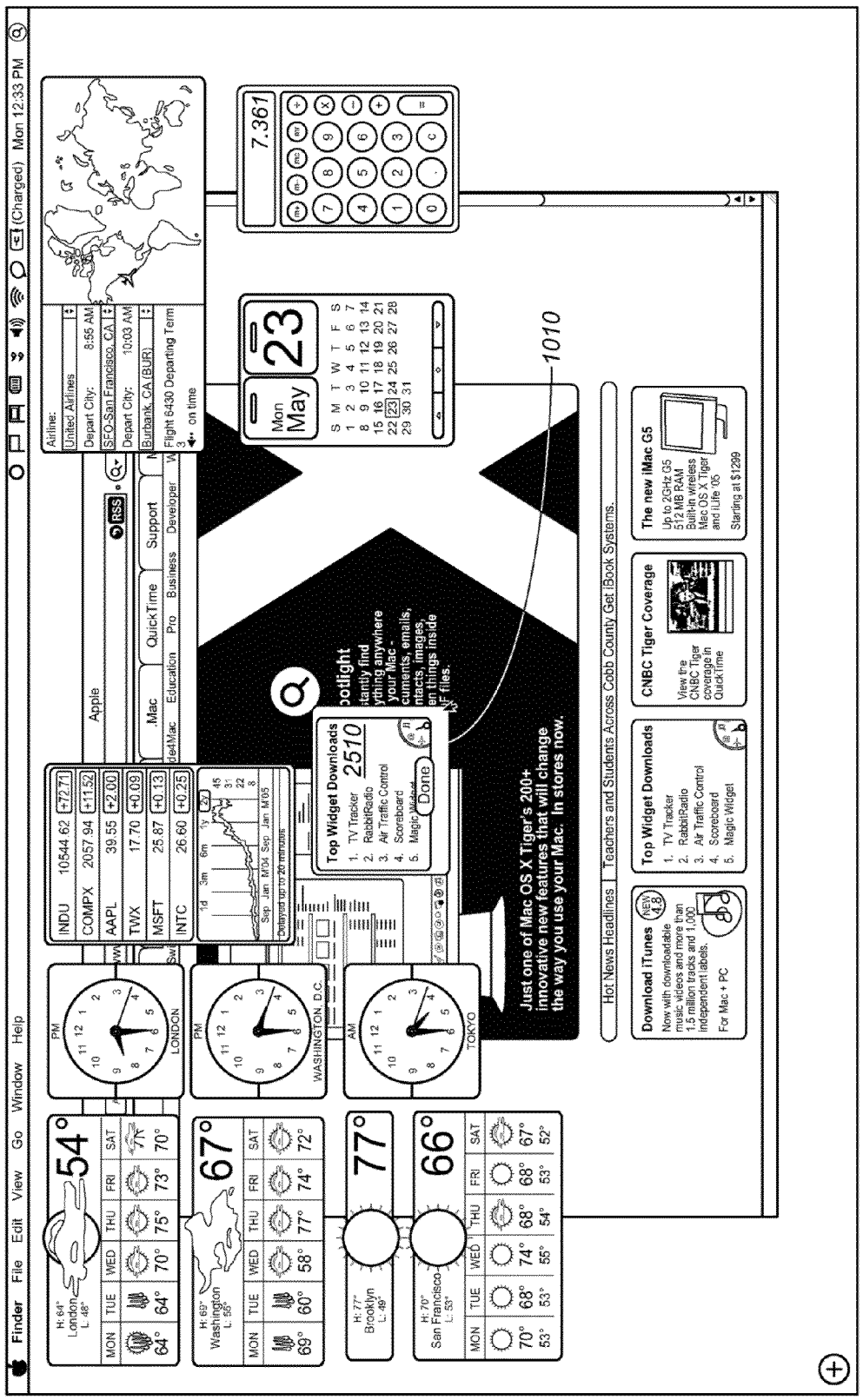
Figure 26:
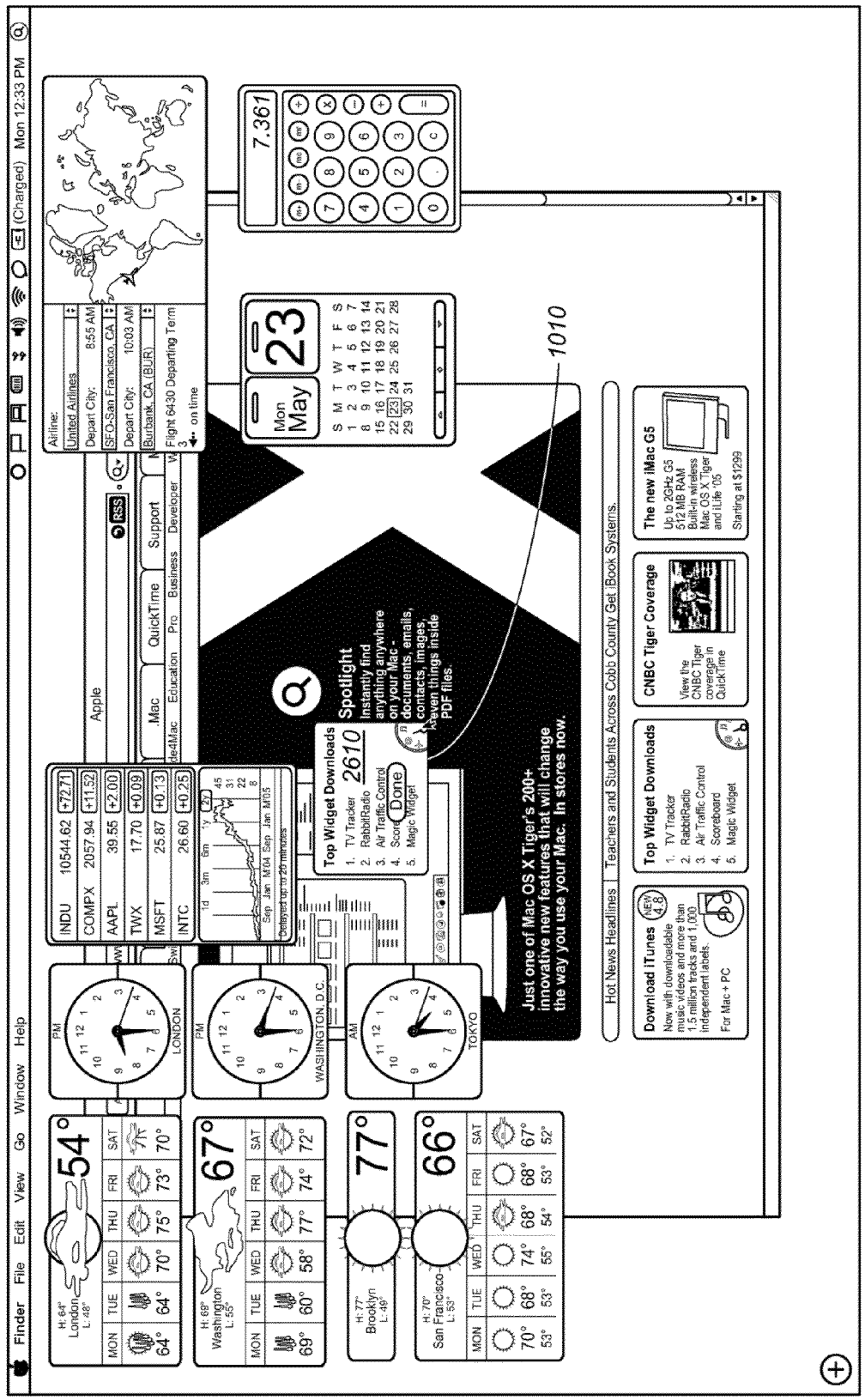

Referring to FIGS. 24-26, screen shots 2400-2600 show widget 1010 being further resized to produce a series of webviews 2410, 2510, and 2610. The bottom right corner of widget 1010 is being moved up and to the left to produce webviews 2410-2610 of progressively smaller sizes. Widget 1010 is being decreased in size to further select the area of interest that will be displayed in widget 1010. The process of resizing widget 1010 after the area of interest is within the display portion of widget 1010 may be referred to as cropping widget 1010 around the area of interest. As with resizing widget 1010 in FIGS. 12-15, widget 1010 may be cropped by using various controls, such as, for example, a mouse to click and drag a corner or a side of frame 1040.

Figure 27:
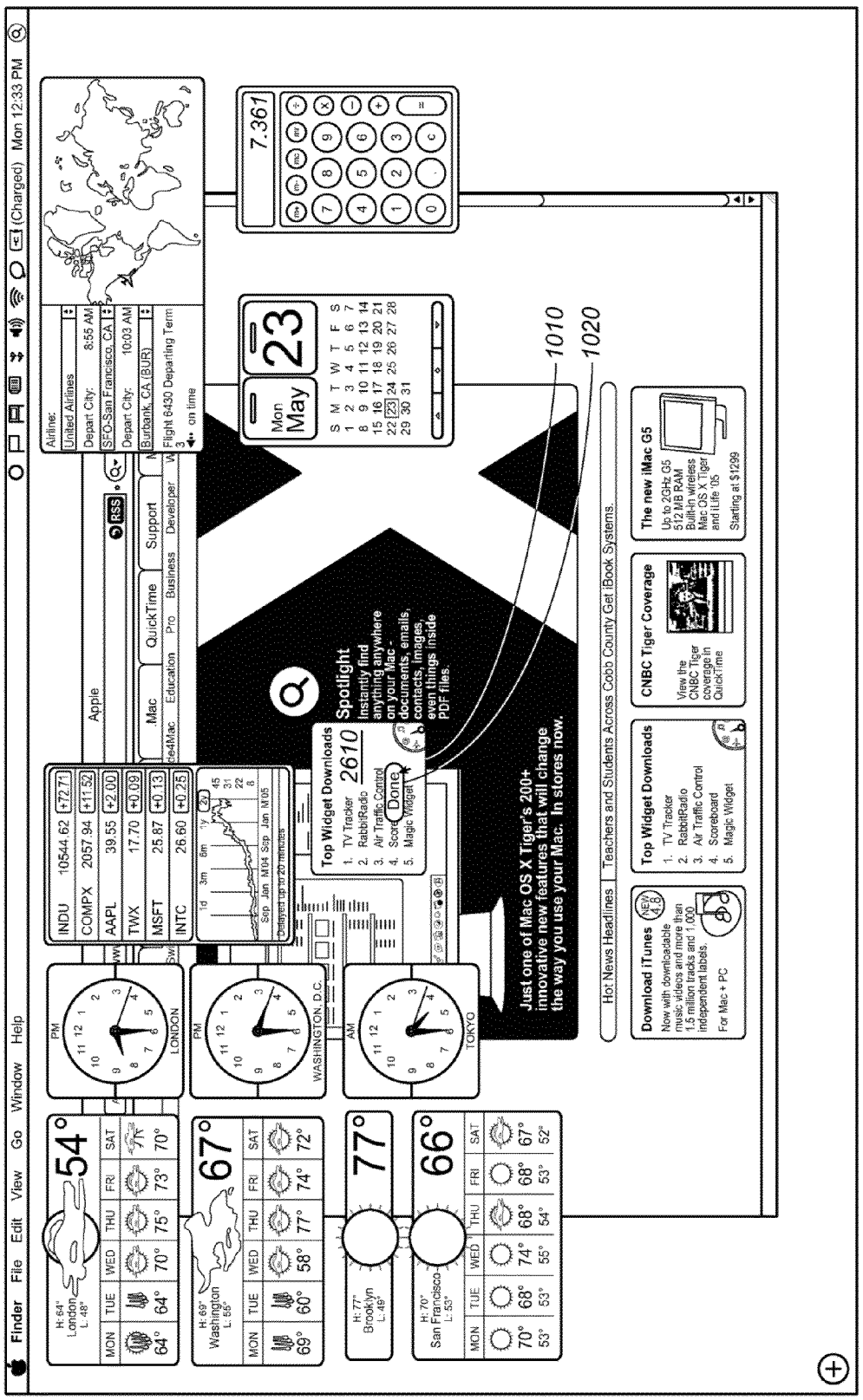
FIG. 27 is a screen shot showing a final step in creating a widget.

Referring to FIG. 27, a screen shot 2700 shows a cursor over Done button 1020 in webview 2610 to select Done button 1020. After Done button 1020 is selected, configuration of widget 1010 is complete. Presentation engine 250 may receive a user's selection of Done button 1020 and pass the input to focus engine 214. Focus engine 214 may then close the configuration process and store all of the information characterizing widget 1010. The information may be stored and saved, for example, as a widget file or other data structure for later access if widget 1010 is ever closed and needs to be reopened. Focus engine 214 also may name the widget file, and may, for example, select a name by default or prompt the user, using presentation engine 250, for a name.

Figure 28:
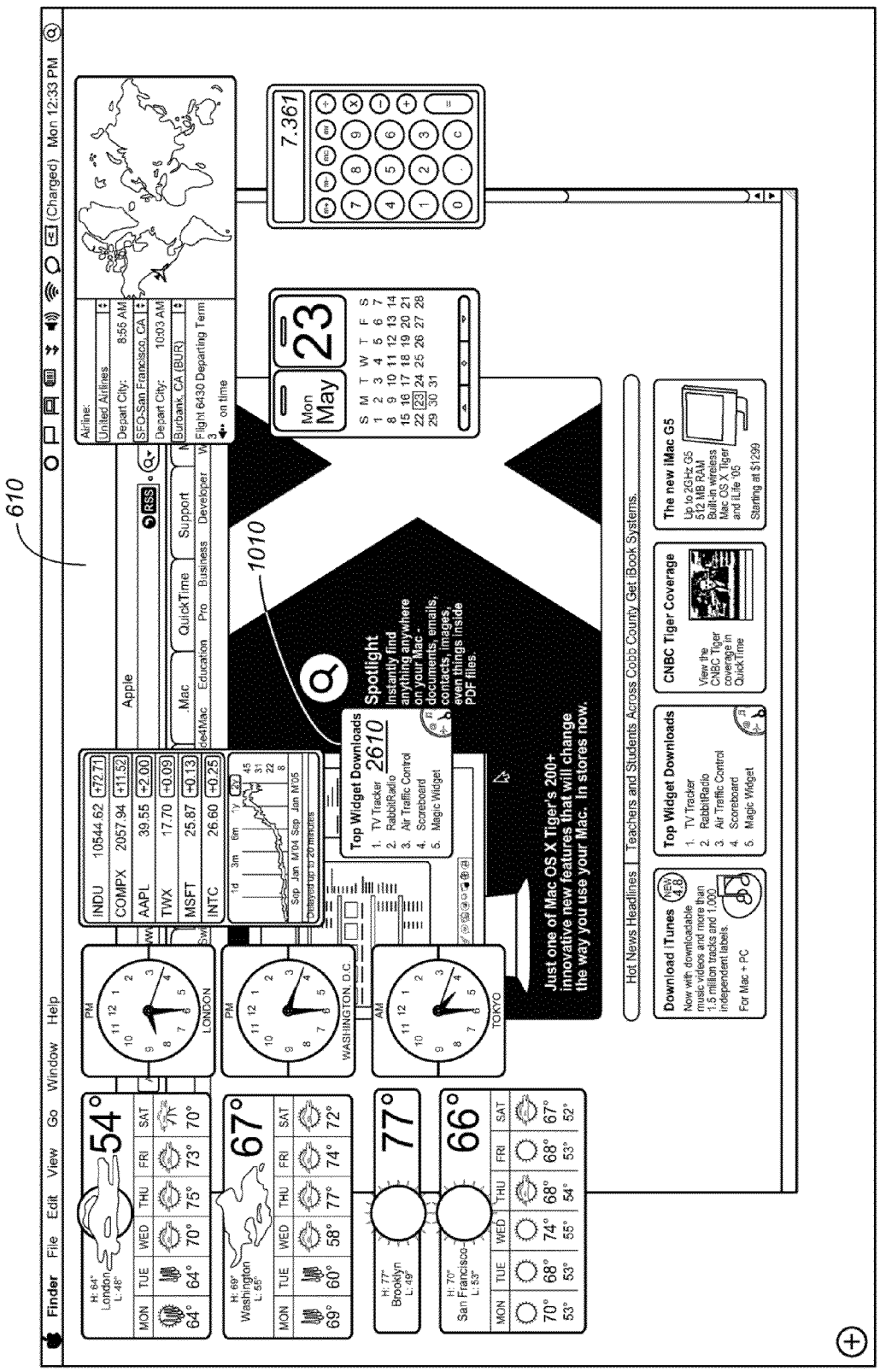
FIG. 28 is a screen shot showing a completed widget after the final step of FIG. 27.

Referring to FIG. 28, a screen shot 2800 shows the result after selection of Done button 1020 in screen shot 2700. After selecting Done button 1020, the configuration of widget 1010 is complete and widget 1010 appears as shown in webview 2610 of screen shot 2800. A user may move widget 1010 to another location on dashboard 610 by, for example, using a drag and drop method with a mouse, or selecting and using arrow keys on a keyboard or using other positioning tools.

Figure 29:
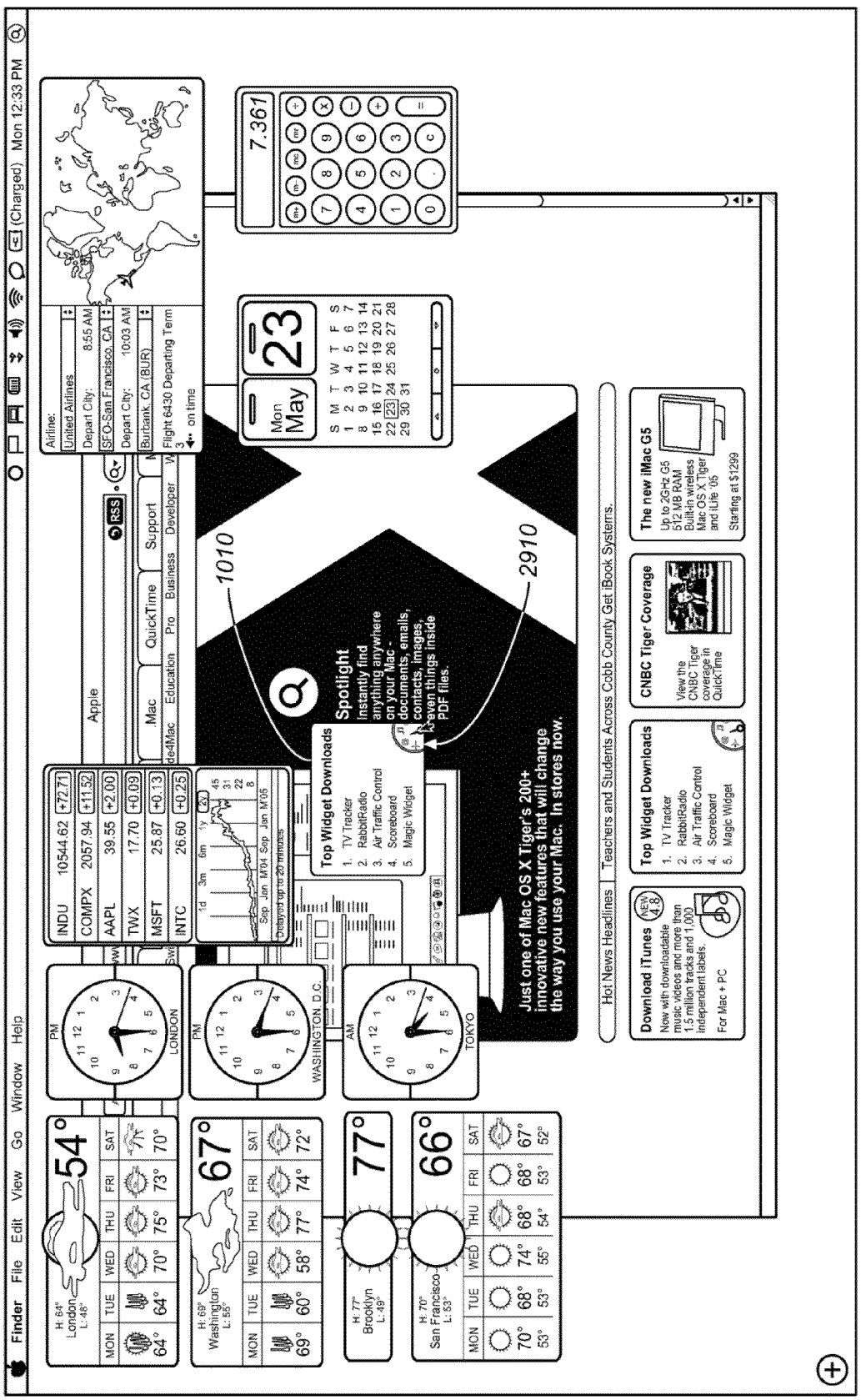
FIG. 29 is a screen shot showing selection of a control for accessing a preferences interface.

Associated with a webview widget are various preferences. Preferences include, for example, and as discussed above, a refresh rate, a content source location, an interactivity activation preference, a refocus preference and other preferences. A webview widget includes a mechanism for setting and, typically, for viewing preferences. The mechanism may be a default mechanism for setting, or a mechanism for allowing a user to view and set/modify preferences. Referring to FIG. 29, a screen shot 2900 shows a cursor over a control 2910 that, upon selection by the cursor, allows display of one or more preferences. The preference(s) may be displayed, for example, by flipping widget 1010 over using an animation technique to reveal various preferences and to reveal an interface to modify the preference(s).

Figure 30:
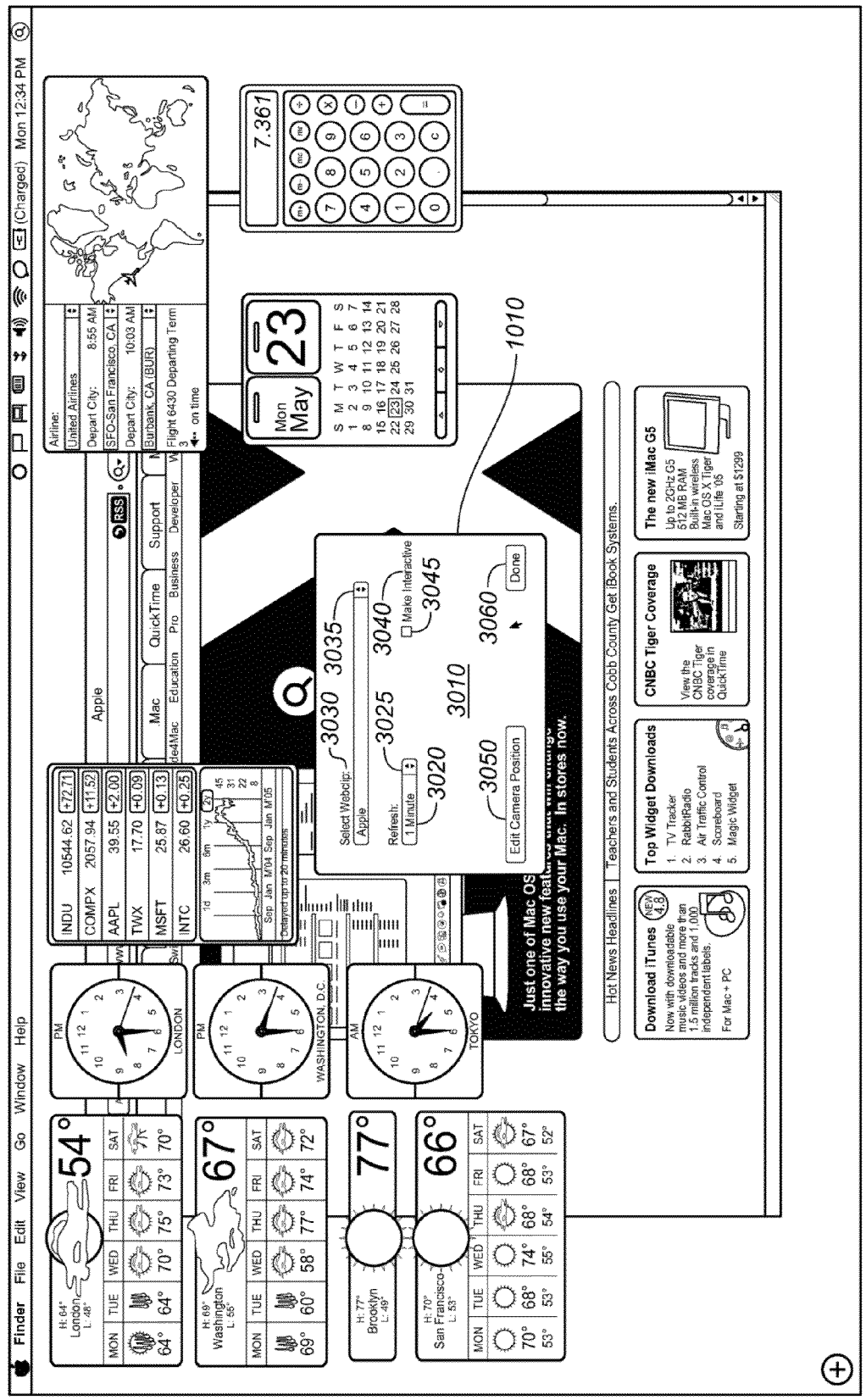
FIG. 30 is a screen shot showing a preferences interface on the widget of FIG. 29.

Referring to FIG. 30, a screen shot 3000 shows widget 1010 flipped over, after selection of control 2910 from screen shot 2900, to reveal a preferences side 3010. In the implementation shown in FIG. 30, preferences side 3010 includes a refresh preference 3020, a web clip selection preference 3030, an interactivity preference 3040, a camera position selection preference (the refocus preference described above that allows for the redefinition of the view presented in the clipping) 3050, and a Done button 3060. Preference selections may be viewed, for example, by clicking on a web clip control 3035 or a refresh control 3025 to pull down a menu of possible selections, by clicking on a check box 3045 that is part of interactivity preferences 3040 to toggle the selection, or by clicking on the preference button itself in the case of camera position selection preference 3050 to activate a selection window.

Figure 31:
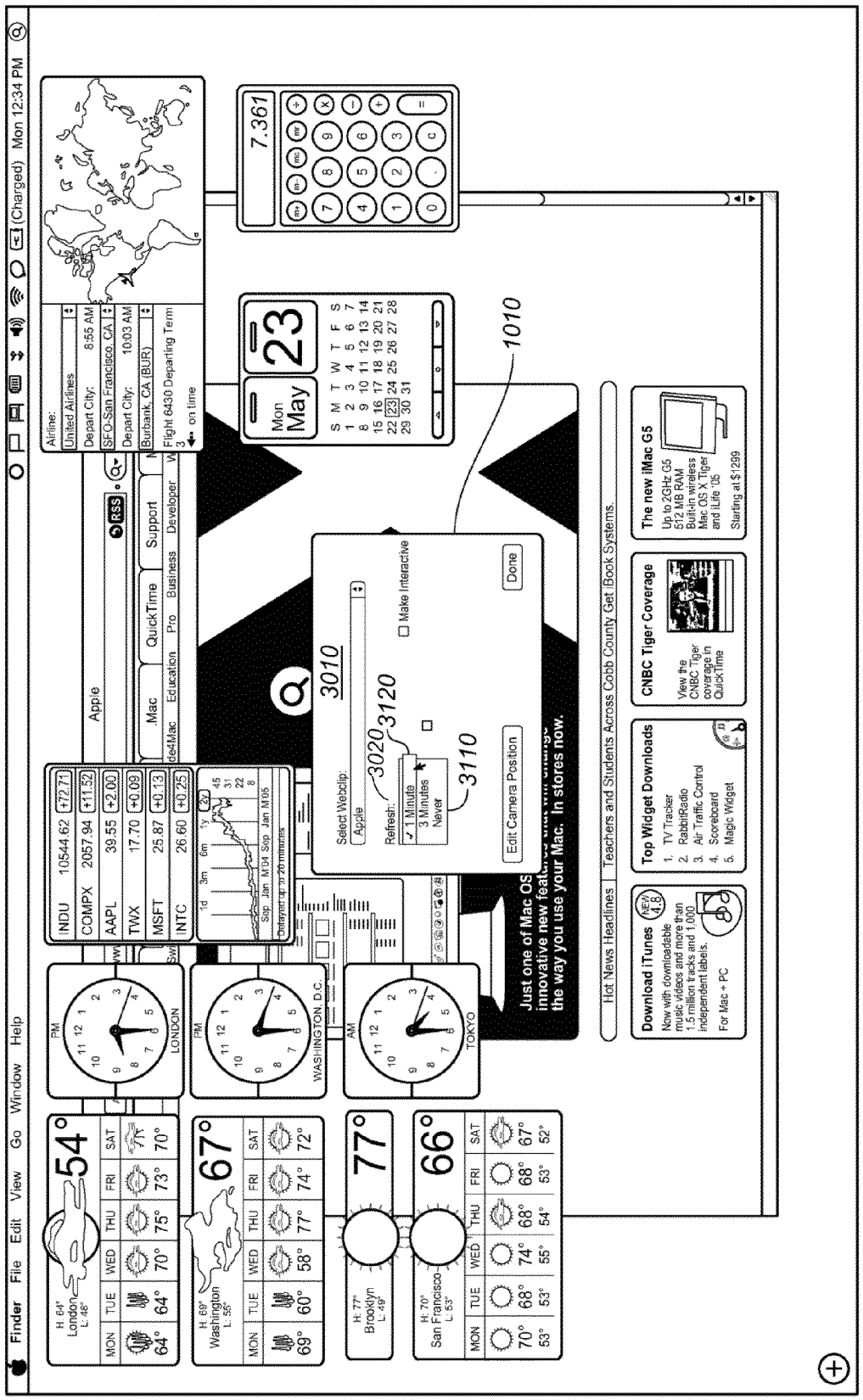
FIGS. 31-33 are a series of screen shots showing preference lists accessed from the preferences interface of FIG. 30.
Figure 32:
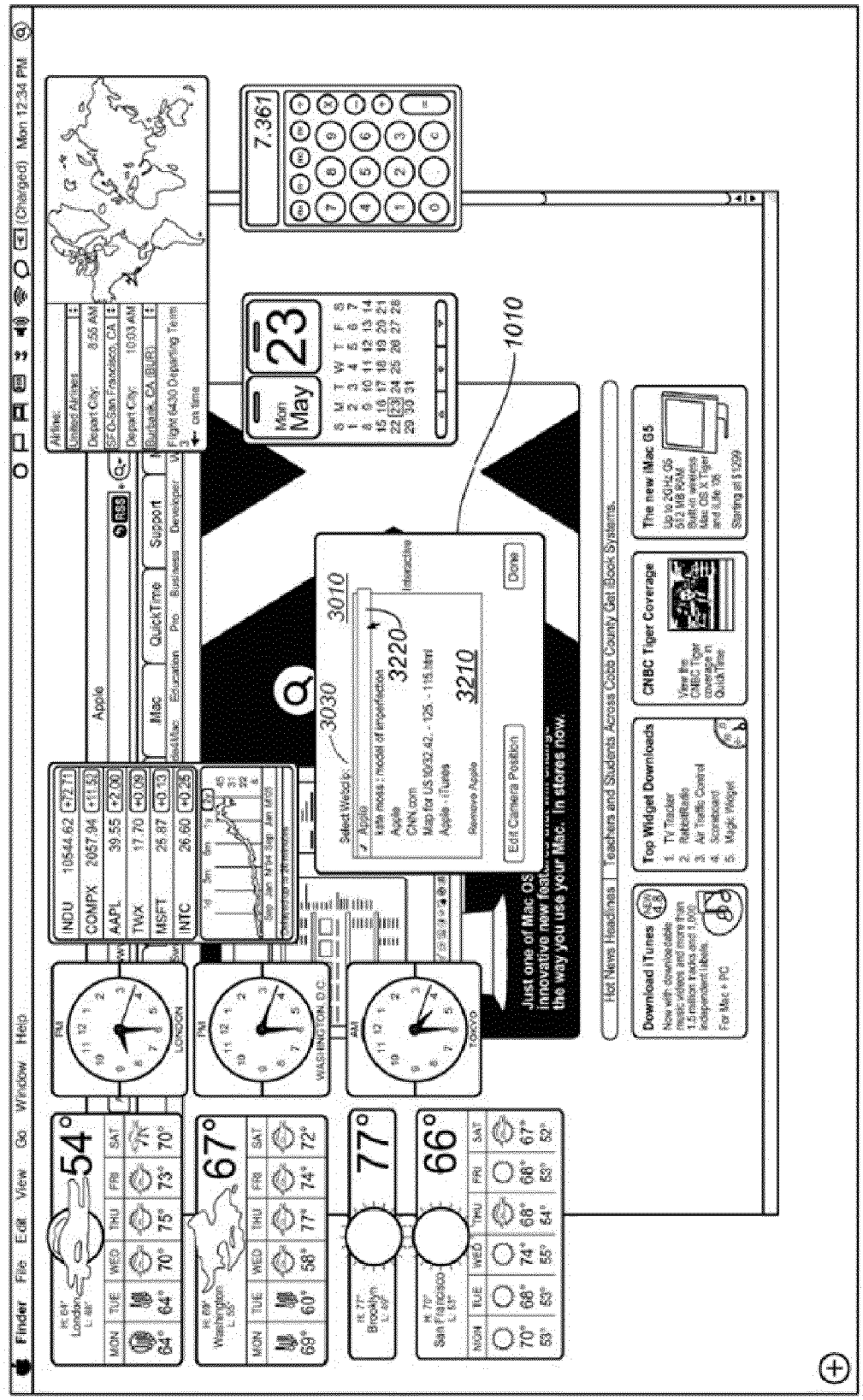
Figure 33:
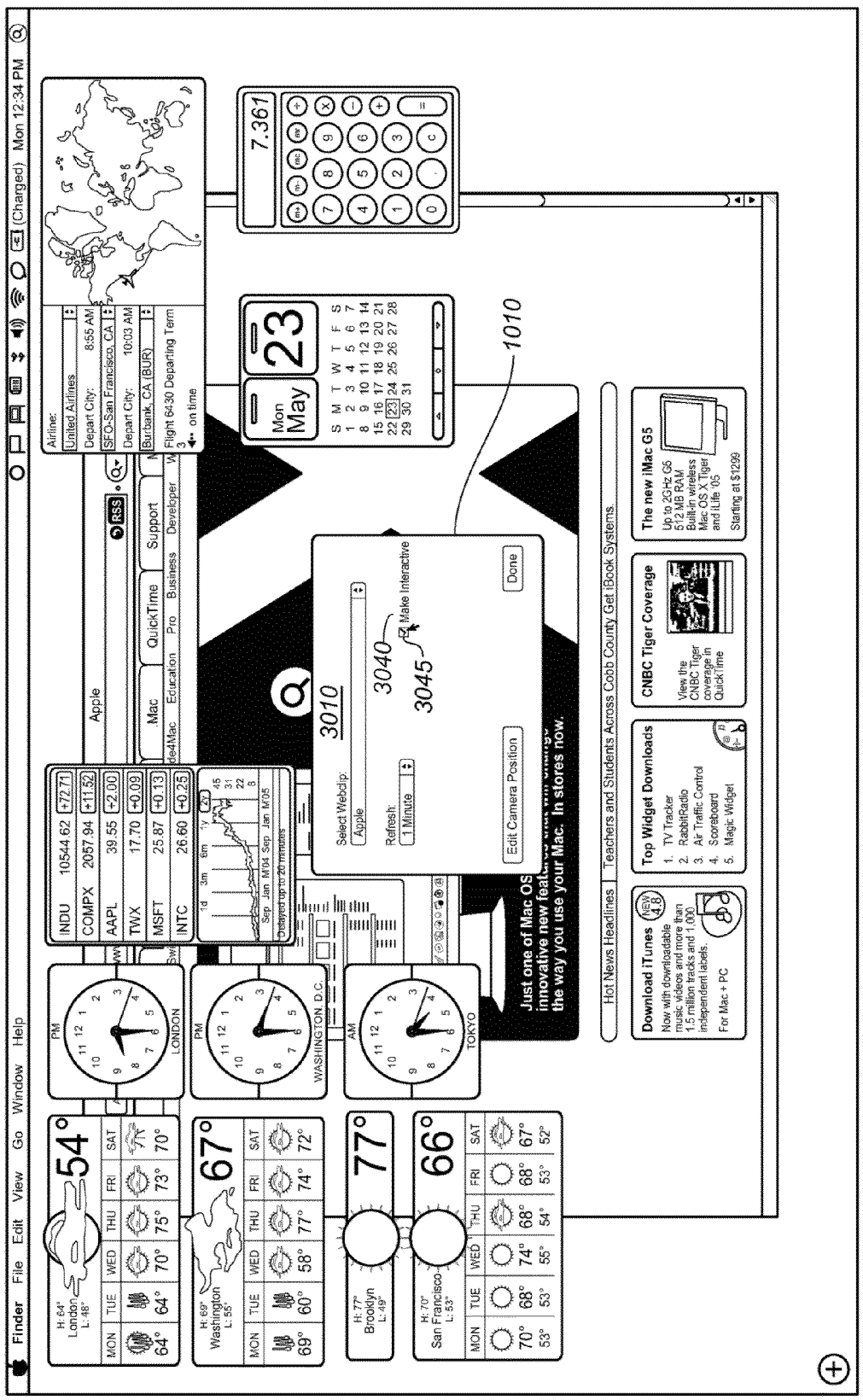

Referring to FIGS. 31-33, screen shots 3100-3300 show preference lists for preferences 3020, 3030, and 3040 in the preferences side 3010 of widget 1010. Screen shot 3100 includes a preference pull-down menu 3110 showing a currently selected refresh preference 3020 of "1 minute" 3120. Other preferences, though not shown, are possible, including automatic, continuous, live and other refresh options. Pull-down menu 3110 was activated, as explained above, by clicking on refresh control 3025. Screen shot 3200 includes a preference pull-down menu 3210 showing a currently selected web clip preference 3030 of "Apple" 3220. Pull-down menu 3210 was activated, as explained above, by clicking on web clip control 3035. Screen shot 3300 shows check box 3045 selected to toggle interactivity preference 3040 and make widget 1010 interactive.

Selection of camera position selection preference 3050 reinitiates the focus operation, with the current view presented. In one implementation, an animation is used to flip widget 1010 over and present the view portion 1030 displaying the clipped content. With view portion 1030, and the clipped content, displayed, a user may redefine the focus associated with the current view including resizing widget 1010 and repositioning of content within widget 1010. After a user is finished resizing and repositioning, the user may select a Done button as shown in FIG. 27. Upon selection of the Done button, preferences side 3010 may again be displayed, such as, for example, by flipping widget 1010 over. The user may then continue modifying or viewing preferences.

Figure 34:
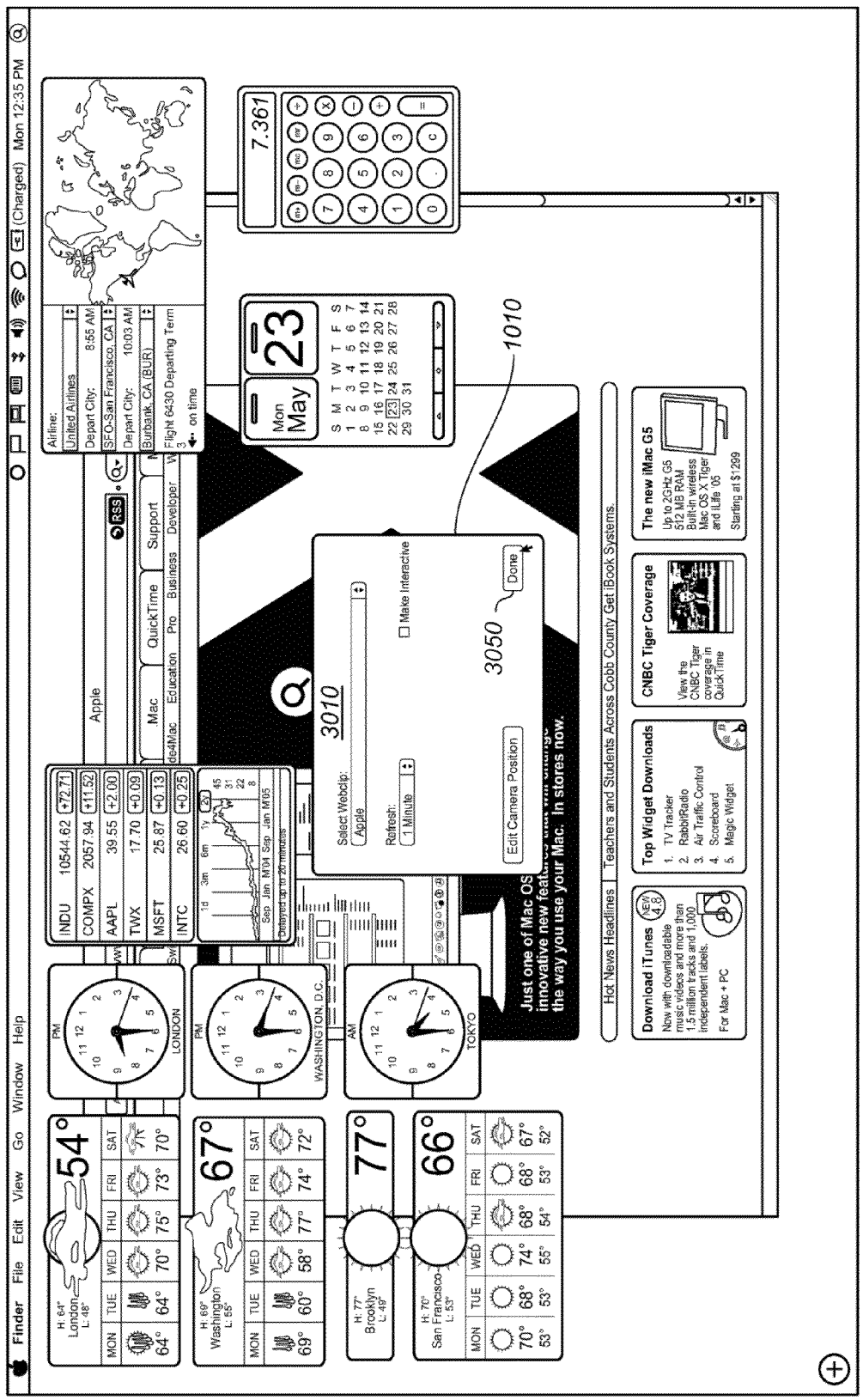
FIG. 34 is a screen shot showing a final step in modifying preferences of the widget.

Referring to FIG. 34, a screen shot 3400 shows a cursor over Done button 3050 on preferences side 3010 to select Done button 3050. After selecting Done button 3050, the setting, or modifying, of preferences for widget 1010 is complete. Preferences engine 230 may store the preferences and initiate any changes that are needed to the presentation of widget 1010. For example, if web clip selection preference 3030 was modified, preferences engine 230 may inform interactivity engine 210 of the modification, interactivity engine 210 may then access the newly selected clipping, and presentation engine 250 may present the new clipping. Regardless of whether changes are needed to the presentation of widget 1010, after a user selects Done button 3050, presentation engine 250 displays view portion 1030 of widget 1010 with the clipped content by, for example, flipping widget 1010 over. Widget 1010 will then appear as shown in webview 2610 of screen shot 2800. From screen shot 2800, if a user clicks out of dashboard 610, then screen shot 700 again appears.

Desktop Environment for a Webview

Clippings, as described above, can be used to clip a wide variety of content, and present the content in a variety of view environments. Above, a webview is described in a dashboard environment. Alternatively, a webview can be presented in other display environments, for example a desktop environment.

Figure 35:
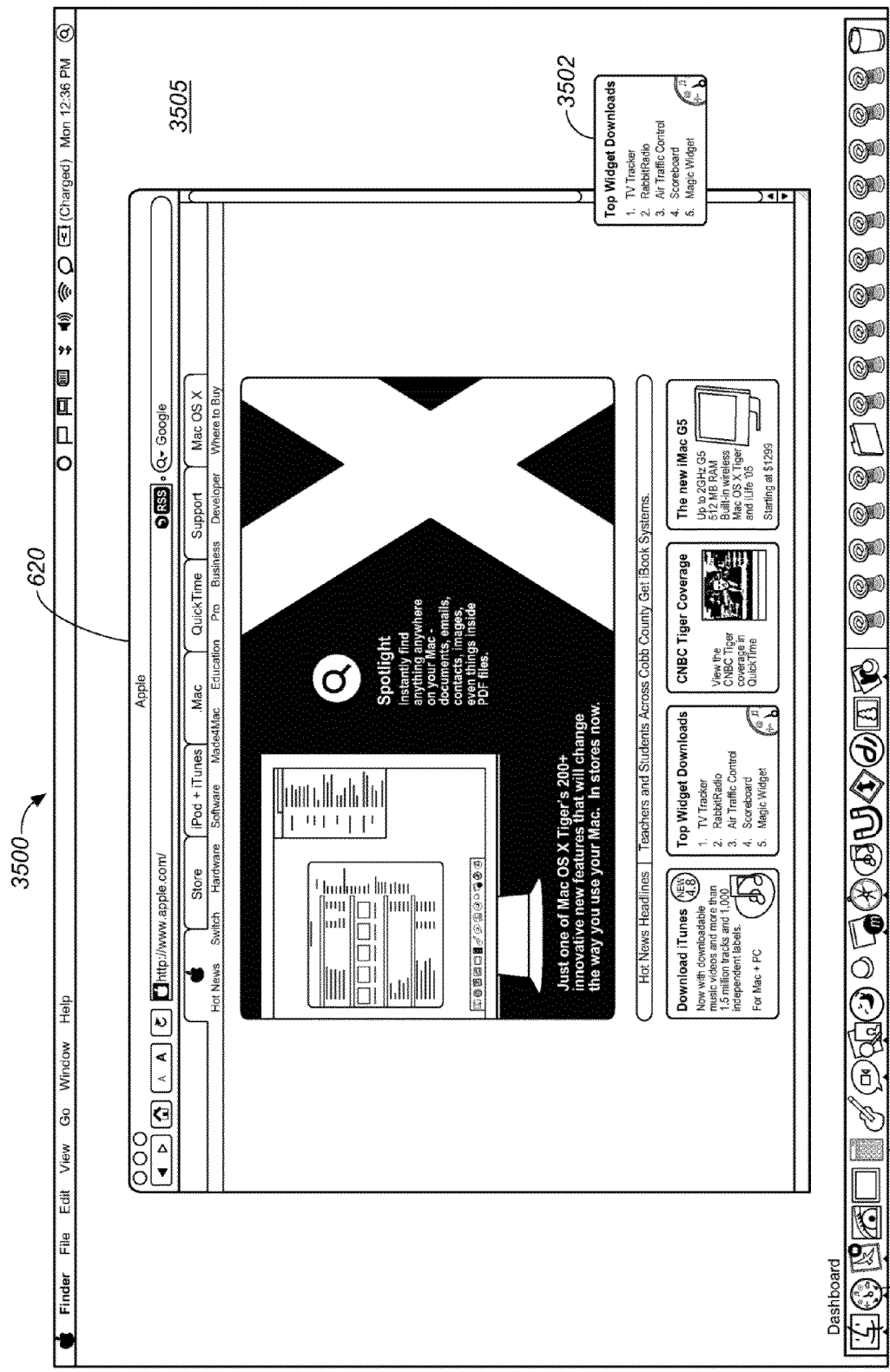
FIG. 35 is a screen shot showing a view displayed on a desktop.

Referring to FIG. 35, a screen shot 3500 shows an implementation in which a webview widget including a viewer 3502 is displayed on a desktop 3505 with a Safari® application 620 visible in the background rather than displaying widget 1010 in a dashboard 610. This is one example of an instantiation of a webview in an alternative display environment. That said, this instantiation is in no way limiting. Other instantiations of webviews in other display environments are possible including particularly instantiations that do not require the webview itself be associated with or contained within a widget.

In the implementation shown, viewer 3502 may either be created or modified by an authoring application. A dashboard and its attending applications/functional elements are an example of an authoring application (e.g., a webview widget can be created in dashboard 610 and subsequently presented outside of the dashboard). A desktop may include various organizational and functional graphical elements that allow for ease of use or navigation in a given computing environment. As shown, the desktop includes a dock, tool bars and the like to provide such functionality, though for the purposes of this disclosure, a clipping can be presented in any desktop environment that includes or does not include such structures.

In the instantiation shown, desktop 3505 includes a dock 3510 that includes a left-hand portion 3520 showing various utilities or applications that may be launched. Left-hand portion 3520 includes an icon 3530 for dashboard 610. Dock 3510 also includes a right-hand portion 3540 showing various modules that are running and that may be maximized and displayed on the desktop. In some implementations, viewer 3502 may be minimized so that an icon appears on right-hand side 3540. Additionally, viewer 3502 may be moved to or positioned in another location on desktop 3505. Similarly, in the implementations shown with reference to screen shots 600-3400, widget 1010 may be moved to another location on dashboard 610.

Other Content and Other Environments

As described above, various content can be clipped and presented as a clipping in a display environment. Different combinations of content, authoring applications for creating the clippings, and environments for displaying the clippings are possible. Though great detail has been provided above related to webviews, other forms of content are contemplated as discussed below. In addition, the particular display environments discussed are by way of example and should nor be construed as limiting.

Referring again to FIG. 2, a variety of additional implementations is now presented. These additional implementations are discussed with respect to the engines 210-250 in clipping application 160.

Identification engine 210 may work with, including, for example, processing, navigating within, and identifying the source of and an area of interest within, various different types of content.

The content source may include a messaging application, such as, for example, an email application. A user may desire a clipview, for example, showing (1) the user's inbox or another folder, (2) a one-line summary of the most recent entry in the user's inbox, or (3) merely an indicator of how many unread messages are in the user's inbox.

The content source may include an unshared or shared document or other file. Such documents may include, for example, a document from a standard business application as described earlier, a drawing, a figure, or a design schematic.

The content source may include a view of a folder, a volume, a disk, a Finder window in MAC OS X, or some other description of the contents of a storage area (either physical or virtual, for example). One folder may be a smart folder, such as a drop box, that receives documents ready for publication. The content source also may include a view of a search window that may display, for example, all documents related to a particular project. The search window, and a clipping of the search window, may automatically update when a new document or item matching the search criteria appears.

The content source may include television, video, music, radio, movies, or flash content. The content source also may include a media player presentation.

The content source may include information from a game, including both single player and multiple player games. For example, a clipping may show a view of some portion of a game in progress or of a summary of a game in progress. For example, a user may be waiting on an adversary's next chess move and may have a clipping showing the chess board, showing an indicator of whose turn it is, or showing a timer indicating how much time is left in the adversary's turn.

The content source may include a portion of a user interface for an application. For example, a user may clip a view of a dialog box for a command that requires four menu selections to view when using the application's user interface. The clipping may allow the user to select the command. When the user selects the command within the clipping, the clipping may close just as the dialog box would if the command were selected in the usual manner, or the clipping may remain active to allow the user to select the command multiple times. Such clippings may serve as macros or shortcuts, allowing the user to effectively redefine the user interface for the application. Such redefinitions of the user interface may be particularly useful because the clipping includes a visual display.

Clippings may include a time dimension, in addition to or in lieu of a location dimension. For example, a user may select an area of interest as being the first fifteen seconds from a particular video. The fifteen second video clipping may, for example, play continuously, repeating every fifteen seconds, play on command or mouse-over, or play on a refresh.

Clippings may use pattern recognition to identify an area of interest. For example, a user may inform focus engine 214 that the user desires to view only the box score(s) in a sports web page, or only the left-most person in a video segment that includes a panel of speakers. Pattern recognition thus may include searching a particular content source for the area of interest. Multiple content sources also may be searched, and searches may be performed for text codes (for example, American Standard Code for Information Interchange ("ASCII")), bit map patterns, and other items.

Clippings may as well interact with various data sources when selecting content for presentation. The data sources can include data stores associated with individual applications, such as databases, dataservers, mailservers, archives, and the like. In some implementations, the clipping application 160 may during initial selection or subsequent refresh of content, directly access various data sources directly without regard for the underlying applications. Accordingly, the clipping application may not require either the presence or the launching of the associated applications in order to access content.

As mentioned earlier, focus engine 214 may assist a user in selecting an area of interest. Such assistance may include, for example, proposing certain areas as areas of interest based on general popularity, a user's past behavior, or marketing desires. For example, a web page may identify a popular article and suggest that users visiting the web page make a clipping of the article. As another example, focus engine 214 may track the frequency with which a user visits certain content, or visits certain areas of interest within the content, and if a particular area of interest is visited frequently by a user, then focus engine 214 may suggest that the user make a clipping of the area of interest or pre-create a clipping for the user that merely has to be selected and located, in for example, a dashboard. Such areas of interest may include, for example, a web page, a particular portion of a web page such as a weekly editorial, a particular frame of a web page, a folder in an email application (such as, for example, an inbox), and a command in an application that ordinarily requires navigating multiple pull-down menus. As another example, in an effort to secure repeat viewers, web pages may suggest to viewers that the viewers make a clipping of the web page.

A user may select a content source or an area of interest by copying configuration parameters (for example, state information or preference parameters) from an existing clipping, or simply copying the entire user interface for a presented clipping (such as, for example, a clipview). A user may also modify a clipping to alter one or more configuration parameters, particularly after copying the configuration parameters from another clipping. A clipping application can have an associated tool bar having tools for performing a variety of functions and operations. Such functions/operations include, for example, (1) selecting other clips, (2) performing operations on the clips (for example, copying, or deleting), (3) editing a clip, (4) storing a clip, (5) renaming a clip, (6) sorting clips or organizing a display of icons/names of available clips, (7) setting a clip as a default clip to present when the clipping application is launched, (8) a general preferences tool for settings such as, for example, whether auto-created clips in accessed content should be saved, and (9) modifying preferences (for example, refresh rate and interactivity) globally for all clips. Additionally, separate toolbars may be available, for example, for the processes of creating a clipping, modifying a clipping, and setting preferences in a clipping. Tools, or a toolbar, may be included, for example, in the clipping view itself, such as, for example, in frame 1040 of FIG. 10. Tools, or toolbars, also may be free-standing and be positioned at any location in a display.

A clipping may include content from multiple content sources, or from multiple areas of interest in one or more content sources. The multiple areas of interest may be presented to a user, for example, serially (time separation) or at the same time (location separation). For example, a user may select multiple areas of interest to be displayed in a particular clipview one after another, as in a slideshow. As another example, the multiple areas of interest may be presented at the same time in a single clipview by aggregating the areas of interest, such as, for example, by stitching, as described previously, the areas of interest together. The toolbar can include stitching tools and slide show tools for creating, modifying, and previewing clips having content from multiple content sources. Tools may allow, for example, a user to easily rearrange the multiple content sources and preview a new layout.

State engine 220 may store location information that is, for example, physical or logical. Physical location information includes, for example, an (x,y) offset of an area of interest within a content source, including timing information (e.g., number of frames from a source). Logical location information includes, for example, a URL of a web page, HTML tags in a web page that may identify a table or other information, or a cell number in a spreadsheet. State information may include information identifying the type of content being clipped, and the format of the content being clipped.

State engine 220 also includes refresh information that instructs clipping application 160 how to perform a refresh. Refresh information may include, as described earlier, a script. For example, a script may include (1) an address of a content source that identifies a login page of a service (possibly a subscription service) on the World Wide Web, (2) login information to enter into the login page, and (3) information to navigate to the area of interest within the service after logging-in. Scripts also may be used with multi-stage clips, which are clips that require two clippings to be presented to a user. For example, a service may require that a user (rather than a script) type in the login information, or answer a question, and the script may include state information for both clippings (that is, the login page of the service, and the actual area of interest within the service) and information describing the transition between the two stages/clippings. The transition information may include, for example, a command in the script that causes the script to pause, and wait for an indication from the service that the login was successful, before attempting to navigate to the area of interest within the service. Scripts can be executed in whole or in part by, for example, state engine 220, another engine 210, 214, 218, or 230-250, or a combination of engines 210-250.

Content from an area of interest also may be refreshed by clipping application 160 receiving reloads/updates pushed automatically from the content source. Content sources also may notify clipping application 160 when an update is available, or when new content is received. Notifications and reloads/updates may be provided using, for example, a publish-and-subscribe system. For example, a clipping may be defined to include a subscription definition (e.g., as part of the selection definition) that supports receipt of content from a subscription service. In this paradigm, a clipping may be configured to subscribe to a content source and updates to the underlying material are then provided in accordance with the subscription source and the attending subscription definition (e.g., in accordance with the terms of an underlying subscription agreement). Accordingly, the content displayed can be provided to, and accepted in a clipping by web or net based (or otherwise provided) updates from the subscription service.

State information may include structural cues, such as, for example, information from a document object model ("DOM") or an indication of relative position between the area of interest and known structural boundaries. For example, a user may select an area of interest that begins on a frame boundary in a web page, and state engine 220 may store the (x,y) offset location of the area of interest, as well as the structural cue that the area of interest begins at a particular frame boundary. Then upon refresh, if the web page has been edited and the (x,y) offset is no longer on the frame boundary, the system may automatically modify the (x,y) offset to align with the frame boundary.

State information may include a vast array of information depending on the particularity that clipping application 160 provides to a user. For example, in a clipping of an email application's inbox, state engine 220 may simply store a designation of the inbox as the area of interest and use a default set of configuration parameters or use the current configuration parameter settings when the clipping is presented and refreshed. Such configuration parameters may specify, for example, the style of view (for example, putting the read pane in the bottom of the display), the sort order (for example, by date received in reverse chronological order), and the scroll bar position.

Preferences engine 230 may allow a variety of preferences to be set or modified. Examples of preferences include (1) a refresh rate, (2) whether or not a clipping includes interactive content, (3) whether sound is to be suppressed, (4) whether an alarm is to be activated when, for example, a change in content occurs, (5) the type of alarm that is to be activated, if any, and (6) the selection of the content source and the area of interest. Preferences engine 230 may provide lists of options for a user for one or more of the available preferences. For example, refresh rate options may include "continuous," "once per minute," "once every five minutes," "intermittent," "selectively," "on command," "never," "automatically," "manually," "live", "as provided" or otherwise. Refresh rate options also may allow a user to select a particular day and time, which may be useful in refreshing a clipping that gets updated at the content source at, for example, eight a.m. every Monday, or for refreshing a clipping of a live video segment by recording the video segment (or a portion of it) when the segment initially airs. As another example, types of alarms may include audio of various sorts, or a flashing icon. As another example, preferences engine 230 may provide a list of the previous content sources and areas of interest that have been clipped, and allow a user to select one of these historical selections as the current selection for the clipping.

Interactivity engine 240 may support a variety of different types of interactive content. Interactive content may include, as described earlier, a hyperlink to a web page, a form for data entry (for example, text entry, check box, or radio button), and an email address. Interactive content may include content that responds to, for example, a mouse-over, a mouse-click, or a tab key. Interactive content also may include commands in a clipping, such as, for example, a "reply" or "forward" button in an email application. Interactivity engine 240 may enable a user's interaction with a clipping by, for example, embedding the application from which the content was clipped (for example, a browser or an email application), by referring all user interaction to a stand-alone application, or by incorporating functionality without embedding the application. Rather than embed in the application, interactivity engine 240 may launch the application and act as a pass-through with the application itself hidden (for example, launching and working with a mail server directly). If a stand-alone application is used, interactivity engine 240 may work directly with the application via an application program interface ("API"). As an example of incorporating functionality without embedding the application, clipping application 160 may incorporate functionality allowing a user to edit a clipping of a text document. In such an example, clipping application 160 may have the ability to access text documents and update the text documents based on user input, either using the native application or otherwise.

Interactivity engine 240 may support a variety of different levels of interaction and types of interaction. Levels of interaction may be categorized, for example, into the following three categories: (1) no interactivity is provided, (2) partial interactivity is provided, for example, by allowing a user to add notes to a document but not edit the document, or enabling some of the active content on a web page, and (3) full interactivity is provided, for example, by launching an editing application into the clipping application presentation and allowing a user to edit a document.

Interactivity engine 240 may support interactivity between clippings. For example, one clipping can be used to control or otherwise provide input to a second clipping. In one example, a remote control for a display area is included in a first clipping, the display area itself being defined by a second clipping. Interactivity provided by a user in conjunction with the first clipping, (e.g., changing a channel on a remote control that is presented in the first clipping), is used to effectuate change in the second clipping (e.g., the content displayed in the second clipping is changed). The interactivity engine 240 of each clipping can include, for example, publish and subscribe constructs which can be utilized to provide input and output from/to respective clippings.

Presentation engine 250 may present data in various ways, for example, using audio, images, and video. Further, presentation engine 250 may provide a user interface for displaying clippings. The user interface may include, for example, a widget, or a simple window. The user interface may provide varying amounts of information and functionality. The information may include, for example, any or all of the state information, or the preferences. The functionality may include, for example, providing an interface for setting preferences, or providing control bars that include commands for interacting with the clipped content. Such commands may include a play button for video or audio, or a "save as" button for creating another copy of the presently clipped content.

A clipping has been referred to as a clipview in various implementations. The term clipview is not intended to be limiting, and may include audio, images, video, or other types of data. The presentation may display video by downloading a clipped video segment, or by, for example, refreshing continuously. For example, in implementations in which a web page is clipped into a clipview, and in which the area of interest includes a video segment, clipping application 160 may realize that a video segment in is in the area of interest and may determine, accordingly, that a continuous refresh is needed. Alternatively, the user may instruct clipping application 160 to continuously refresh.

Further implementations may include two clippings that are configured to interact with each other. For example, a first clipping may be of selected content, and a second clipping may be a control device (e.g., a toolbar, or a remote control) that can control the content in the first clipping.

Implementations may nest clippings in various ways. Nesting of clippings can include nesting in time or space.

In one instantiation, a first clipping can be nested in a second clipping producing an aggregate clipping (e.g., creating an aggregate or unified view). Each clipping can itself be complete, defined in accordance with the methods and tools described above. A first clipping, the clipping being nested may be formed conventionally as described above with one additional caveat, a positioning dimension. The positioning dimension for the first clipping can define, by for example name and location as necessary, the particular positioning of the first clipping in (or in relation to) a second clipping. Where the first clipping is to be embedded into the display associated with the second clipping, the second clipping can be defined to include, using for example the identification engine 210, the named first clipping as part of the source content to be displayed in the second clipping. The second clipping can include, for example an instantiation of the first clipping or the functional equivalent (e.g., a call to the actual first clipping).

The position dimension can include not only location data but also timing data. For example, the nesting of the first and the second clipping can be made in accordance with a time division multiplex methodology, where the view portion of the clipping alternates between presentation of the first clipping content and the second clipping content. Alternatively, other presentation options are possible to interleave the first and the second clippings in time (e.g., the second clipping is inserted every 10 seconds, and displayed for 2 seconds etc.).

In one implementation the clipping authoring application, e.g., clipping application 160, can include a clipboard or other tool that facilitates the nesting of the plural distinct clippings. For example, a clipboard could be presented in the authoring application. The clipboard may have an associated toolset for identifying, selecting and placing clippings in the clipboard, and converting the clipboard into a single aggregate clipping. The clipboard can include one or more predetermined forms that allows for the convenient layout in space (e.g., different forms including a two-up (two side by side clippings), a four-up, or other display option) or time (e.g., timeline tool or the like).

In other implementations, nesting can be used to produce a slide show clipping. For example, when used in conjunction with content derived from a spreadsheet application, individual cells (e.g., non-contiguous cells in a conventional spreadsheet) can be selected and presented together in one unified view or sequentially to a user in a slide show.

In other implementations, the nesting of clippings may be in accordance with a master-slave paradigm where a master clipping defines all aspects of the inclusion of a slave clipping in the master (e.g., the slave clipping may not be specially configured or "know" of its inclusion in the master). Alternatively, a master controller, which itself may or may not be a clipping, may be used to control the presentation of individually configured clippings into a composite or aggregate clipping.

For example, a clipping may be of a dashboard that itself includes several view widgets (each including one or more clippings) that include content. As another example, a general purpose clipping, such as, for example, a clock clipview may be inserted (for example, by dragging and dropping) into another clipping for which it would be convenient to have the time displayed.

Processing device 110 may include, for example, a mainframe computer system, a personal computer, a personal digital assistant ("PDA"), a game device, a telephone, or a messaging device. The term "processing device" may also refer to a processor, such as, for example, a microprocessor, an integrated circuit, or a programmable logic device. Content sources 150 and 170 may represent, or include, a variety of non-volatile or volatile memory structures, such as, for example, a hard disk, a flash memory, a compact diskette, a random access memory, and a read-only memory.

Implementations may include one or more devices configured to perform one or more processes. A device may include, for example, discrete or integrated hardware, firmware, and software. Implementations also may be embodied in a device, such as, for example, a memory structure as described above, that includes one or more computer readable media having instructions for carrying out one or more processes. The computer readable media may include, for example, magnetic or optically-readable media, and formatted electromagnetic waves encoding or transmitting instructions. Instructions may be, for example, in hardware, firmware, software, or in an electromagnetic wave. A processing device may include a device configured to carry out a process, or a device including computer readable media having instructions for carrying out a process.

A number of implementations have been described. Nevertheless, it will be understood that various modifications may be made. For example, elements of one or more implementations may be combined, deleted, modified, or supplemented to form further implementations. Additionally, in further implementations, an engine 210-250 need not perform all, or any, of the functionality attributed to that engine in the implementations described above, and all or part of the functionality attributed to one engine 210-250 may be performed by another engine, another additional module, or not performed at all. Though one implementation above describes the use of widgets to create webviews, other views can be created with and presented by widgets. Further, a single widget or single application can be used to create, control, and present one or more clippings in accordance with the description above. Accordingly, other implementations are within the scope of the following claims.

Presenting and Managing Clipped Content

Figure 36:
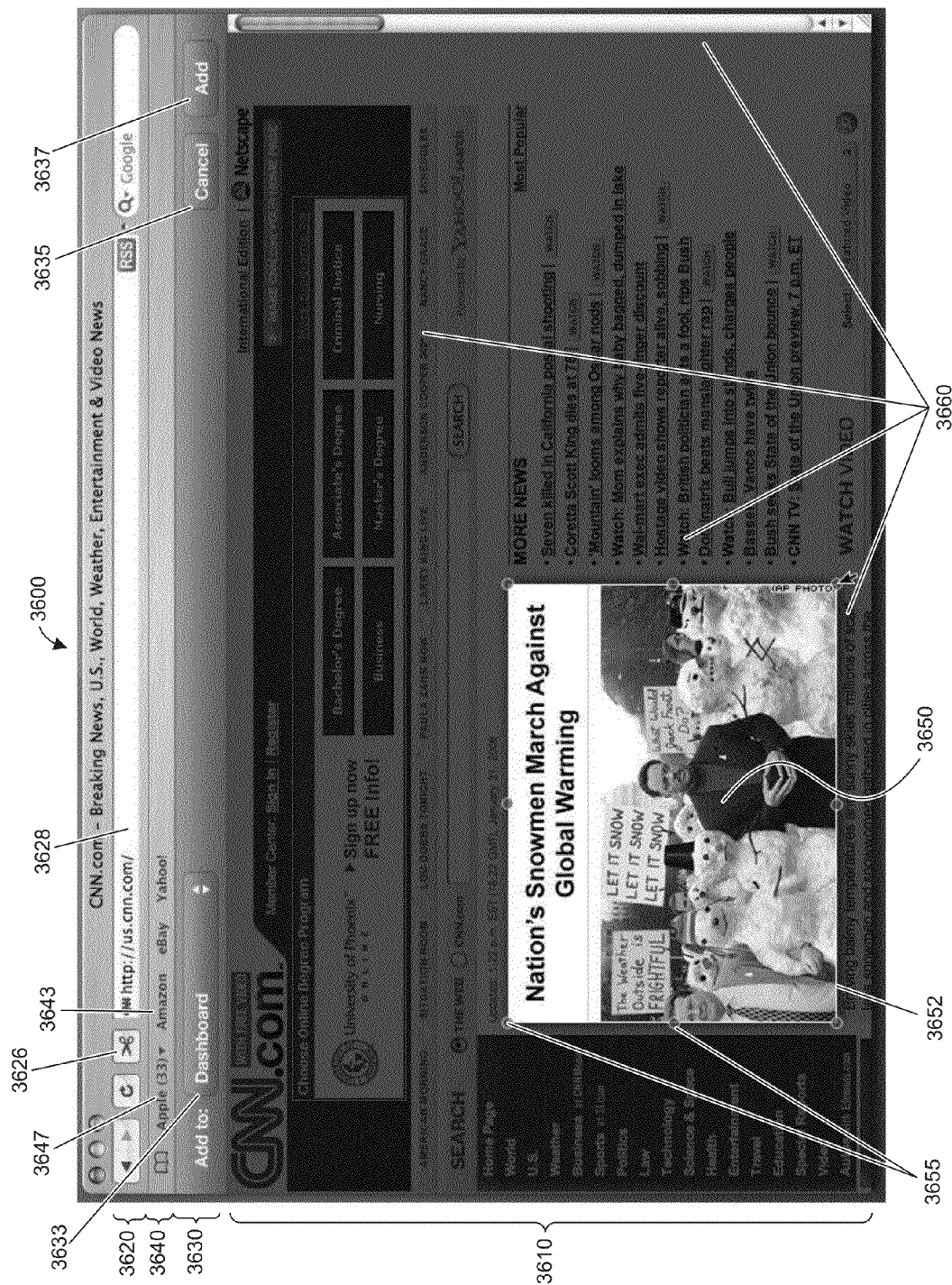
FIG. 36 is a screen shot showing a selection of an area of interest from web content.

FIG. 36 is a screen shot of an exemplary implementation of a web browser 3600 operable to create clippings. The web browser 3600 contains a content display area 3610, a tool bar 3620 and a bookmark menu 3640. The tool bar 3620 and bookmark menu 3640 can receive user input which, in general, affects the content displayed in the display area 3610. A user can provide input using an input device, including a keyboard (e.g., a keyboard shortcut), a mouse, a trackball, a track-pad or a table (e.g., clicking on a button, performing an predetermined gesture, etc.), speech recognition or machine vision systems, or any other suitable input device.

The tool bar 3620 includes user interface elements such as an address bar 3628 and a clipping-request button 3626. Receiving user input directed to one of the user interface elements in the tool bar 3620 can affect how the content is displayed in the content display area 3610. For example, a user can provide input to the address bar that specifies a particular content source. The source can be provided as a Universal Resource Locator (URL). In the example shown, the address bar 3628 contains 'http://us.cnn.com/' specifying that the user is interested in the content from CNN®. In response, the content from 'http://us.cnn.com' is rendered in the display area 3610. The rendering can be performed by, for example, the render engine 218, described in reference to FIG. 2.

Content can be received from the location specified in the address bar 3628. In some implementations, the content can be encoded information that describes the content and specifies how the content should be displayed. For example, content can be encoded using HTML, eXtensible Markup Language (XML), graphic image files (e.g., Graphic Interchange Format (GIF), Joint Photographic Expert Group (JPEG), etc.), or any other suitable encoding scheme. In general, a web browser is capable of rendering the variety of content including: files, images, sounds, web pages, RSS feeds, chat logs, email messages, video, three-dimensional models, etc.

The bookmark menu 3640 includes individual bookmarks 3643 and group bookmarks 3647. Each individual bookmark 3643 can be associated with a resource locator (e.g., URL). The user can select individual bookmarks 3643 (e.g., by clicking on the name of a bookmark) to cause content from the location associated with the selected bookmark to be displayed in the display area 3610. The contents of the address bar 3628 can be updated to reflect the new location. For example, the individual bookmark named 'Amazon' can be associated with the location 'http://amazon.com/'. Selecting this bookmark causes the content from 'http://amazon.com/' to be displayed in the display area 3628 and the address bar 3628 to be updated. Group bookmarks 3647 can contain one or more individual or group bookmarks. Group bookmarks 3647 can be nested to form a hierarchy of bookmarks. In one implementation, in response to user selection of a group bookmark 3647 (e.g., clicking on the group bookmark), each bookmark within the selected group bookmark is displayed (e.g., in a sub menu) and can each be selected by subsequent user input (e.g., the user can click a bookmark displayed in the submenu).

In one implementation, the browser 3600 can receive a clipping request from input provided by a user. For example, a user can click on the clipping-request button 3626 in the tool bar 3620. A clipping can be associated with a content source and an area of interest that defines particular portion(s) of content from the content source. A source can refer to any content source of content that can be captured and presented. For example, a content source can be a file containing images, text, graphics, music, sounds, videos, three-dimensional models, structured information, etc. A content source can also include an application, a presentation device or input in device (e.g., digital camera, video camera, web cam, scanner, microphone, etc.).

A clipping presents a portion of content contained within an area of interest selected from a content source (e.g., a web page). An area of interest defines the portion of the content from the content source to be clipped (e.g., a section of text, a portion of a rendered display, a length of sound, an excerpt of video, etc.). Captured content is the portion of content selected by an area of interest at the time that the area of interest was specified.

The content at the content source can change between when the area of interest is defined and when the clipping is presented. The portion of the new or updated content that is presented can depend on the context of the area of interest. In some implementations, an area of interest can be defined in a spatial context with respect to the spatial presentation of content (e.g., on a display device). For example, an area of interest can select a particularly sized portion of an image. At the time that the area of interest is defined the content source may refer to an image of busy city street. Later, when the clipping is presented, the source may instead refer to an image of an ocean beach. Then, the captured content is a particularly sized portion of the streetscape while the clipping presents a particularly sized portion of the beachscape.

In another implementation, an area of interest can be defined in a structural context that relies on structural indicators within the content, rather than defined with respect to the presentation of the content. For example, an area of interest can be defined that selects to the third and fourth paragraphs (e.g., determined by paragraph delimiters) in a document.

In another example, an area of interest can be defined that relies on structural indicators in the content, rather than defined by time durations. For example, an area of interest can be defined that selects to the third and fourth paragraphs in a document.

In response to a clipping request, an indication can be provided that an area of interest 3650 has been defined by a user. For example, an overlay 3660 can be displayed as a semi-transparent layer that alters (e.g., darkens, obfuscates, fades, etc.) the content presented in the display area 3610. The overlay 3660 can indicate to a user that all content within the display area 3610 is deselected and that further input from the user can be received to select an area of interest within the display area 3610. In the example shown, an area of interest 3650 has been defined by a bounding box (e.g., border 3652) defined by click-and-drag input provided by the user. The content within the area of interest 3650 can be highlighted by the absence of the overlay 3660 within the area of interest 3650. This feature provides the user with contrast to easily discern which content in the display area 3610 is within the area of interest 3650 and which content is outside the area of interest 3650. In some implementations, a border 3652 and size controls 3655 (e.g., handles) can be displayed surrounding the area of interest 3650. A user can interact with the size controls 3655 to alter the size of the area of interest 3650. The area of interest 3650 can also be clicked and dragged anywhere within the display area 3610. In some implementations, a user can specify an area of interest 3650 by selecting one or more structural elements within the content. For example, from the content of a web page the user can select text, pictures, tables, and other content elements to define areas of interest to be included in a clip.

In response to a clipping request, a clipping toolbar 3630 can be displayed. The clipping toolbar 3630 contains user interface elements which can affect the creation of a clipping, including but not limited to: a clipping page selector 3633, a cancel button 3635 and an add button 3637. The clipping page selector 3633 allows the user to select a clipping page from among existing clipping pages or to select a new clipping page. A clipping can be created and added to the clipping page specified by the clipping page selector 3633 when the add button 3637 is activated. In some implementations, an animation can be rendered to indicate that the clipping has been created (as described in reference to FIGS. 41-43). In some implementations, clippings can be added to a dashboard layer, as described in U.S. patent application Ser. No. 10/877,968, for "Unified Interest Layer For User Interface." In some implementations, a clipping page can be selected automatically based on a preset user preference, system default or other setting provided by the application environment (e.g., the operating system).

A clipping can be associated with information for displaying the content contained within the area of interest 3650. For example, the clipping can be associated with information about the location of content (e.g., the address 'http://us-.cnn.com' in the address bar 3628) and the location and size of the area of interest (e.g., 3650). In another example, the position and dimension of a bounding box defined by the border 3652 can be described as a rectangle 243 units wide and 104 units high, which is to be positioned 35 units down and 20 units right from the top left corner of the display area 3610.

The clipping can be associated with information about the configuration of the display area 3610 at the time the area of interest 3650 is defined, such as the original size of the display area 3610 (e.g., 800 units wide by 600 units long). Associating the clipping with information about the configuration of the display area 3610 can be important when the presentation of content is normally dependant on the configuration of the display area 3610 (e.g., web pages, unformatted text, etc.). The clipping can also be associated with captured content (e.g., an image of the content shown in the area of interest 3650). The display of the clipping on a clipping page is described in reference to FIG. 37.

User interaction with the cancel button 3635 causes the clipping-request to be canceled. When the clipping-request is canceled, the clipping toolbar 3630, the overlay 3660 and defined area of interest 3650, if any, can be removed.

Clipping Page

Figure 37:
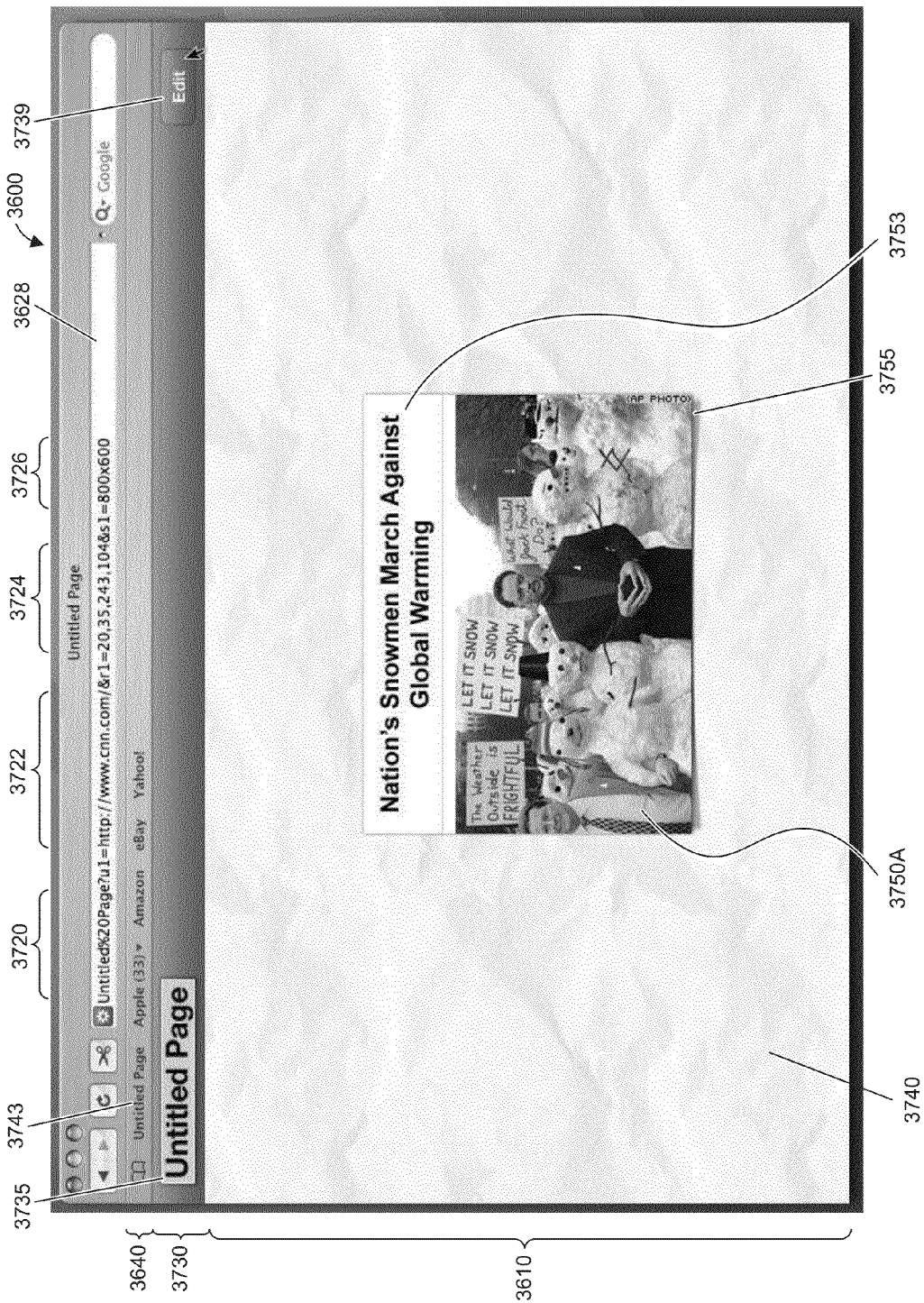
FIG. 37 is a screen shot showing a clipping in a clipping page.

FIG. 37 is a screen shot of an exemplary implementation of a web browser 3600 displaying a clipping page 3740 within the browser's display area 3610. In the example shown, the clipping page 3740 is presented with a background image (e.g., appearing like wrinkled paper) and a single clipping 3750A. The clipping page 3740 can be automatically created from an area of interest, such as the area of interest 3650 defined in FIG. 36. The clipping 3750A depicts the content from the clipping's source (e.g., 'http://www.cnn.com') and within the clipping's area of interest (e.g., 3650); the content outside the area of interest is effectively omitted (e.g. clipped away, cropped, etc). The clipping 3750A can also be presented with a border 3755 (e.g., giving the clipping a three-dimensional appearance). In the example shown, the border 3755 includes shading to give the appearance that the clipping 3750A was cut from a newspaper, magazine or other hardcopy source.

In general, a clipping page can contain one or more clippings. The clippings can be automatically or manually positioned within the clipping page. The layout of clippings on a clipping page can be specified as described in reference to FIG. 38.

Clip Presentation and Refresh Types

In some implementations, the clipping 3750A is a static clipping. A static clipping depicts the captured content associated with the clipping 3750A. A static clipping always reflects the area of interest at the time the clipping was defined, allowing the user to capture and store content. For example, if a static clipping displays the weather forecast for Feb. 6, 2006 then the static clipping will show the weather forecast for Feb. 6, 2006, even if the content at the source associated with the clipping is updated to reflect a new weather forecast.

In some implementations, the clipping 3750A is a refreshable clipping. A refreshable clipping depicts content specified from the source and within the area of interested associated with the clipping. For example, if clipping 3750A is refreshable, then the clipping 3750A depicts the current content from 'http://www.cnn.com'. If content at the source had been updated since the clipping was defined (e.g., since the clipping had been created in FIG. 36), the clipping 3750A would reflect the updated content. For example, if 'http://www.cnn.com' had been updated with an alternative headline and all other content unchanged, then the clipping 3750A would depict the alternative headline (e.g., 3753) with all other content (e.g., the depicted image) unchanged.

A refreshable clipping ideally depicts the content currently available from the source. In one implementation, a refreshable clipping can initially depict the content last received from the source (e.g., when the clipping was previously presented), while the source is accessed and the content is being refreshed. An indication can be made that the clipping is being, or has been, refreshed (e.g., an icon, progress bar, etc.). The indication can be displayed with the clipping (e.g., as an overlay), in a status bar, toolbar, etc. Alternatively, if it is not possible to access the content from the source (e.g., the source is not accessible, etc.), another indication can be displayed. Such an indication might include a message in a status bar, a dialog, log or any other suitable feedback.

In another implementation, the user can select whether the clipping is a refreshable clipping or a static clipping by choosing a refresh strategy. Refresh strategies can include making the clipping refreshable or static. Other refresh strategies are possible. For example, clippings can be refreshed when the clipping is presented, but only if the content has not been refreshed within a particular time period. In one implementation, a refresh strategy can specify that refreshable clippings will be refreshed at a particular interval of time, whether or not the clipping is currently being presented. Alternatively, a clipping can be refreshed by receiving user input (e.g., refresh on demand).

Clipping Interaction

Clipping 3750A on the clipping page 3740 is potentially subject to user interaction in the same manner that the content of clipping 3750A would be if it were otherwise displayed (e.g., by itself in a browser or in an application). For example, clippings that contain text can be subject to a text search of the clipping page. Searching a clipping page for text can include searching each of the clippings in the clipping page for the desired text. In another example, content displayed in the clippings can be selected in the same way that content would be selected if presented normally (e.g., web content in a web-browser).

In some implementations, user input can alter the display of clipping content. For example, clicking or otherwise interacting with a clipping can open the source associated with the clipping with an appropriate application, client, or plug-in. For example, clicking on clipping 3750A opens a web browser with content from 'http://www.cnn.com' presented.

Storage

The web browser 3600 displaying the clipping page 3740 includes a clipping page toolbar 3730. The clipping page toolbar 3730 includes the clipping page title 3735 and other user interface elements that are operable to affect the clipping page (e.g., the 'Edit' button 3739, described in reference to FIG. 38). The clipping page 3740, entitled 'Untitled Page' 3735, is shown stored as a bookmark 3743 on the bookmark menu 3640.

The clipping page 3740 can be stored by encoding the information it contains including, but not limited to: clippings (location, area of interest, captured content, etc.), clipping properties (e.g., refresh strategy, position in the clipping page, etc.) and clipping page properties (e.g., title, other properties, etc). The clipping page 3740 can be stored as an encoded email, a file on a disk or memory device, or on a network resource such as a file server, web server, or online publishing service (e.g., a Blog or Wiki). Other encodings and storage locations are possible. For example, the clipping page 3740 can be stored as a bookmark 3743 by encoding the clipping page 3740 as a URL and associating the encoded URL with the bookmark 3743.

The URL shown in the address bar 3628 illustrates a encoding scheme for encoding the clipping page 3740 as a URL. In the example shown, the URL indicates that the clipping page is titled "Untitled Page" 3720, that the first, and only, clipping's source (e.g., 'u1') is 'http://www.cnn.com' 3722, the first clipping's area of interest (e.g., tr1') is defined by the relative offsets 20 right and 35 down and dimensions 245 units wide and 104 units high 3724 (as described in association with FIG. 36), and that the first clipping's display area size (e.g., 's1') was 800 units wide by 600 high 3726 when the area of interest was defined. Other encoding schemes are possible.

Clicking on the bookmark 3743 causes the clipping page 3740 to be displayed in the display area 3610 as it is encoded by the URL (e.g., as shown in address bar 3628) associated with the bookmark 3743. In some implementations, however, bookmark 3743 can be a group bookmark containing bookmarks for the source of each clipping contained in the clipping page. For example, if bookmark 3743 is a group bookmark, then clicking on bookmark 3743, displays a subsequent menu containing a bookmark for 'http://www.cnn.com'.

In some implementations, the clipping page can also include the captured content associated with each clipping. When storing the clipping page, the captured content of each clipping can be encoded with the clipping page. Storing the captured content of each clipping facilitates presenting clippings without referring to each clipping's source (e.g., static clippings).

Storing the Clipping Page as a Web Page

In another implementation, a clipping page 3740 can be stored as, or published to, a clipping web page. A clipping web page is a clipping page that is itself a web page (e.g., encoded in HTML, XML, JavaScript or other encodings that can be rendered by a web browser). The clipping web page can be stored locally on a disk or memory device, or remotely on a web-server. If the clipping web page is stored on a web-server, then the clipping web page is potentially available for other users to access. Encoding the clipping web page for display as a web page can include client-side instructions (e.g., in JavaScript, VBScript, Java). The client-side instructions can enable interaction with and allow manipulation of clippings (e.g., refresh and reposition clippings) and the clipping page from a web browser. For example, each clipping in a clipping web page can be updated using hidden frames and JavaScript (e.g., AJAX). The JavaScript instructions can be included with the encoded clipping page.

In some implementations, the captured content associated with each clipping is encoded and provided with (or referred to by) the clipping web page. By encoding the captured content from each clipping, the clipping page can be presented without accessing each clipping's source. Providing the captured content of each clipping also enables the encoding of static clippings and allows each clipping to be initially presented (e.g., with the captured content) while clippings are being refreshed.

In some implementations, the clipping page can be updated by the publishing service on which the clipping is provided to or stored. For example, a publishing service can receive an encoded clipping. Periodically the service can generate a clipping web page that depicts the received clipping page. The online service can provide the generated clipping web page for other users to receive and to view. Each clipping in the clipping web page is effectively refreshed when the web page is periodically generated. Such a service allows users to share their clipping pages with other users.

Figure 38:
FIG. 38 is a screen shot showing multiple clippings in a clipping page.

FIG. 38 is a screenshot of an exemplary implementation of a web browser 3600 displaying a clipping page 3740 in a display area 3610. In the example shown, the clipping page 3740 has been renamed to 'News Clips' 3830, as described in reference to FIG. 39. Note that the title of book mark 3820, which refers to the clipping page 3740, has also changed to reflect the new clipping page title. Additional clippings (e.g., 3750B, and 3750C) have been added to the clipping page 3740, shown in FIG. 37. The additional clippings 3750B, 3750C, can be created as described above in reference to FIG. 36.

In response to adding a clipping to the clipping page 3740, the clipping page 3740 can be displayed in the display area 3610, presenting the clippings that were already on the clipping page 3740 (e.g., clipping 3750A) with the most recently added clippings (e.g., clippings 3750B and 3750C).

Layout of Clips

Each clipping in the clipping page 3740 can be displayed at a particular position within the clipping page 3740. In some implementations, clippings can be automatically positioned in the clipping page 3740 based on various layout rules and, or criteria concerning the properties of each clipping (e.g., the sizes of the clippings and display area, etc). When clippings are subject to automatic layout, clippings are positioned in the clipping page 3740 so that the clippings do not overlap while minimizing empty space between clippings. In the example shown, the automatic layout feature has positioned each clipping on the clipping page 3740, so that each clipping is evenly spaced and aligned with respect to other clippings on the clipping page 3740. In particular clippings 3750B and 3750C are shown center-aligned with respect to each other, both sharing the same horizontal space constrained by the edge of clipping 3750A and the edge of the display space 3610. Compared to its position in FIG. 37, the clipping 3750A has been positioned away from the center of the clipping page 3740 to allow additional clippings to be visible. For example, the relatively short clippings 3750B and 3750C are positioned opposite from the relatively high clipping 3750A in the clipping page 3740.

In some implementations, even when clippings are subject to automatic layout, the order of each clipping with respect to other clippings can be adjusted by the user (e.g., by dragging and dropping the clippings within the clipping page). However, the exact position of each clipping (e.g., 3750A-C) is still automatically determined based on the dimensions of clippings on the clipping page 3740 and the size of the display area 3610 in which the clipping page 3740 is displayed.

In some implementations, clippings can be subject to manual layout where the user precisely places and positions each clipping on the clipping page. A user-configurable property of the clipping page can be used to determine whether clippings are subject to automatic or manual layout.

Modifying Properties of Clippings and Clipping Pages

Figure 39:
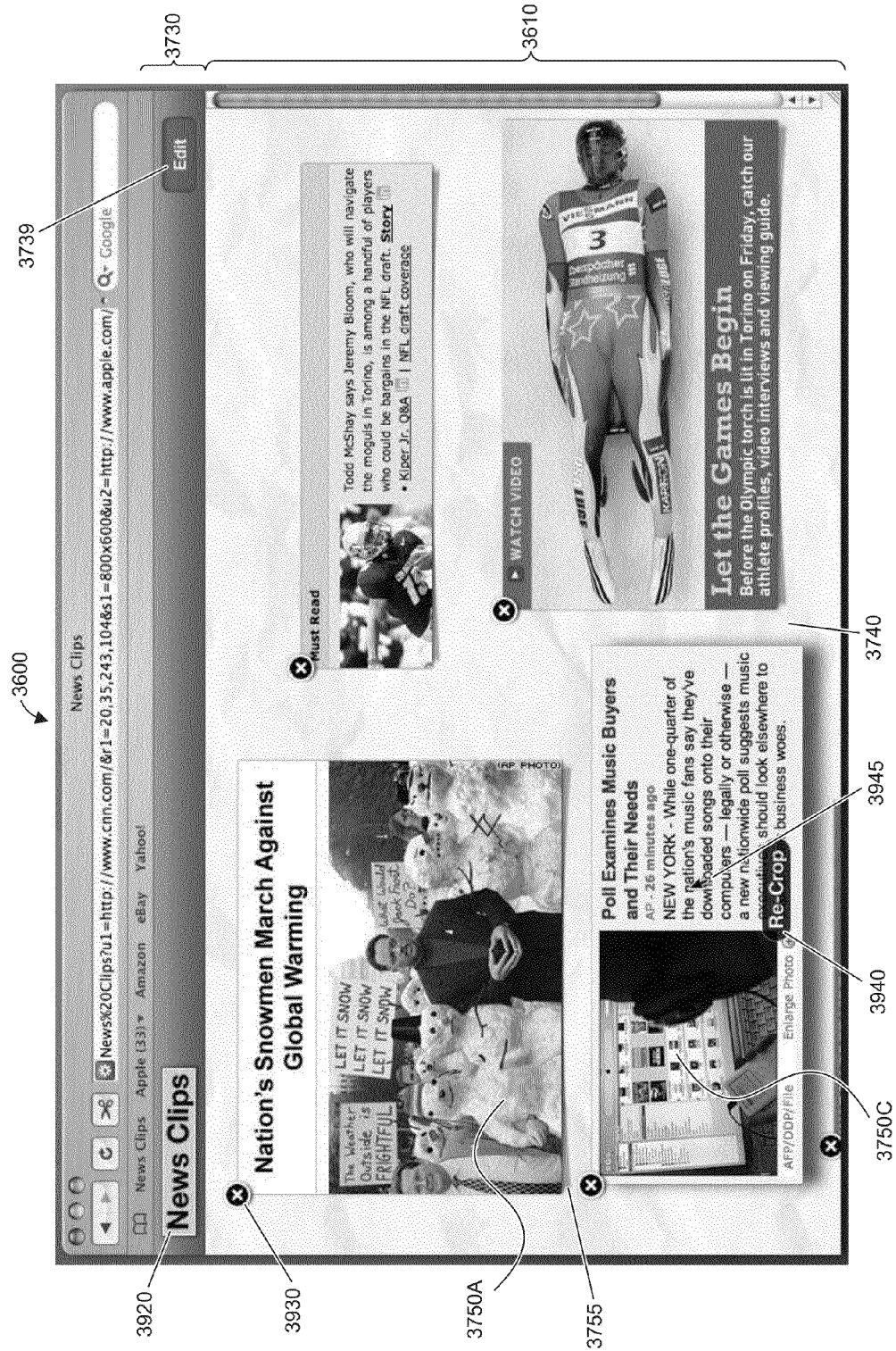
FIG. 39 is a screen shot showing clippings subject to manipulation in a clipping page.

FIG. 39 is a screen shot illustrating an exemplary implementation of a web browser 3600 displaying a clipping page 3740 in edit mode. In some implementations, user interaction with the 'Edit' button 3739 in the clipping page toolbar 3730 causes the clipping page 3740 to be put into edit mode. While in edit mode properties of the clipping page 3740 and clippings within the clippings page 3740 are subject to user modification. Users can make modifications by providing appropriate input (e.g., mouse gestures, keyboard shortcuts, etc.) or by interacting with user interface elements (e.g., buttons, popup menus, dialog boxes, etc.) that appear while in edit mode. In some implementations the properties of clippings and clipping pages can dependant on user preferences or predefined settings.

For example, a close button 3930 that is responsive to clicking can be presented with each clipping 3750. Clicking on a particular close button 3930 (e.g., 3750A's button) removes the associated clipping (e.g., 3750A) from the clipping page 3740. When a clipping 3750A is removed it is no longer depicted on the clipping page 3740 and the remaining clippings can be automatically repositioned.

In some implementations, a 'Re-Crop' button 3940 can be presented with a particular clipping 3750A when a user selects the particular clipping (e.g., by clicking on or mousing over the clipping 3750C, etc.). Clicking on the 'Re-Crop' button 3940, causes the content from the source (e.g., 'http://xyznews.com') that is associated with the particular clipping (e.g., 3750C) to be presented with the clipping's area of interest in the display area 3610 (e.g., as in FIG. 36). Displaying the content and area of interest allows the user to adjust, or redefine, the area of interest associated with the clipping (e.g., 3750C).

While in edit mode, properties of the individual clippings 3750A on the clipping page 3740 can be modified. In some implementations, the refresh strategies of clippings 3750A can be altered (e.g., making a static clipping a refreshable clipping or vise-versa). Users can modify the appearance or presentation of clippings 3750. In some implementations, a user can scale, rotate, stretch, and apply other geometrically transformations to clippings 3750. By scaling a clipping 3750, the size of the clipping 3750A and its displayed content can be reduced or enlarged relative to the clipping page 3740. Other effects applicable to clippings 3750A include but are not limited to: adjusting the appearance of a border 3755 of a clipping 3750A and visual effects (e.g., decolorizing, blurring, highlighting, pixilation).

Properties affecting the appearance of the clippings 3750A can be combined and applied as a theme affecting individual clips, selected clips, or all clippings on the clipping page (e.g., all clippings 3750A can be have their border appear 'burned' and contents presented in sepia tones). In some implementations, clippings 3750A can be annotated with titles, captions, comments or descriptions. These annotations can be presented with their respective clipping.

In some implementations, the properties of clipping pages can be automatically determined from identifiers found in the content at a clipping's source. For example, a particular HTML tag (e.g., a META tag), found within content at the clipping's source, can suggest or provide properties that concern the clipping's refresh strategy.

In some implementations, clippings 3750A are repositionable while the clipping page 3740 is in edit mode. In some implementations, the user can move clippings from one clipping page to another clipping page, or potentially to another environment capable of receiving a clipping (e.g., the desktop, dashboard, portable device, mobile phone, another application).

In edit mode, the clipping page 3740 itself can also be modified. For example, the clipping page title 3920, a property of the clipping page 3740, is editable by receiving input from an input device (e.g., keyboard, key pad, gesture recognizer, etc.). In some implementations, other clipping page properties, such as whether clippings are subject to manual or automatic layout, are also modifiable. In some implementations, visual properties that affect the clipping page (e.g., the color, image or texture of clipping page background) can also be modified. Clipping page properties pertaining to whether the clipping page is published or exported to a web page or publishing service can also be modified.

Creating a Clipping Page from Bookmarks

In some implementations, a clipping page can be generated from a selection of bookmarks and group bookmarks. Bookmarks can be selected by a user (e.g., by selecting bookmarks or group bookmarks in a bookmark browser). Alternatively, the bookmarks can be automatically selected by analyzing properties of the user's bookmarks. For example, a clipping page could be generated that contains the user's top 5 bookmarks by selecting bookmarks based on a property that indicates how often the bookmark has been used by the user.

A clipping is generated for each bookmark in the clipping page, where each clipping's source corresponds to a bookmark's location. The area of interest for each clipping can be automatically determined. For example, in one implementation the area of interest can correspond to the entire content. In such an implementation, each clipping can be scaled down so that multiple clippings are presented at the same time on a single clipping page. The resultant clipping page can be used to visually depict users' bookmarks. In general, any selection of one or more content source (e.g., files, documents, image, bookmarks, etc.) can be used to automatically generate a clipping page depicting proportionally reduced content from each source in each clipping. In another implementation, an area of interest having a predefined size can be applied to each clipping.

In some implementations, an area of interest can be created while authoring the content. For example, when a user creates a document, they can specify an area of interest within the document. Later, when creating a clipping from the document, the area of interest from the document can be used to define the clipping.

In some implementations, a nested clipping page can be generated from a group bookmark or hierarchy of bookmarks. A clipping is generated for each bookmark at the highest level of the bookmark hierarchy, a nested clipping is generated for each group bookmark at the highest level. The nested clipping can depict a clipping that contains the bookmarks within the corresponding group bookmark. For example, consider a clipping hierarchy consisting of one bookmark, A, and one group bookmark referring to two other bookmarks B and C. A clipping page made from this hierarchy contains two clippings, one clipping depicting the content referred to by A, the other clipping depicting a clipping page that itself contains two clippings, each depicting content from C and D, respectively.

In some implementations, a single clipping is generated for each bookmark in the hierarchy of bookmarks, irrespective of its level in the hierarchy. Applying the hierarchy described above, a clipping page can be generated that contains three clippings for presenting content referred to by A, C and D.

Figure 40:
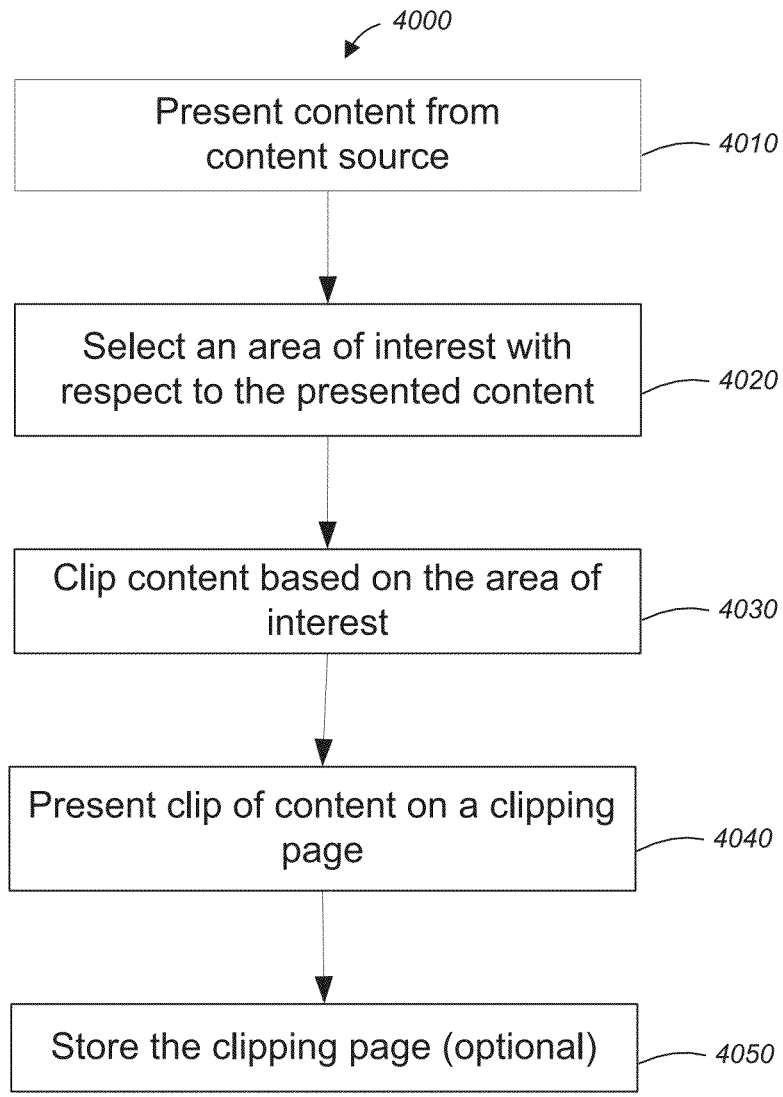
FIG. 40 is a flow diagram of a process for presenting clippings in a clipping page.

FIG. 40 is a flow diagram of a process 4000 for presenting clippings in a clipping page Includes presenting content from a content source (e.g., displaying a web page) (4010). An area of interest is defined with respect to the presented content (step 4020). For example, a bounding box can be drawn over the presentation of the webpage, to specify an area of interest selecting content from the web page. Content from the content source is clipped based on the defined area of interest (4030). A clipping page is presented with the clipping of content (4040). The clipping page can contain other clippings, each of which depicts content based on each clippings respective content source and area of interest. The clipping page, and its clippings, can be optionally stored (4050).

Figure 41:
FIGS. 41-43 is a series of screen shots showing an animation indicating that an animation has been created.
Figure 42:
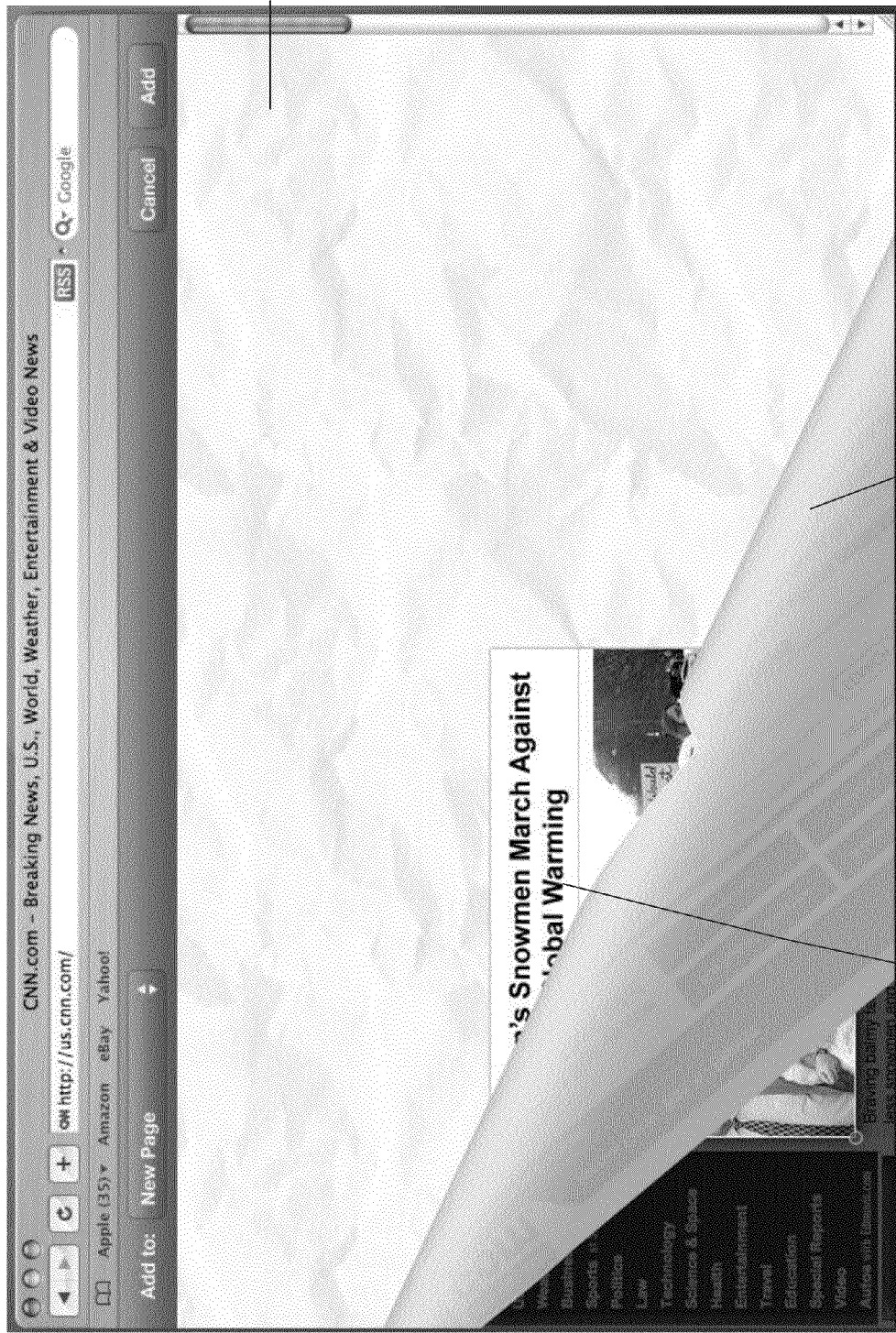
Figure 43:
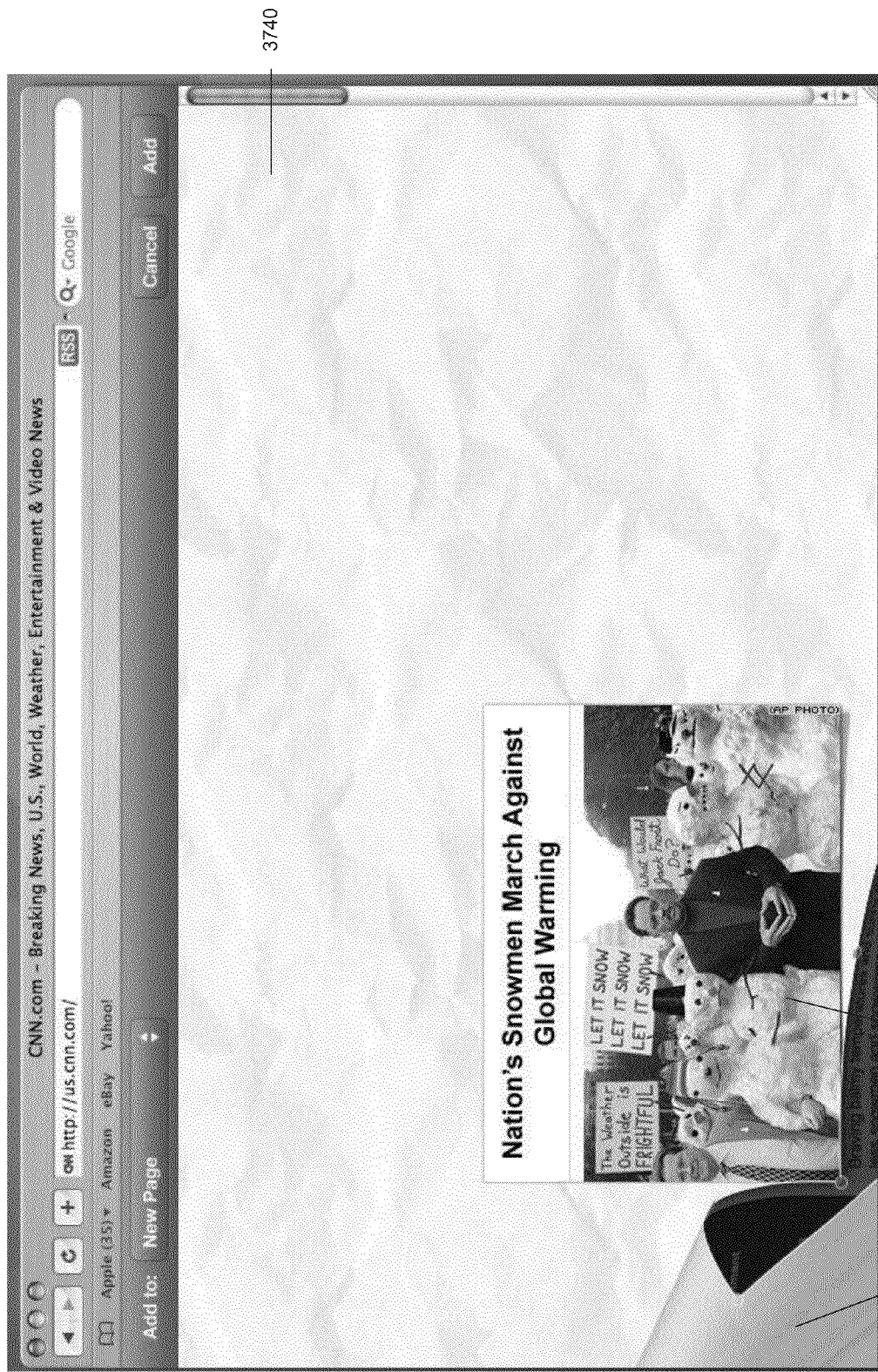

FIGS. 41-43 are a series of screen shots of an exemplary implementation showing an animation indicating that a clipping has been created. The animation is shown progressing at three intervals of time. In response to the user specifying an area of interest 3650 and creating the clipping (e.g., clicking on button 3637), the animation depicts the content outside the area of interest 3660 being lifted away from the content within the area of interest 3650. The content outside the area of interest 3660 is lifted away as though on a page of paper while the remaining content 3650 remains, leaving a hole in the page as it is lifted and removed. The animation ideally emphasizes to the user the notion that the content within the area of interest 3650 has been clipped from the rest of the content. In some implementations, this animation effect can be achieved by rendering the content using a three-dimensional display subsystem (e.g., an implementation of the OpenGL API).

As can be seen in FIG. 43, when the animation has finished and the content outside the area of interest 3660 has been lifted away, the clipping remains, displayed on the clipping page 3740. If other there are other clippings on the clipping page 3740, subsequent animation can depict the clippings being reordered and repositioned to accommodate the added clipping page. In general, other animations are possible. In some implementations, the animation can be omitted completely.

In one implementation the clipping page can be stored locally on a resource that is accessible only to the device that creates the clipping page. For example, the clipping page can be stored as a bookmark with an encoded URL. In another implementation, the clipping page can be stored on, or received by, a remote resource (e.g., accessible by network) that is accessible to potentially many other devices. For example, the clipping page can be created within the user's web-browsers, stored on an web server or web application service, and made accessible to other devices and other users. In one implementation, the web server or web application service can provide the clipping page as a clipping web page to other devices or users.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

The invention claimed is:

1. A method comprising:
    receiving, on an electronic device, a selection of a portion of content of a document from a display area using a bounding box having at least one adjustable border, wherein the document is a web page;
    creating clipped content based at least in part on the selected portion of the content and a structural cue of the document, wherein the clipped content comprises a clipping and the structural cue includes at least one of:
        an offset of the selection within the web page; or
        a structural element boundary of the web page, the structural element defined by a document object model;

providing the clipping for display in a user interface of the electronic device;
modifying, by a user, an appearance of the clipping, wherein modifying the appearance is accomplished through user input to the clipping; and
refreshing the clipping in the user interface in accordance with a refresh scheme, wherein refreshing the clipping comprises:
receiving the user input to the clipping, wherein the clipping is configured to respond to the user input by passing the user input to the document for the clipping, wherein the user input is processed by the document and the content of the clipping is refreshed with updated content from the document by accessing in the document the selected portion of the content,
rendering the selected portion of the content, and
presenting the selected portion of the content, thereby refreshing the clipping within the user interface.

2. The method of claim 1, where providing the clipped content for display in the user interface comprises:
changing a position of the clipping in the user interface, wherein changing the position of the clipping within the user interface comprises a user dragging and dropping the clipping to a location in the user interface.

3. The method of claim 1, wherein the user interface comprises a browser application window and wherein presenting the clipping for display in the user interface further comprises:
determining at least one parameter associated with the clipping;
comparing the parameter with parameters from at least one other clipping presented in the user interface; and
automatically changing a relative position between the clipping and at least one other clipping in the user interface based on results of the comparing, using one or more clipping placement rules.

4. The method of claim 1,
wherein receiving a selection comprises at least one of:
automatically receiving a selection of a portion of content in response to a user having previously accessed a particular piece of content within the portion of content a threshold number of times, the selection comprising the particular piece of content, or automatically receiving a selection of a portion of content comprising content within a frame, in response to a user selecting content within the frame.

5. The method of claim 1, wherein
the user interface comprises a clipping page and changing the appearance of the clipping in the clipping page includes at least one of: giving the clipping a three-dimensional appearance, or giving the clipping the appearance that it was cut from a newspaper, magazine, or other hard-copy source.

6. The method of claim 1, where changing the appearance of the clipping in the user interface includes one or more of: shaping, reshaping, resizing, or repositioning the clipping within the user interface.

7. The method of claim 1, wherein:
the clipping lacks a perceivable frame and lacks perceivable controls, thereby displaying the clipped content in a borderless form.

8. The method of claim 7, wherein the user interface comprises an overlay layer that is at least partially transparent wherever the overlay layer lacks a clipping.

9. The method of claim 1, further comprising encoding parameters associated with the clipping with the user interface, wherein the parameters include a content source of the clipping and an area of interest associated with the clipped content, the content source describing an origin of the content in the display area, and the area of interest describing the selected portion of content.

10. A method comprising:
receiving an encoded clipping page, the encoding of the clipping page describing a content source and an area of interest, the encoded clipping page being referenced by a Uniform Resource Locator (URL);
receiving a first portion of content from the content source, the first portion of content based on the area of interest described in the encoded clipping page, the first portion of content identified by a bounding box having at least one user-drawn border and a structural cue of the content from the content source, the structural cue including at least one of:
an indication of a relative position of the area of interest; or
a structural element boundary of the content, the structural element defined by a document object model (DOM);
presenting the first portion of content as a clipping in a clipping page;
refreshing the clipping in the clipping page in accordance with a refresh scheme, wherein refreshing the clipping comprises:
receiving user input by the clipping, wherein the clipping is configured to respond to the user input by passing the user input to the content source for the clipping, wherein the user input is processed by the content source, and the content of the clipping is refreshed with updated content from the content source in response to the user input by accessing, in the content source, the first portion of the content,
rendering the first portion of the content, and
presenting the first portion of the content in the clipping page, thereby refreshing the clipping.

11. The method of claim 10, where presenting the clipped content clipping in the clipping page further comprises:
receiving input directed to the clipping, the input operable to change a position of the clipping in the clipping page.

12. The method of claim 10, where presenting the clipping in the clipping page further comprises:
changing an appearance of the clipping page in response to, and utilizing, the user input received by the clipping.

13. The method of claim 10, where the clipping represents two or more non-contiguous regions from the content source.

14. The method of claim 10, further comprising:
clipping a second portion of content accessed from the content source, the second portion being defined by the area of interest, the second portion of content being different from the first portion of content; and
presenting the second portion of content as the clipping in the clipping page.

15. The method of claim 14, further comprising:
presenting an indication that the second portion of content is presented rather than the first portion of content.

16. A method comprising:
receiving an encoded clipping page from a first device, the encoding of the clipping page describing a content source and an area of interest, and the encoded clipping page comprising clipped content associated with a refresh scheme, the clipped content defined by a bounding box having at least one border drawn around the area of interest and a structural cue of content of the content source, the structural cue including at least one of:

an indication of a relative position of the area of interest; or a structural element boundary of the content, the structural element defined by a document object model (DOM);

providing the encoded clipping page to a second device, the first device different from the second device, where providing the encoded clipping page includes presenting the area of interest to the second device; and refreshing the encoded clipping page in accordance with the refresh scheme, wherein refreshing the encoded clipping page comprises the second device:

receiving user input by a clipping in the clipping page, wherein the clipping is configured to respond to the user input by passing the user input to the content source for the clipping, wherein the user input is processed by the content source, and the content of the clipping is refreshed with updated content from the content source in response to the user input by accessing, in the content source, the clipped content, rendering the clipped content, and presenting the clipped content on the second device, thereby refreshing the clipped content.

17. The method of claim 16, where refreshing the encoded clipping page includes automatically modifying an offset of the area of interest to a structural element of the content.

18. The method of claim 16, where the encoded clipping page is displayed by a Web browser.

19. The method of claim 1, where refreshing the clipping page includes:

refreshing, using one or more processors, the clipped content in response to a push originated from a content source providing the document.

20. The method of claim 7, where:

the structural element boundary includes a frame boundary.

21. A system comprising:

one or more processors configurable to perform operations comprising:

receiving, on an electronic device, a selection of a portion of content of a document from a display area, using a bounding box having at least one configurable border around the selected portion of the content of the document, wherein the document is a web page;

creating clipped content based at least in part on the selected portion of content and a structural cue of the document, wherein the clipped content comprises a clipping and the structure cue includes at least one of:

an offset of the selection within the web page indicating a relative position of the area of interest; or a structural element boundary of the web page, the structural element defined by a document object model (DOM);

presenting the clipping for display in a user interface;

modifying, by a user, an appearance of the clipping, wherein modifying the appearance is accomplished through user input to the clipping, wherein modifying the appearance of the clipping in the user interface includes one or more of: shaping, reshaping, resizing, or repositioning the clipping within the user interface; and refreshing the clipping in the user interface in accordance with a refresh scheme, wherein refreshing the clipping comprises:

receiving the user input to the clipping, wherein the clipping is configured to respond to the user input by passing the user input to the document for the clipping, wherein the user input is processed by the document and the content of the clipping is refreshed with updated content from the document by accessing, in the document, the selected portion of the content, rendering the selected portion of the content, and presenting the selected portion of the content, thereby refreshing the clipping in the user interface.

22. A system comprising:

one or more processors configurable to perform operations comprising:

receiving an encoded clipping page, the encoding of the clipping page describing a content source and an area of interest, the encoded clipping page being referenced by a Uniform Resource Locator (URL);

receiving a first portion of content from the content source, the first portion being based on the area of interest described in the encoded clipping page, the first portion of content identified by a bounding box having at least one user-drawn border and a structural cue of the content from the content source, the structural cue including at least one of:

an indication of a relative position of the area of interest; or a structural element boundary of the content, the structural element defined by a document object model (DOM);

presenting the first portion of content as a clipping in a clipping page; and refreshing the clipped content in the clipping page in accordance with a refresh scheme, wherein refreshing the clipped content comprises:

receiving user input by the clipping, wherein the clipping is configured to respond to the user input by passing the user input to the content source for the clipping, wherein the user input is processed by the content source, and the content of the clipping is refreshed with the updated content from the content source in response to the user input by accessing in the content source, the first portion of the content, rendering the first portion of the content, and presenting the first portion of the content in the clipping page, thereby refreshing the clipping.

23. A system comprising:

one or more processors configurable to perform operations comprising:

receiving an encoded clipping page from a first device, the encoding of the clipping page describing a content source and an area of interest, and the encoded clipping page comprising clipped content associated with a refresh scheme, the clipped content defined by a bounding box having at least one border drawn around the area of interest and a structural cue of content of the content source, the structural cue including at least one of:

an indication of a relative position of the area of interest; or a structural element boundary of the content, the structural element defined by a document object model (DOM);

providing the encoded clipping page to a second device, the first device different from the second device, where providing the encoded clipping page includes presenting the area of interest to the second device; and refreshing the encoded clipping page in accordance with the refresh scheme, wherein refreshing the encoded clipping page comprises the second device:

receiving user input by a clipping in the clipping page, wherein the clipping page is configured to respond to the user input by passing the user input to the content source for the clipping, wherein the user input is processed by the content source, and the content of the clipping is refreshed with updated content from the content source in response to the user input by accessing, in the content source, the clipped content, rendering the clipped content, and presenting the clipped content on the second device, thereby refreshing the clipped content.

24. A non-transitory computer memory structure, having stored thereupon a computer program product which, when executed, causes a computing device to perform operations comprising:
   receiving, on an electronic device, a selection of a portion of content of a document from a display area using a bounding box having at least one user-drawn border, wherein the document is a web page;
   creating clipped content based at least in part on the selected portion of content and a structural cue of the document wherein the clipped content comprises a clipping and the structural cue includes at least one of:
      an offset of the selection within the web page indicating a relative position of the area of interest; or
      a structural element boundary of the web page, the structural element defined by a document object model (DOM);
   presenting the clipping for display in a user interface of the electronic device;
   modifying an appearance of the clipping, wherein modifying the appearance is accomplished through user input to the clipping, wherein modifying the appearance of the clipping in the user interface includes one or more of: shaping, reshaping, resizing, or repositioning the clipping within the user interface; and
   refreshing the clipping in the user interface in accordance with a refresh scheme, wherein refreshing the clipping comprises:
      receiving the user input to the clipping, wherein the clipping is configured to respond to the user input by passing the user input to the document for the clipping, wherein the user input is processed by the document and the content of the clipping is refreshed with updated content from the document by accessing, in the document, the selected portion of the content,
      rendering the selected portion of the content, and
      presenting the selected portion of the content, thereby refreshing the clipping within the user interface.

25. A non-transitory computer memory structure, having stored thereupon a computer program product which, when executed, causes a computing device to perform operations comprising:
   receiving an encoded clipping page, the encoding of the clipping page describing a content source and an area of interest, the encoded clipping page being referenced by a Uniform Resource Locator (URL);
   receiving a first portion of content from the content source, the first portion being based on the area of interest described in the encoded clipping page, the first portion of content identified by a bounding box having at least one user-drawn border and a structural cue of the content from the content source, the structural cue including at least one of:
      an indication of a relative position of the area of interest; or
      a structural element boundary of the content, the structural element defined by a document object model (DOM);
   presenting the first portion of content as a clipping in a clipping page;
   refreshing the clipping in the clipping page in accordance with a refresh scheme, wherein refreshing the clipping comprises:
      receiving user input by the clipping, wherein the clipping is configured to respond to the user input by passing the user input to the content source for the clipping, wherein the user input is processed by the content source, and the content of the clipping is refreshed with updated content from the content source in response to the user input by accessing, in the content source, the first portion of the content,
      rendering the first portion of the content, and
      presenting the first portion of the content in the clipping page, thereby refreshing the clipping.

26. A non-transitory computer memory structure, having stored thereupon a computer program product which, when executed, causes a computing device to perform operations comprising:
   receiving an encoded clipping page from a first device, wherein the encoding of the clipping page describes a content source and an area of interest, and the encoded clipping page comprising clipped content associated with a refresh scheme, the clipped content defined a bounding box having at least one border drawn around the area of interest and a structural cue of content of the content source, the structural cue including at least one of:
      an indication of a relative position of the area of interest; or
      a structural element boundary of the content, the structural element defined by a document object model (DOM);
   providing the encoded clipping page to a second device, the first device different from the second device, where providing the encoded clipping page includes presenting the area of interest to the second device; and
   refreshing the encoded clipping page in accordance with the refresh scheme, wherein refreshing the encoded clipping page comprises the second device:
      receiving user input by a clipping in the clipping page, wherein the clipping is configured to respond to the user input by passing the user input to the content source for the clipping, wherein the user input is processed by the content source, and the content of the clipping is refreshed with updated content from the content source in response to the user input by accessing, in the content source, the clipped content,
      rendering the clipped content, and
      presenting the clipped content on the second device, thereby refreshing the clipped content.

27. The non-transitory computer memory structure of claim 25, where:
   the selection begins at a structural boundary of the content; and
   identifying an area of interest based on the selection and a structural cue of the document includes:
      storing an offset location of the area of interest; and
      storing the structural cue, the structural cue including an indication that the area of interest begins at the structural boundary.

28. The method of claim 14, further comprising:
   alternating presentation of the first portion and the second portion of content.

29. The method of claim 14, where the area of interest defines non-contiguous first and second portions, and
   presenting the clipping in the clipping page includes alternating presentation of the first and second portions.

* * * * *